US008264451B2

(12) United States Patent
Kimura

(10) Patent No.: US 8,264,451 B2
(45) Date of Patent: Sep. 11, 2012

(54) DISPLAY PANEL CONTROL DEVICE, LIQUID CRYSTAL DISPLAY DEVICE, ELECTRONIC APPARATUS, AND DISPLAY PANEL DRIVE CONTROL DEVICE

(75) Inventor: Hiroaki Kimura, Kawasaki (JP)

(73) Assignee: NEC Corporation, Tokyo (JP)

( * ) Notice: Subject to any disclaimer, the term of this patent is extended or adjusted under 35 U.S.C. 154(b) by 772 days.

(21) Appl. No.: 12/414,189

(22) Filed: Mar. 30, 2009

(65) Prior Publication Data

US 2009/0243995 A1 Oct. 1, 2009

(30) Foreign Application Priority Data

Mar. 31, 2008 (JP) ................................ 2008-092866

(51) Int. Cl.
*G09G 3/36* (2006.01)
*G09G 5/00* (2006.01)
*G06F 3/038* (2006.01)

(52) U.S. Cl. ............ 345/102; 345/204; 345/87; 345/89; 345/94

(58) Field of Classification Search .................. 345/102
See application file for complete search history.

(56) References Cited

U.S. PATENT DOCUMENTS

| | | | | |
|---|---|---|---|---|
| 7,505,026 | B2 * | 3/2009 | Baba et al. | 345/102 |
| 7,969,398 | B2 * | 6/2011 | Shirasaki et al. | 345/89 |
| 2005/0259064 | A1 * | 11/2005 | Sugino et al. | 345/102 |
| 2006/0055661 | A1 * | 3/2006 | Kawaguchi | 345/102 |
| 2007/0273678 | A1 * | 11/2007 | Okita et al. | 345/204 |

FOREIGN PATENT DOCUMENTS

| | | | |
|---|---|---|---|
| JP | 11-202286 | A | 7/1999 |
| JP | 2006-099100 | A | 4/2006 |
| JP | 2007-066634 | A | 3/2007 |

* cited by examiner

*Primary Examiner* — Bipin Shalwala
*Assistant Examiner* — Ilana Spar
(74) *Attorney, Agent, or Firm* — Sughrue Mion, PLLC

(57) ABSTRACT

To provide a display panel control device capable of improving gap of moving pictures, etc., without increasing the dividing number of the backlight. The device includes: a black image insertion driving part which performs, on a display panel, black image insertion drive in which video display scanning and black image display scanning are executed in a specific period; and a light-up timing control part which controls a light-up start timing and a light-off start timing of each light source block based on a synchronous signal which synchronizes with the start timing of the video display scanning or the black image display scanning. The light-off period of the light source block is equal to or less than a period from the end of black image display scanning performed on all display lines within a block area to the start of video scanning performed on the first display line within the area.

11 Claims, 75 Drawing Sheets

BACKLIGHT LUMINANCE IN
LIGHT-SHIELDING STRUCTURE (1/4)

BACKLIGHT LUMINANCE IN
LIGHT-SHIELDING STRUCTURE (1/8)

BLACK INSERTION DRIVE PANEL TRANSMITTANCE

LUMINANCE OF LIQUID CRYSTAL DISPLAY DEVICE

SCANNING BACKLIGHT OF RELATED TECHNIQUE (NO LIGHT-SHIELD)

SCANNING BACKLIGHT OF RELATED TECHNIQUE
(LIGHT-SHIELDING STRUCTURE)

WITH MOTION BLUR /
COLORING IN THE MOTION BLUR

IPS PANEL

DISPLAY PANEL CONTROL DEVICE, LIQUID CRYSTAL DISPLAY DEVICE, ELECTRONIC APPARATUS, AND DISPLAY PANEL DRIVE CONTROL DEVICE

CROSS-REFERENCE TO RELATED APPLICATION

This application is based upon and claims the benefit of priority from Japanese patent application No. 2008-092866, filed on Mar. 31, 2008, the disclosure of which is incorporated herein in its entirety by reference.

BACKGROUND OF THE INVENTION

1. Field of the Invention

The present invention relates to a display panel control device, a liquid crystal display device, and the like. More specifically, the present invention relates to backlight drive of the liquid crystal display device.

2. Description of the Related Art

In order to improve motion blur generated in moving pictures that are displayed in a hold-type display device such as a liquid crystal display device, there has been proposed for a case of a liquid crystal display panel, for example, to make the display to be of an impulse type in a pseudo manner, such as employing black insertion drive which displays a black signal between image signals at a specific rate, blinking backlight drive which controls a back-face light source (referred to as a backlight hereinafter) of the liquid crystal display panel to blink, and scanning backlight drive (Japanese Unexamined Patent Publication 11-202289: Patent Document 1), etc.

FIG. 47-FIG. 52 show luminance waveforms of a given point on a screen of each drive type (normal drive, black insertion drive, scanning backlight drive) for white display and black display, respectively.

As shown in FIG. 47-FIG. 49, in a case of all-white display, white luminance of the black insertion drive is reduced to a half level with the normal drive since human beings recognize the average luminance of the white display and the inserted black display. Further, as shown in FIG. 50-FIG. 52, in a case of black display, the luminance waveform thereof becomes the same half level as the black display with the normal drive. As a result, the contrast is also reduced to a half compared to that of the normal drive.

Furthermore, as described above, the luminance of white display is reduced to a half, and the backlight that takes up most of the consumed power is lighted up constantly even in a period of black display. Thus, the luminance efficiency goes down, so that the power consumption becomes increased for obtaining the luminance that is equivalent to the luminance before employing the black insertion drive. Therefore, it is difficult to keep the balance of overall performance.

That is, with a method using the black insertion drive, the display luminance in the period other than black display is decreased instead of improving the motion blur in the moving pictures. Thus, the contrast in the display becomes deteriorated. Further, the backlight is always lighted up even in the period of the black display, which results in having poor luminance efficiency. Therefore, the power consumed therein needs to be doubled for having the luminance that is equivalent to the luminance before employing the black insertion drive.

In the meantime, as shown in FIG. 53 and FIG. 54, in the case of all-white display on the liquid crystal display panel, white luminance is reduced to a half with the blinking backlight drive which lights up/off the back-face light source sequentially in accordance with scanning lines of the liquid crystal display panel than the normal drive since human beings recognize the average luminance of the white display and the inserted black display. However, the black display is also reduced to a half as in the white display since the backlight is turned off. As a result, the contrast becomes equivalent as the case of the normal drive. Further, while the luminance of the white display is reduced to a half during the black display, the power consumption is also reduced to a half since the backlight is turned off. Therefore, the luminance efficiency becomes equivalent as the case of the normal display. Thus, this method seems to be an excellent method.

That is, the blinking backlight drive seems like an excellent method having no deterioration in the luminance efficiency when considering a given single pixel alone, since it can improve the motion blur in the moving pictures, reduce the luminance of the black display as in the case of white display, have no deterioration in the contrast, and decrease the power consumption during a period where the backlight is turned off.

However, the liquid crystal display panel shown in FIG. 53 and FIG. 54 employs line sequential scanning. Thus, the time at which frame information is rewritten to each line differs, and levels of reaching the liquid crystal response in each scanning line of the liquid crystal display panel varies in a period where the backlight is lighted up. Thus, there is difference (bright and dark) in the luminance depending on the positions on the screen. Further, when the light-up timing of the backlight comes to go over the line sequential scanning, the moving pictures are to become shifted greatly.

In order to overcome the issues of the black insertion drive and the blinking backlight drive described above, there have been proposed following Patent Document 1, Patent Document 2, and Patent Document 3, for example.

As shown in FIG. 73, Japanese Unexamined Patent Publication 11-202286 (Patent Document 1) proposes scanning backlight drive that uses an illumination part 1001 for illuminating a liquid crystal display part, which has a plurality of light emitting areas 1002 that emit light to a scanning direction, and the plurality of light emitting areas 1002 are sequentially scanned and lighted up by synchronizing with a vertical synchronous signal of the liquid crystal display part.

With this scanning backlight drive, the divided light-source blocks are sequentially lighted up and off by synchronizing with the line sequential scanning of the liquid crystal part. Thus, the difference in the reaching levels of the liquid crystal response of each scanning line becomes smaller than the case of the blinking backlight drive described earlier.

In the structure of a backlight of Japanese Unexamined Patent Publication 2007-66634 (Patent Document 2), as shown in FIG. 74, a light emitting part 1020 having a plurality of light emitting areas 1021 that emit light at different timings is being divided into the plurality of light emitting areas 1021 by being in contact with a light transmitting device 1025 with partition plates 1023 (at least a part of which is formed by a light transmitting material). A reflection film 1022 pasted on the partition plate 1023 is provided to reflect the light from an emission light source 1024 of the respective light emitting area 1021 to have it emitted to the directions of the light transmitting device 1025 and a liquid crystal panel 026.

A display control circuit of Japanese Unexamined Patent Publication 2006-99100 (Patent Document 3) includes: a vertical timing control circuit which generates start signals STHA and STHB; a gate driver and a source driver which sequentially drives a plurality of OCB liquid crystal pixels by each row through controlling the signal STHA to keep gradation display pixel voltage to the pixels on the driven row, and sequentially drives the pixels at least by each row through controlling the signal STHB to keep black insertion pixel voltage to the pixels on the driven row; a backlight driving part for driving a plurality of backlight light sources arranged substantially in parallel to the rows of the pixels in such a manner that a plurality of pixels are sectioned into a plurality of groups; and an inverter control circuit.

The inverter control circuit controls a backlight driving part so as to start an action of sequentially lighting up and off the plurality of backlight light sources by synchronizing with the first start signal STHA at a prescribed duty ratio that corresponds to the ratio of the holding period of the gradation display pixel voltage to the holding period of the black insertion pixel voltage. The backlight driving part is configured with a plurality (m) of inverters that respectively generate driving voltages for the backlight light sources, and the inverter control circuit generates respective number (m) of pulse width modulation signals PWM (PWM1-PWMm) for controlling each of the inverters.

As shown in FIG. 75, the pulse width modulation signal PWM1 is generated by using the first and second start signals STHA and STHB among the control signals outputted from the vertical timing control circuit. The first start signal STHA is a reference timing for having the gradation display pixel voltage held at the OCB liquid crystal pixels of the first row, and the second start signal STHB is a reference timing for having the black insertion pixel voltage held at the OCB liquid crystal pixels PX on the first row.

However, there is a following issue with the scanning backlight drive of Patent Document 1.

That is, since there is a time lag in blinking of each of the backlight light source blocks, light emitted from a given light source block leaks to the other light source block areas. This causes an imperfect backlight light-off state.

FIG. 55-FIG. 57 show the light-off state with a light leakage between the light source blocks when a white display part is shifted, and show motion blur of the moving picture.

For example, as shown in FIG. 56, if there is no light leakage between the light source blocks and the lights are off completely, the motion blur of the moving pictures can be improved with respect to that of the normal drive. However, as shown in FIG. 57, if there is a light leakage between the light source blocks and light-off state is imperfect, the motion blur of the moving pictures are generated as ghost image. Thus, the quality of the moving pictures becomes deteriorated than that of the normal drive.

That is, with the scanning backlight drive, the backlight light-up timings in each of the divided light source blocks is different. Thus, the light-off state of the backlight becomes insufficient due to the light leakage occurred between the light source blocks. Therefore, the moving picture is viewed in a duplicated manner as in a case with ghost image, so that a sufficient moving picture improving effect cannot be brought out. In order to overcome such shortcomings, Patent Document 2 employs a structure to prevent the light leakage by providing the partition plates between the light source blocks.

However, the scanning backlight drive of Patent Document 2 has a following shortcoming, separately from those described above.

FIG. 58-FIG. 61 show moving pictures obtained by the line sequential drive and the scanning backlight drive of the liquid crystal display panel. As shown in FIG. 58, the liquid crystal display panel is driven with the line sequential scanning, so that frame information is rewritten sequentially from a scanning start line of the screen towards a scanning end line.

When moving pictures are displayed with the normal drive, eyes of human beings move while following the moving pictures. Thus, with a moving coordinate system of eyes of human beings, an image that is deformed from the information on the scanning start line in proportional to the moving speed of the moving picture is recognized as the image on the scanning end line, as shown in FIG. 60. The scanning lines of the liquid crystal display panel is fractionalized as described above, Thus, even though there is motion blur, deformation of the moving picture is sequential. Therefore, there is not so much uncomfortable feeling felt by viewers as a whole.

In the meantime, the dividing number of scanning backlight drive is naturally smaller than the scanning line number of a regular panel. It is because display scanning lines of a liquid crystal display panel are as many as four hundred eighty (480) for VGA (Video Graphics Array) and seven hundred sixty eight (768) for XGA (Extended VGA), while there are about several to twenty backlight light emitting areas due to restrictions set by the size of the light source such as CCFL or LED and the number of light-up circuits such as the inverters. Thus, it is not practical to provide the same number of light emitting areas as the number of scanning lines. Therefore, as shown in FIG. 61, with the scanning backlight drive, there are the moving image gaps generated at the boundaries of the light source blocks due to the light-up time differences in the divided light source blocks of the backlight.

Human beings have an advanced ability called "Vernier acuity" that is an ability to sensitively detect display with sudden discontinuous gap in image contours. Thus, for the display of the above-described case, eyes of human beings recognize even very small gap in a moving picture of a low speed, so that the picture quality is deteriorated.

Further, there is another shortcoming in the structure of Patent Document 2 in which the divided light source blocks are light-shielded structurally with the partition plates.

There are individual differences in the luminance and chromaticity of the light sources within the divided light source blocks of a normal backlight. As shown in FIG. 62 and FIG. 63, in a case of a normal backlight that does not employ the light-shielding structure of partition plates, the individual difference between the light sources are made mixed and in uniform to some extent. However, as shown in FIG. 64 and FIG. 65, in a case of the structure in which the light source blocks are light-shielded perfectly, the individual differences among the light sources are shown directly in the display. Thus, it becomes necessary to control the luminance by each light source block, and to select the light sources, for example. This results in increasing the cost.

As described above, when the light shielding structure (partition plates) are provided to avoid the light leakage between the areas, the moving pictures generate gaps on the boundaries of the divided areas of the backlight due to the light-up timing difference of the divided light source blocks, because the eyes of human beings follow the moving pictures. Therefore, the picture quality is more deteriorated than normal moving picture blurring.

Furthermore, the backlight structure becomes complicated, and the individual variations of the light sources such as the cold cathode tubes (CCFL) turn out directly as luminance unevenness of the divided light source blocks. Therefore, it is necessary to control the luminance of the light sources of each divided light source block, which results in a large increase in the cost.

Further, as shown in FIG. 64 and FIG. 65, there is such an issue in the light shielding structure that designing thereof is not easy because shadows of the light-shielding walls tend to appear on the screen, even though it is possible to prevent the light leakage.

Furthermore, FIG. 66-FIG. 72 show another shortcoming of the scanning backlight drive.

While the CCFL is the mainstream of the light source of the backlight, it has such a property that the optical response varies depending on the color wavelengths. FIG. 66-FIG. 71 show the optical responses of each color wavelengths (RGB) of CCFL. While the optical response of blue (B) is quick as in FIG. 68 and FIG. 71, the optical response of in the wavelength range of green (G) is slower as in FIG. 67 and FIG. 70. Thus, the light during the luminance response takes on the color. As a result, as shown in FIG. 72, the colored motion blur generated in the moving picture becomes changed and the picture quality is deteriorated if inexpensive CCFL is used for the light source in the scanning backlight drive.

As described above, the motion blur of the moving picture cannot be improved uniformly on the whole screen only with the scanning backlight drive.

Further, in the case of Patent Document 3, light-off of the backlight is started by the pulse width modulation signal PWM1 simultaneously with the start of writing the black insertion signal with the second start signal STHB, as in OFFSET of FIG. 75. That is, this technique improves the moving picture performance by simply synchronizing the timing of lighting-off the backlight with the timing of the black insertion signal, and there is no consideration over other factors such as gap in the moving pictures, ghost-image-like motion blur, and the like, which are caused due to various kinds of conditions (e.g., number of divided blocks of the backlight, relation between the light-off period and the black insertion period, transmittance response of the liquid crystal display panel, luminance response of the backlight light source, and the like).

SUMMARY OF THE INVENTION

The present invention has been designed to overcome the various kinds of issues of the above-described techniques. An exemplary object of the invention is to provide a display panel control device, a liquid crystal display device, and the like, which can improve the gap in the moving pictures, ghost-image-like motion blur, and the like with a simple structure without increasing the dividing number of light source blocks.

In order to achieve the foregoing exemplary object, the display panel control device according to an exemplary aspect of the invention is a device for controlling a display panel and a back-face light source which configures a plurality of light source blocks formed on a back face of the display panel in parallel to a line sequential scanning direction. The control device includes: a black image insertion driving part which starts video display scanning and black or dark image (referred to as black image hereinafter as a general term) display scanning for the display panel in a specific period (one frame period, for example), and performs black image insertion drive; and a light-up timing control part which controls setting of a light-up start timing and a light-off start timing of each of the plurality of light source blocks, based on a synchronous signal that synchronizes with a timing for starting the video display scanning or a timing for starting black image display scanning performed by the black image insertion part, wherein the light-up timing control part controls the setting of the light-up start timing or the light-off start timing so as to satisfy a period condition, i.e., a light-off period of a given light source block becomes equal to or less than a period from an end of the black image display scanning on all display lines within a block area of the display panel corresponding to a given light source block to a start of the video scanning on the first display line within the block area.

The liquid crystal display device according to another exemplary aspect of the invention includes: a display panel in which a pixel is formed in each of intersection points between a plurality of gate lines and a plurality of source lines arranged in matrix; a source line driving part which supplies, to each of the source lines, a black image inserted video signal which alternately contains a video part which displays video in accordance with a video signal and a black or dark image part which displays a black or dark display (referred to as black display hereinafter as a general term) in accordance with a black or dark image signal; a plurality of gate line driving parts which are provided to each of gate line groups (groups obtained by dividing the plurality of gate lines into groups), which sequentially supply a gate driving signal to the respective gate lines; a light-up control part which performs controls to light up and off, by a unit of block, the plurality of light source blocks provided on the back face of the display panel in parallel to a line sequential scanning direction; a backlight unit disposed in the back face of the display panel, which contains the plurality of light source blocks; and the display panel control device described above, which controls the light-up control part, the gate line driving part, and the source line driving part, wherein the backlight unit has a space part formed over each block boundary part between the light source blocks neighboring to each other.

The display panel drive control method according to still another exemplary aspect of the invention includes: a black image insertion drive step which starts video display scanning and black or dark image display scanning for a display panel in a specific period, and performs black or dark image insertion drive; and a light-up timing control step which controls setting of a light-up start timing and a light-off start timing of each of a plurality of light source blocks formed on a back-face part of the display panel in parallel to a line sequential scanning direction, based on a synchronous signal that synchronizes with a timing for starting the video display scanning or a timing for starting the black or dark image display scanning performed by the black image insertion driving step, wherein the light-up timing control step controls the setting of the light-up start timing or the light-off start timing so as to satisfy a period condition, i.e., a light-off period of a given light source block becomes equal to or less than a period from an end of the black or dark image display scanning on all display lines within a block area of the display panel corresponding to the given light source block to a start of the video scanning on a first display line within the block area.

BRIEF DESCRIPTION OF THE DRAWINGS

FIGS. 7A and 7B are explanatory diagrams for describing an example of a screen display in black insertion drive performed in the liquid crystal display device according to the first exemplary embodiment of the invention, in which FIG. 7A is a diagram showing a case of normal drive and FIG. 7B is a diagram showing a case of black insertion drive;

FIGS. 41A and 41B are explanatory diagrams for describing an example of a screen display in black insertion drive performed in the liquid crystal display device according to the second exemplary embodiment of the invention, in which FIG. 41A is a diagram showing a case of normal drive and FIG. 41B is a diagram showing a case of black insertion drive performed by frame insertion;

Figure 1:
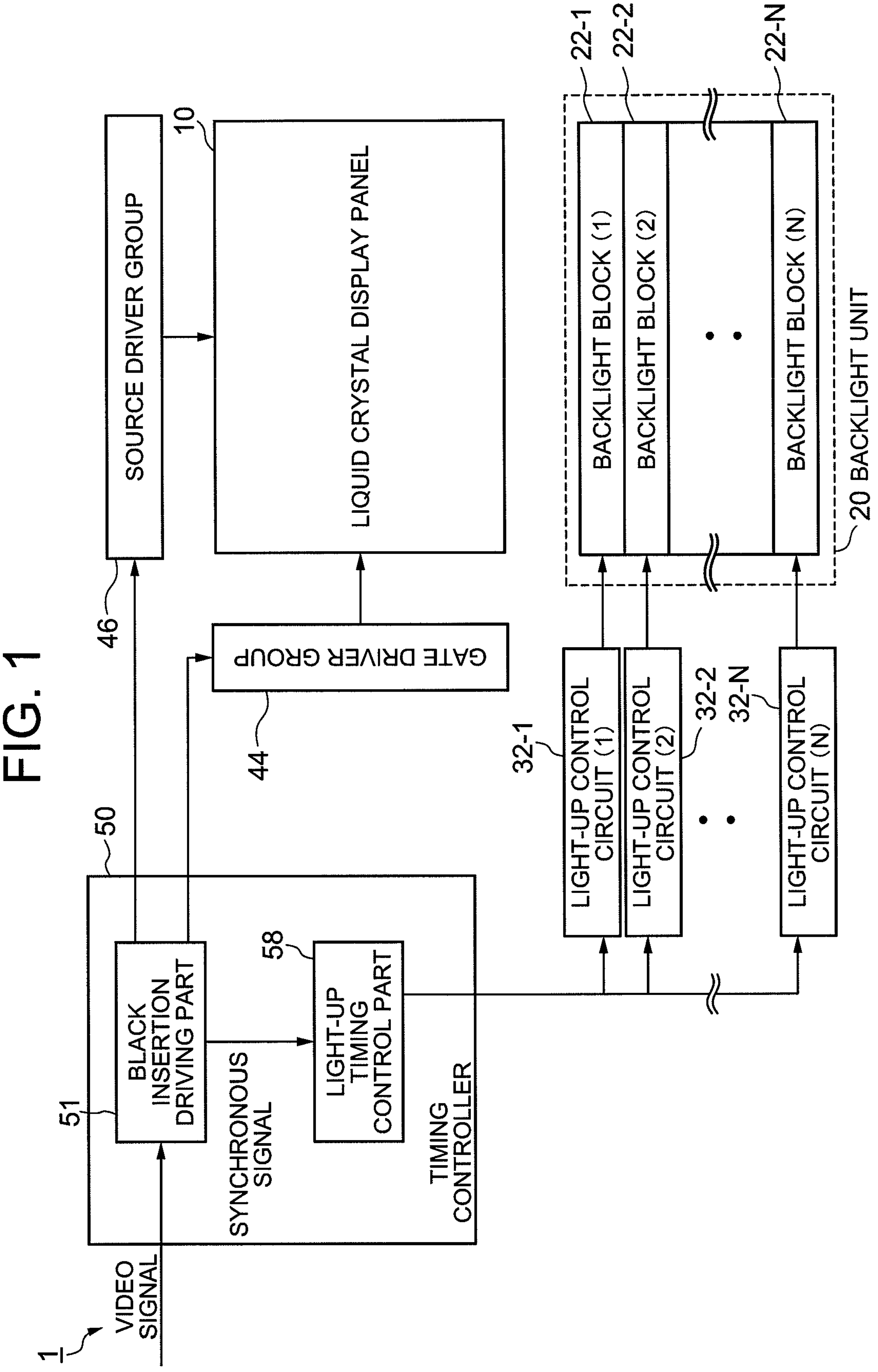
FIG. 1 is a block diagram showing an example of the overall structure of a liquid crystal display device according to a first exemplary embodiment of the invention.

DETAILED DESCRIPTION OF THE EXEMPLARY EMBODIMENTS (Basic Structure of Display Panel Control Device)

First, the basic structure of a display panel control device will be described. The display panel control device according to the invention controls a display panel and a back-face light source (light source to back-face of the display panel) that configures a plurality of light source blocks formed on the back face of the display panel in parallel to a line sequential scanning direction. The display panel control device is structured, including: a black image insertion driving part (reference numeral 51 shown in FIG. 1, for example) which starts video display scanning and black image display scanning for the display panel in a specific period, and performs black image insertion drive; and a light-up timing control part (reference numeral 58 shown in FIG. 1, for example) which controls setting of the timings for starting light up and off of each of the plurality of light source blocks formed on the back-face of the display panel in parallel to the line sequential scanning direction, based on a synchronous signal that synchronizes with the timing for starting the video display scanning or the black image display scanning performed by the black image insertion part.

Figure 30:
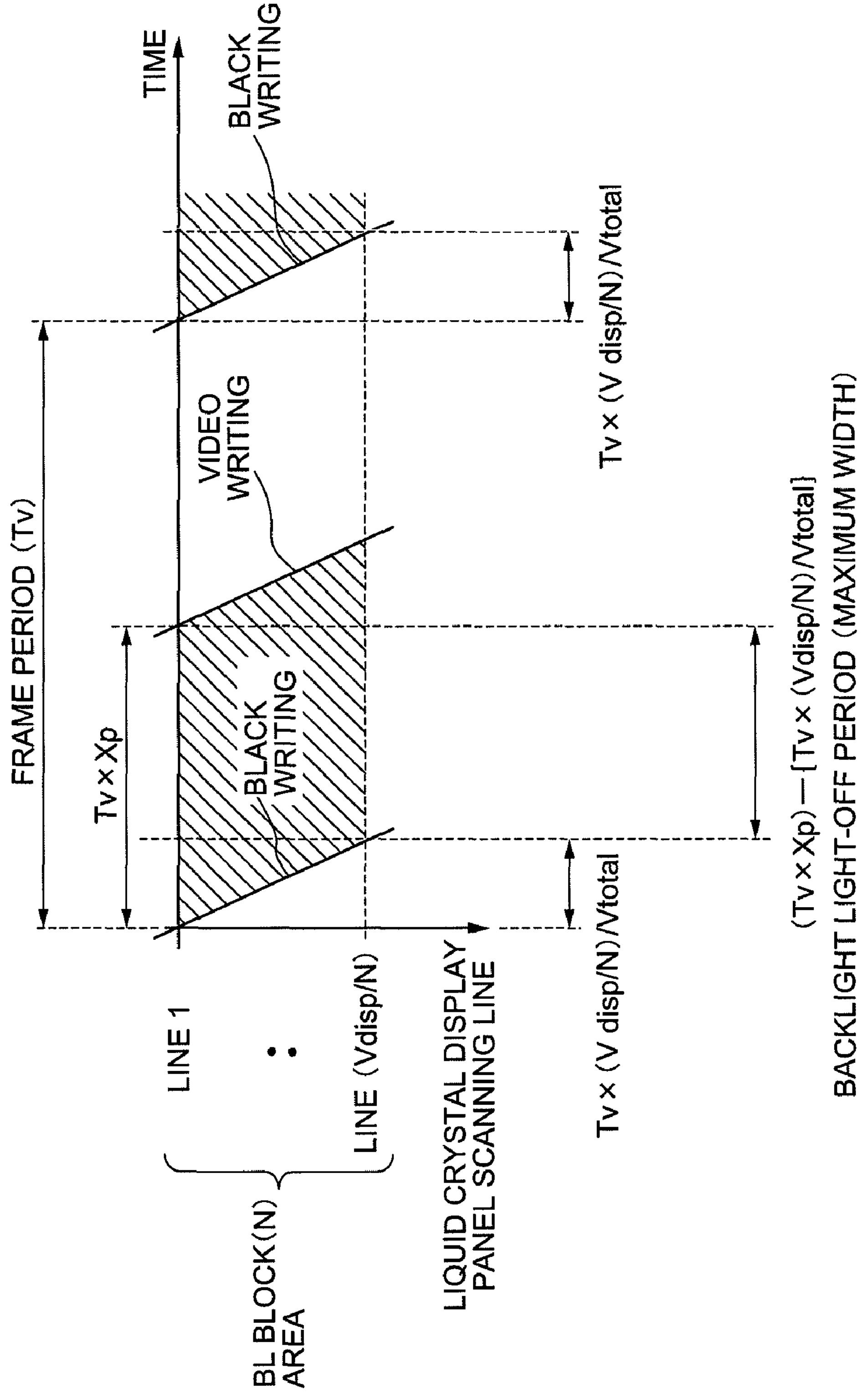
FIG. 30 is an explanatory diagram for describing an example of a case of black insertion drive of a single backlight block of a scanning backlight performed in the liquid crystal display device according to the first exemplary embodiment of the invention.

The light-up timing control part controls the setting of the light-up start timing or the light-off start timing so as to satisfy a period condition, i.e., a light-off period of a given light source block becomes equal to or less than a period from the end of the black insertion display scanning on all the display lines within the block area of the display panel corresponding to the given light source block to the start of the video scanning on the first display line within the block area (e.g., a period expressed with "Tv×Xp−Tv×(Vdisp/N)/Vtotal" shown in FIG. 30).

In order to bring out the effect of continuous transmittance waveform in the line sequential scanning direction of the black image insertion drive, such display panel control device can perform the black insertion drive of the liquid crystal display panel by each of the divided light source blocks with the high-luminance state light source and the turns off the light source after shielding the transmission light continuously. When lighting up the light source, the display panel control device can perform video display drive of the liquid crystal display panel in a high-luminance state by lighting up the light source and then releases the transmission light continuously.

This makes it possible with a simple structure to improve generation of image gap (hereinafter referred as "gap") in the moving pictures, unevenness in the improvements of the motion blur on the screen, and ghost-image-like motion blur, which are the issues of the scanning backlight drive of the related techniques, without increasing the number of divided light source blocks of the backlight. Thus, it is possible to achieve high-quality images with fine total balance in the motion blur of the moving picture, the luminance efficiency, and the contrast.

Hereinafter, an example of a preferred embodiment in which the "display panel control device" of the present invention is applied to a "liquid crystal display device" will be described in a concretive manner by referring to the accompanying drawings.

First Exemplary Embodiment (Overall Structure of Liquid Crystal Display Device)

First, before explaining the structure and operation for performing the invented "scanning backlight drive" that is the feature of this exemplary embodiment, the overall structure of the liquid crystal display device and the structure for performing black insertion drive will be described. FIG. 1 is a block diagram showing an example of an overall schematic structure of the liquid crystal display device according to a first exemplary embodiment of the invention.

A liquid crystal display device 1 according to this exemplary embodiment is capable of performing black insertion drive and scanning backlight drive. As shown in FIG. 1, the liquid crystal display device 1 is configured, including: a liquid crystal display panel 10; a gate driver group 44 and a source driver group 46 for driving the liquid crystal display panel 10; a backlight unit 20 configured with a plurality (N) of backlight blocks 22 (22-1 to 22-N); N-number of light-up control circuits 32 (32-1 to 32-N) for respectively controlling light up and off of each of the backlight blocks; and a timing controller 50 which controls each part by generating various kinds of control signals for controlling the gate driver group 44, the source driver group 46, and the N-number of light-up control circuits (32-1 to 32-N) and supplying those signals to the respective parts.

The timing controller 50 is configured, including: a black insertion driving part 51 for performing black insertion drive in the liquid crystal display panel 10; and a light-up timing control part 58 which generates various kinds of control signals (light source block control signals) for respectively controlling a light-up start timing and a light-off start timing of the N-number of light-up control circuits 32 (32-1 to 32-N) based on the synchronous signals from the black insertion driving part 51.

Further, as shown in FIG. 1, the backlight unit 20 on the back face of the liquid crystal display panel 10 is divided into a plurality of backlight blocks 22-1 to 22-N, which are the light source blocks in parallel to the line sequential scanning direction of the liquid crystal display panel 10. Each of the backlight blocks 22-1 to 22-N is so structured that it can be controlled to light up and off individually by the respective light-up control circuits 32-1 to 32-N. Each of the light-up control circuits 32-1 to 32-N is controlled collectively by the light-up timing control circuit 58 according to the synchronous signal from the black insertion driving part 51.

With the timing controller 50 of the liquid crystal display device 1, the timing of the light-off period can be synchronized with the timing of the black insertion period through having the light-up control part 58 control the light-up start timing and the light-off start timing based on a synchronous signal that synchronizes with a black display scanning start pulse (VSP_b) or a video display scanning start pulse (VSP_i), which are scanning start pulse signals (VSP signals) to be described later.

Practically, as will be described later, in a case where boundary sections of each of the neighboring light source blocks form spaces, the light-up timing control part 58 controls the light-up start timing or the light-off start timing so as to satisfy a period condition, i.e., a light-off period of a given light source block becomes equal to or less than a period from the end of the black insertion display scanning on all the display lines within the block area of the display panel corresponding to the given light source block to the start of the video scanning on the first display line within the block area.

Further, the light-up control part 58 performs the control so that the light-off start timing of the light source block comes at a timing that is obtained by adding a correction constant to the start timing of the black image display scanning.

(Detailed Structure of Liquid Crystal Display Panel)

Figure 2:
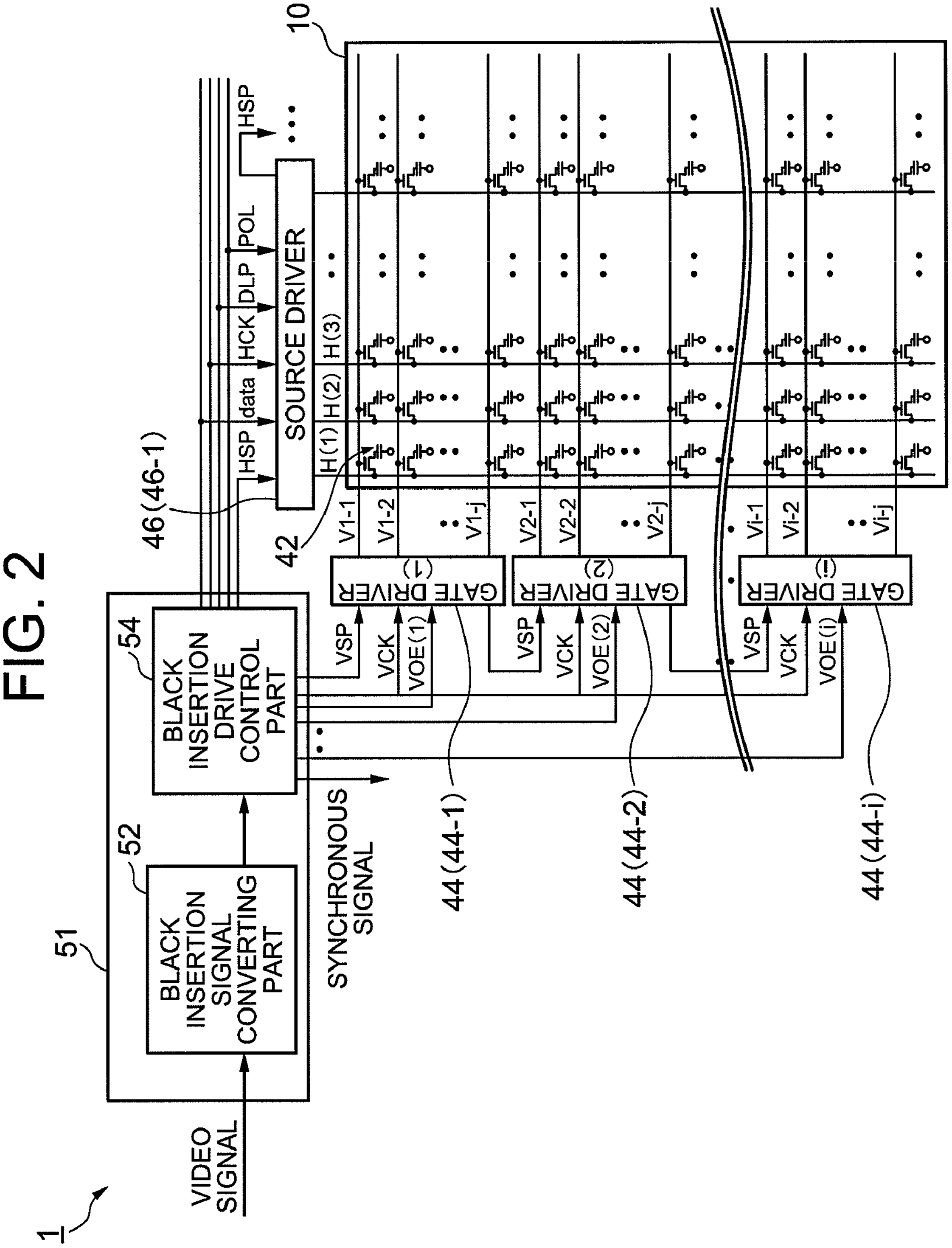
FIG. 2 is an explanatory diagram for describing an example of detailed structures of the liquid crystal display device shown in FIG. 1.

FIG. 2 shows detailed structures of the black insertion driving part 51 of the timing controller 50, the liquid crystal display panel 10, the gate driver group 44, and the source driver group 46.

Now, the more specific structures of the liquid crystal display panel 10 will be described.

As shown in FIG. 2, the liquid crystal display device 1 according to the first exemplary embodiment of the invention is configured, including: the liquid crystal display panel 10 in which i-number (i is a natural number) of gate line groups forming blocks of j-number (j is a natural number) of gate lines V(1-1) to V(1-j), V(2-1) to V(2-j), - - - , V(i-1) to V(i-j) (these gate lines may be referred to as m-number (i×j=m (m is a natural number)) of gate lines V1 to Vm) and n-number (n is a natural number) of source lines H1 to Hn are arranged to cross each other in a grid-like form, and a pixel 42 is formed at each intersection point between the gate lines V(1-1) to V(1-j), V(2-1) to V(2-j), - - - , V(i-1) to V(i-j) and the source lines H1 to Hn; source driver 46 (46-1 to 46-k) which are connected to the respective source lines H1 to Hn to supply video signals or black inserted video signals; and a plurality of gate drivers 44 (44-1 to 44-i) which are provided for each of the gate line groups V(1-1) to V(1-j), V(2-1) to V(2-j), - - - , V(i-1) to V(i-j) each with i-number of gate lines, and sequentially supply gate-on signals (Vg) to the respective gate lines V(1-1) to V(1-j), V(2-1) to V(2-j), - - - , V(i-1) to V(i-j).

As shown in FIG. 2, the j-number of gate lines from the top of the first group, i.e., the gate lines V(1-1) to V(1-j), are connected to the gate driver 44-1 (gate driver 1), the (j+1)-th to the (j+j)-th gate lines of the second group, i.e., the gate lines V(2-1) to V(2-j), are connected to the gate driver 44-2, and the {(i-1)j+1}-th to the (i×j)-th gate lines of the last i group, i.e., the gate lines V(i-1) to V(i-j), are connected to the gate driver 44–i (the gate lines from the (2j+1)-th line to the {(i-1)j}-th line are not shown).

In this exemplary embodiment, the liquid crystal display panel 10 may be of any types, e.g., a normally black type such as IPS, a twist nematic (TN) mode, a super twist nematic (STN) mode, a vertical alignment (VA) mode, an in-plane switching (IPS) mode, a polymer dispersion liquid crystal (PDLC) mode, a guest host (GH) mode, a ferroelectric liquid crystal (FLC) type, a birefringence control (ECB) mode, and an OCB panel.

Regarding the pixels that form the liquid crystal display panel 10 of this exemplary embodiment, the source electrodes of thin film transistors (TFTS) are connected to the source lines H1 to Hn, the gate electrodes of the TFTS are connected to the gate lines (i-1) to V(i-j), and the drain electrodes of the TFTs are connected to a pixel electrode that is formed in one of array substrates. Further, a liquid crystal layer is sealed between the pixel electrode formed in one of the array substrates and a common electrode formed on the other substrate (counter substrate).

In the liquid crystal display panel 10, videos are displayed by controlling the light transmittance of the liquid crystal layer with a potential difference between the pixel electrode and the common electrode. At this time, when video signals are written to the pixels, the gate-on signals (Vg1 to Vgm) transmitted via the gate lines V(i-1) to V(i-j) set the TFTs to on-state. Thereby, gradation voltages according to the video signals from the source lines H1 to Hn are applied to the pixel electrode, and the light transmittance of the liquid crystal layer is controlled by the potential difference between the common electrode that is set to a specific voltage and the pixel electrode to which the gradation voltage is applied. This makes it possible to provide video displays based on the video signals.

(Detailed Structure of Black Insertion Driving Part)

Next, the detailed structures of the black insertion driving part will be described.

The black insertion driving part 51 of the timing controller 50 inserts a black image signal to an input video signal to generate a black inserted video signal which contains a video signal part and a black image signal part within a horizontal scanning period, and outputs the black inserted video signal to the source driver 46.

As shown in FIG. 2, the black insertion driving part 51 is configured, including: a black insertion signal converting part 52 which converts the video signal to the black inserted video signal by inserting a black image signal such as a specific gradation display (black, for example) to the video signal by a specific ratio; and a black insertion drive control part 54 which performs black insertion drive control in the liquid crystal display panel 10 based on the black inserted video signal from the black insertion signal converting part 52.

Figure 3:
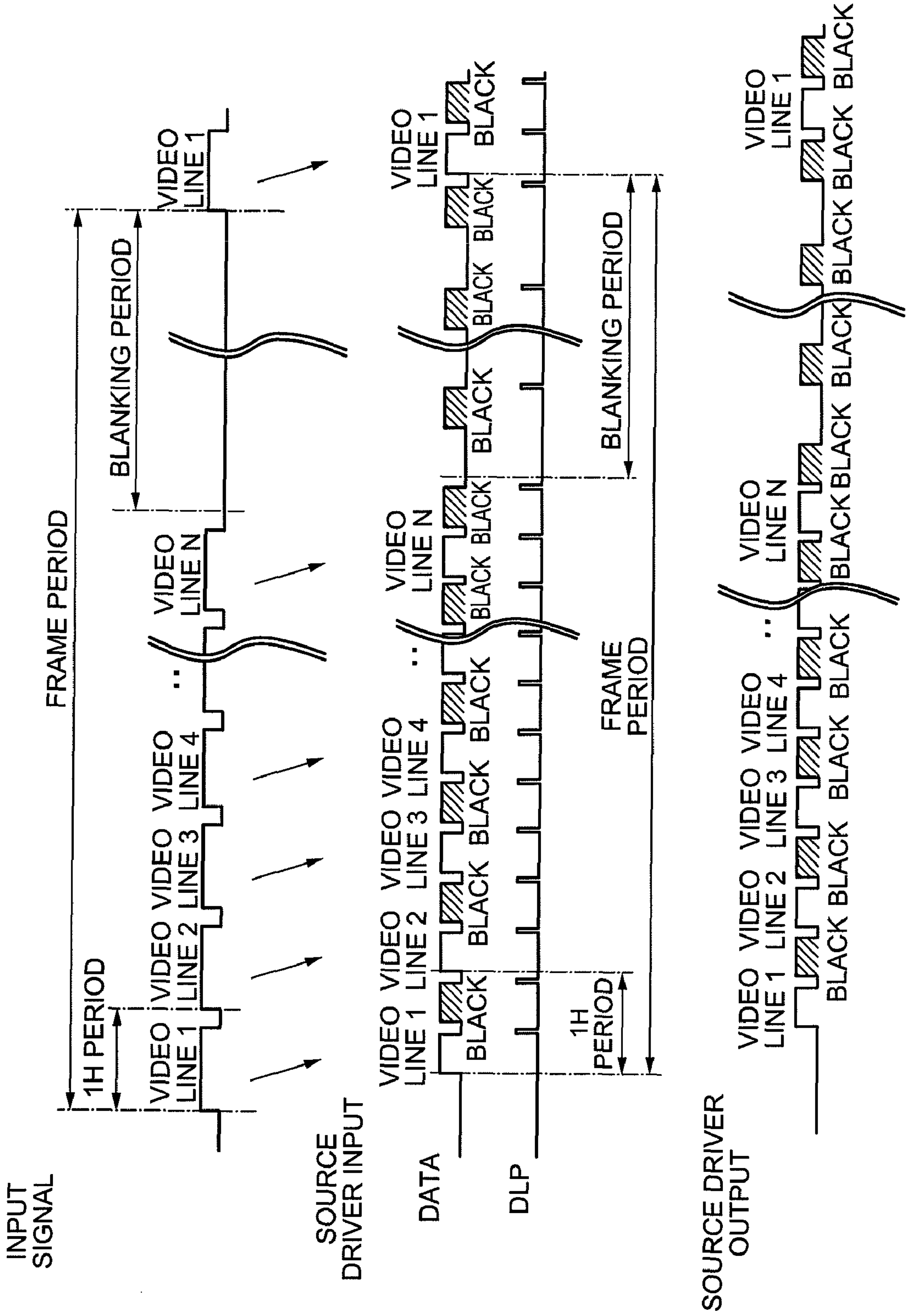
FIG. 3 is an explanatory diagram for describing an example of a process for generating a black insertion image signal in the liquid crystal display device according to the first exemplary embodiment of the invention.

As shown in FIG. 3, one frame period is divided into writing periods (horizontal scanning periods) in the same number as the number (m) of the gate lines V1 to Vm. Provided that the part corresponding to the writing period of the input video signal is a line image part (horizontal scanning period part), the black insertion signal converting part 52 of the black insertion driving part 51 has a function of inserting the black image signal between line image parts of the input video signal.

Further, the black insertion signal converting part 52 of the black insertion driving part 51 has a function of inserting the black image signal also in a blanking period of the input video signal. FIG. 3 shows a case where the black insertion signal converting part 52 of the black insertion driving part 51 inserts the black image signal to the input video signal having no output of a dummy signal in the blanking period.

When the black insertion driving part 51 continues writing of the black signal also in the blanking period between the frames, the holding time of the video signal and the holding time of the black image signal become uniform in all the pixels on the screen. This makes it possible to have no luminance difference within the screen caused due to the difference in the lengths of those holding times.

The black insertion signal converting part 52 may have a black insertion rate setting function which sets the output timing of a black display scanning start pulse in accordance with the operating environment. In that case, the black insertion rate setting function has a function of judging the black image insertion rate for each frame period based on the inputted video signal, so that it is possible to set the output timing of a black display scanning start pulse based on the judged black image insertion rates.

The black insertion drive control part 54 inputs the black inserted video signal to each source driver. Further, along with the video signal to which the black signal is inserted, the black insertion drive control part 54 generates a driver control signal at a timing according to a specific black insertion rate, and inputs it to each of the gate drivers 44 and each of the source driver 46. Each of the gate drivers 44 and each of the source drivers 46 write a voltage to the liquid crystal display panel 10 according to the inputted control signals.

The black insertion drive control part 54 controls the actions of the source drivers 46 and the gate drivers 44-1 to 44-i to execute the control of the black insertion drive.

The source drivers 46 function as source line driving devices through alternately outputting the line video part and the black image part to the source lines H1 to Hn according to the black inserted video signal.

The first exemplary embodiment is so structured that the source drivers 46 receive input of the black inserted video signals generated by the black insertion drive control part 54, and output those to the source lines H1 to Hn.

(Functions of Black Insertion Drive Control Part)

Next, functions of the black insertion drive control part 54 will be described.

The black insertion drive control part 54 has a function of individually supplying, to the gate drivers 44 (44-1 to 44-i), an output enable signal for controlling open/close state of the gate outputs of the gate drivers 44 (44-1 to 44-i). Specifically, the black insertion drive control part 54 has a function of individually supplying, to the gate drivers 44 (44-1 to 44-i), a video display enable signal (VOE_i) for enabling the output of the gate-on signal only during a period where the line image part of the black inserted video signal is supplied to the source lines H1 to Hn, or a black display enable signal (VOE_i) for enabling the output of the gate-on signal only during a period where the black image part of the black inserted video signal is supplied to the source lines H1 to Hn.

Thereby, each of the gate drivers 44 (44-1 to 44-i) has a function of collectively controlling the output for the respective connected gate lines V(1-1) to V(1-j), V(2-1) to V(2-j), - - - , and V(i-1) to V(i-j).

Specifically, each of the gate drivers 44 (44-1 to 44-i) has a function as a video display device which sequentially executes video display scanning by converting the gate-on signal to the video display gate-on signal in a pulse width for having only the line image part of the black inserted video signal written to the pixels according to VOE_i from the black insertion drive control part 54 and sequentially supplying it to the gate lines V(1-1) to V(1-j), V(2-1) to V(2-j), - - - , and V(i-1) to V(i-j), and a function as a black display device which sequentially executes black image display scanning by converting the gate-on signal to the black display gate-on signal in a pulse width for having only the black image part of the black inserted video signal written to the pixels according to VOE_b from the black insertion drive control part 54 and sequentially supplying it to the gate lines V(1-1) to V(1-j), V(2-1) to V(2-j), - - - , and V(i-1) to V(i-j).

Further, the black insertion drive control part 54 has a function of outputting one each of a video display scanning start pulse (VSP_i) for writing the video signal and a black display scanning start pulse (VSP_b) for writing the black image signal to the gate driver 44-1 at different timings in one frame period.

The black insertion drive control part 54 outputs VSP_i to the gate driver 44-1 when starting the video display scanning, and starts supply of VOE_i to the gate driver 44-1 simultaneously. When the video display scanning ends in the gate driver 44-1, the black insertion drive control part 54 starts supply of VOE_b to the gate driver 44-1, and outputs VSP_b to the gate driver 44-1 at a timing of starting the black image display scanning.

The gate driver 44-1 receives input of VSP_b from the black insertion drive control part 54 at a timing that is set according to a specific black insertion rate, supplies VSP_b as the black display gate-on signal to the gate lines V1 to Vj sequentially based on the already supplied VOE_b, and shifts VSP_b to the gate drive 44-2 after this scanning ends. When the gate drivers 44 (44-1 to 44-i) sequentially execute such scanning, black image insertion in the specific black insertion rate can be performed by each frame.

Further, along with the black inserted video signal (data), the black insertion drive control part 54 supplies a signal start pulse (HSP) that is a signal for drive-controlling the source drivers 46, a horizontal clock signal (HCK), a latch signal (DLP), and a polarity inversion control signal (POL) to the source drivers 46, and supplies a scanning start pulse (VSP_i or VSP_b) that is a signal for drive-controlling the gate drivers 44-1 to 44-i, a vertical clock signal (VCK), and an enable signal (VOE_i or VOE_b) to the gate drivers 44-1 to 44-i.

The source drivers 46 have the similar functions as those of the drivers used in general. For example, the drivers 46 start fetching of the black inserted video signal (data) upon receiving input of HSP, and successively stores the black inserted video signals (data) to an internal shift register by synchronizing with HCK. Then, the source drivers 46 finalize the black inserted video signal (data) by input of the data latch pulse DLP and, at the same time, finalize positive/negative of the gradation voltage with respect to the reference voltage in accordance with the polarity inversion control signal, and output the gradation voltage to the source lines H1 to Hn according to the black inserted video signal (data).

The polarity inversion control signal (POL) is a control signal which finalizes the polarity of the gradation voltage (positive/negative with respect to the reference voltage) outputted to the source lines H1 to Hn from the source drivers 46.

Figure 6:
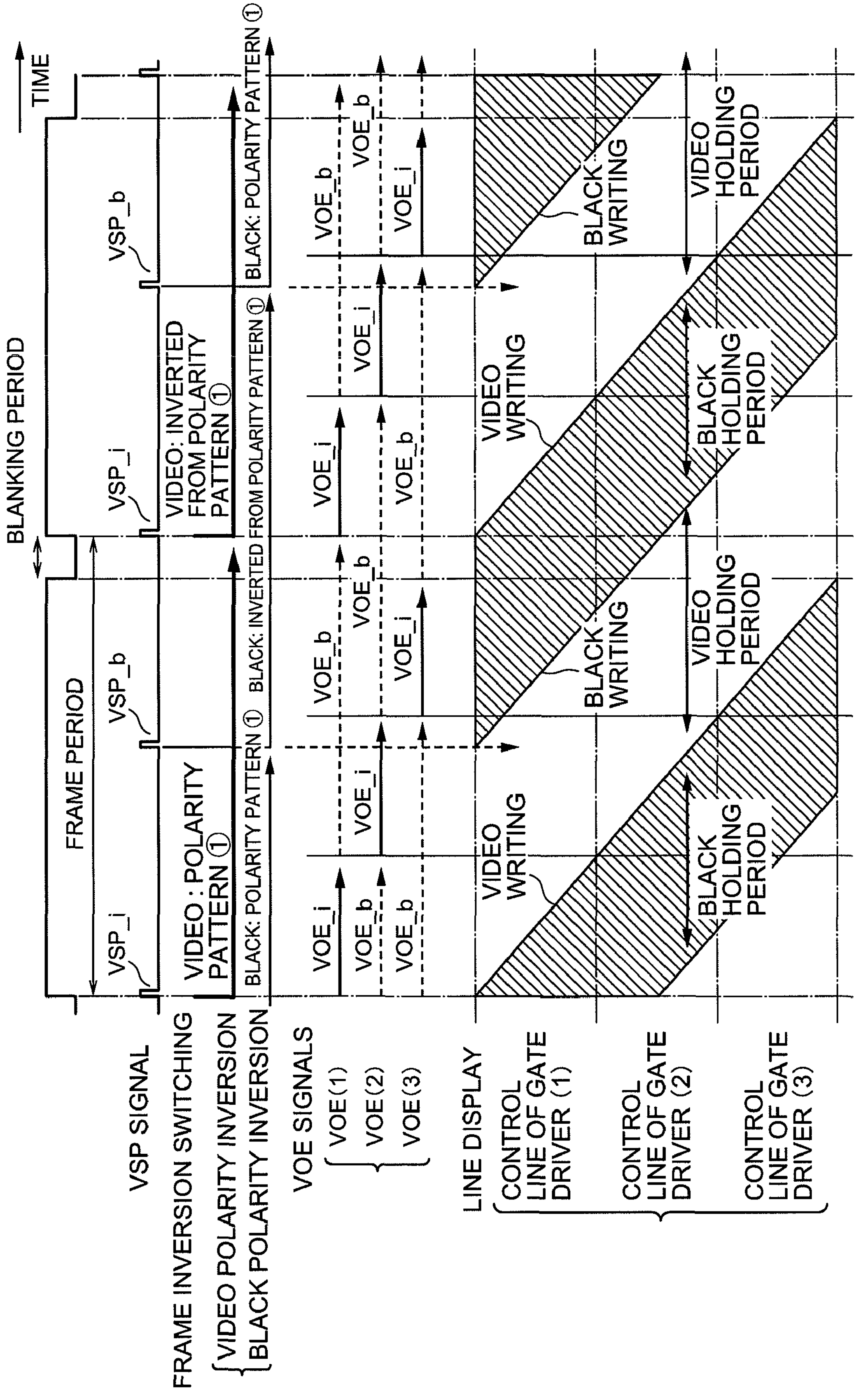
FIG. 6 is an explanatory diagram for describing an example of black insertion drive performed in the liquid crystal display device according to the first exemplary embodiment of the invention.

The black insertion drive control part 54 controls the polarity inversion control signal (POL) to execute frame polarity inversion drive such as dot inversion or 1H2V inversion drive. As shown in FIG. 6, the black insertion drive control part 54 has a function (video signal polarity inverting function) which inverts the writing polarity of the line image part (video signal) by a frame period by having VSP_i as the start point and a function (black image signal polarity inverting function) which inverts the writing polarity of the black image part (black image signal) by a frame period by having VSP_b as the start point.

Such structure enables reversal of the inversion order to be prevented from being occurred in the vicinity of the center of the screen. This makes it possible to avoid having variation in the field-through within the screen of the display panel 1 and display luminance difference as well as ghost image generated at the line where the polarity changes, which are caused due to variation regarding positive/negative of the applied voltages. Further, this structure can be achieved by simply having the black insertion drive control part 54 mount a black signal inversion counter independently. Therefore, there is no increase in the cost, and it is possible to deal with changes in the black insertion rate flexibly.

(Schematic Operations of Entire Liquid Crystal Display Device)

The liquid crystal display device 1 formed in the above-described structure operates as follows. That is, when a video signal is inputted to the timing controller 50, the black insertion signal converting part 52 of the black insertion driving part 51 sets the black insertion rate for the video signal in accordance with the number of data by each frame, for example, generates the black inserted video signal by inserting a black image signal or a dark image signal to the video signal in a specific proportion based on the black insertion rate, and inputs the black inserted video signal to the black insertion drive control part 54.

At this time, the black insertion signal converting part 52 generates the black inserted video signal in which the video display part corresponding to the writing period of the video signal and the black display part corresponding to the writing period of the black image signal are contained alternately within a specific period.

The black insertion drive control part 54 generates the driver control signal at a prescribed timing, and inputs it to each of the gate drivers 44 (44-1 to 44-i) and the source drivers 46.

For example, the black insertion drive control part 54 supplies the black inserted video signal to the source lines H1 to Hn of the liquid crystal display panel 10 via the source drivers 46 to perform the display drive control of the liquid crystal display panel 10.

Each of the gate drivers 44 (44-1 to 44-i) and the source drivers 46 output the video signal and the black image signal alternately to the liquid crystal display panel 10 according to the inputted control signals.

Further, along with the driver control signal, the black insertion drive control part 51 generates a synchronous signal by synchronizing with the cycle of outputting the black image signal to the liquid crystal display panel 10, and inputs it to the light-up timing control part 58.

In the meantime, the backlight unit 20 is formed on the back face of the liquid crystal display panel 10. The backlight unit 20 has a plurality of backlight blocks 22-1 to 22-N formed in a direction in parallel to the line sequential scanning direction of the liquid crystal display panel 10. The backlight blocks 22-1 to 22-N are obtained by dividing a light source into blocks. Each of the backlight blocks 22-1 to 22-N is capable of being lighted up and off independently, and the backlight blocks are so formed that the light of each of the backlight blocks 22-1 to 22-N reaches at least to the neighboring blocks.

The light-up timing control part 58 generates the controls signals (light source block control signals) for each of the backlight blocks 22-1 22-N of the backlight unit 20 based on the inputted synchronous signal, and inputs those to the respective light-up control circuits 32-1 to 32-N of each of the backlight blocks 22-1 to 22-N of the backlight unit 20.

The light-up control circuits 32-1 to 32-N light up and off the respective backlight blocks 22-1 to 22-N according to the inputted control signals (light source block control signals)

(Control Processing Procedures)

Next, various kinds of control processing procedures performed in the liquid crystal display device according to this exemplary embodiment having the above-described structure regarding the black insertion drive and the scanning backlight drive will be described. First, (1) black insertion drive control processing will be described, and (2) scanning backlight drive control processing will be described in detail thereafter.

(1) Black Insertion Drive Control Processing

The more specific driver control procedures of the black insertion drive actions of the liquid crystal display panel executed by the control signals generated in the black insertion drive control part 51 will be described by referring to FIG. 1 to FIG. 7 in order of “control processing of timing controller”, “input/output control of black inserted video signal (data) for source driver”, “gate driver selection control”, “timing control for black insertion”, and “detailed processing of driver side when scanning”.

(Control Processing of Timing Controller)

First, as shown in FIG. 2, the inputted video signal is sent to the black insertion signal converting part 52 of the black insertion driving part 51 of the timing controller 50.

Then, the timing controller 50 has the black insertion signal converting part 52 judge and set the black image insertion rate by each frame period based on the inputted video signal (black insertion rate setting step).

Then, the timing controller 50 has the black insertion signal converting part 52 generate the black inserted video signal in which the black image signal is inserted between the lines of the video signal based on a specific black insertion rate, and inputs it to the black insertion drive control part 54 (black inserted video signal generating step).

Then, the timing controller 50 has the black insertion drive control part 54 generate various kinds of control signals for the drivers according to the black insertion rate set in advance, along with the black inserted video signal.

Further, the timing controller 50 has the black insertion drive control part 54 supply the black inserted video signal (data) and various kinds of control signals to the source drivers 46 and supply other various kinds of control signals to the gate drivers 44-1 to 44-i so as to execute the black insertion drive when displaying a video on the liquid crystal display panel 10 (black inserted video signal supplying step).

At this time, when the black inserted video signal is outputted to each source driver 46 from the black insertion drive control part 54, various kinds of drive control signals are outputted to each of the gate drivers 44-1 to 44-1 and the source drivers 46 by synchronizing with the output of the black inserted video signal.

(Input/Output Control of Insertion Video Signal (Data) for Source Driver Black)

As shown in FIG. 3, the black inserted video signal (data) obtained by inserting the line of black signal between the lines of the video signal, and the data latch pulse (DLP) which finalizes and outputs the video lines as the lines of the video signal and the black lines as the lines of the black signal in the black inserted video signal (data) are inputted to the source driver 46 (46-1).

The source driver 46 (46-1) alternately outputs the video signal and the black signal of the black inserted video signal to the source lines H1 to Hn of the liquid crystal display panel in 1H period according to the data latch pulse (DLP).

(Selection Control of Gate Drivers)

In the black insertion drive, as shown in FIG. 2, at least two gate drivers whose gate outputs can collectively enabled, such as the gate driver 44 (44-1) and the gate driver 44 (44-2), are used. The gate drivers 44-1 to 44-i are controlled with the individual output enable signal (VOE_i or VOE_b) from the black insertion drive control part 54.

The gate drivers 44-1 to 44-i sequentially select pixels of one line according to the inputted control signal, and output the video signal or the black image signal to the liquid crystal display panel 10 according to the selection.

Figure 4:
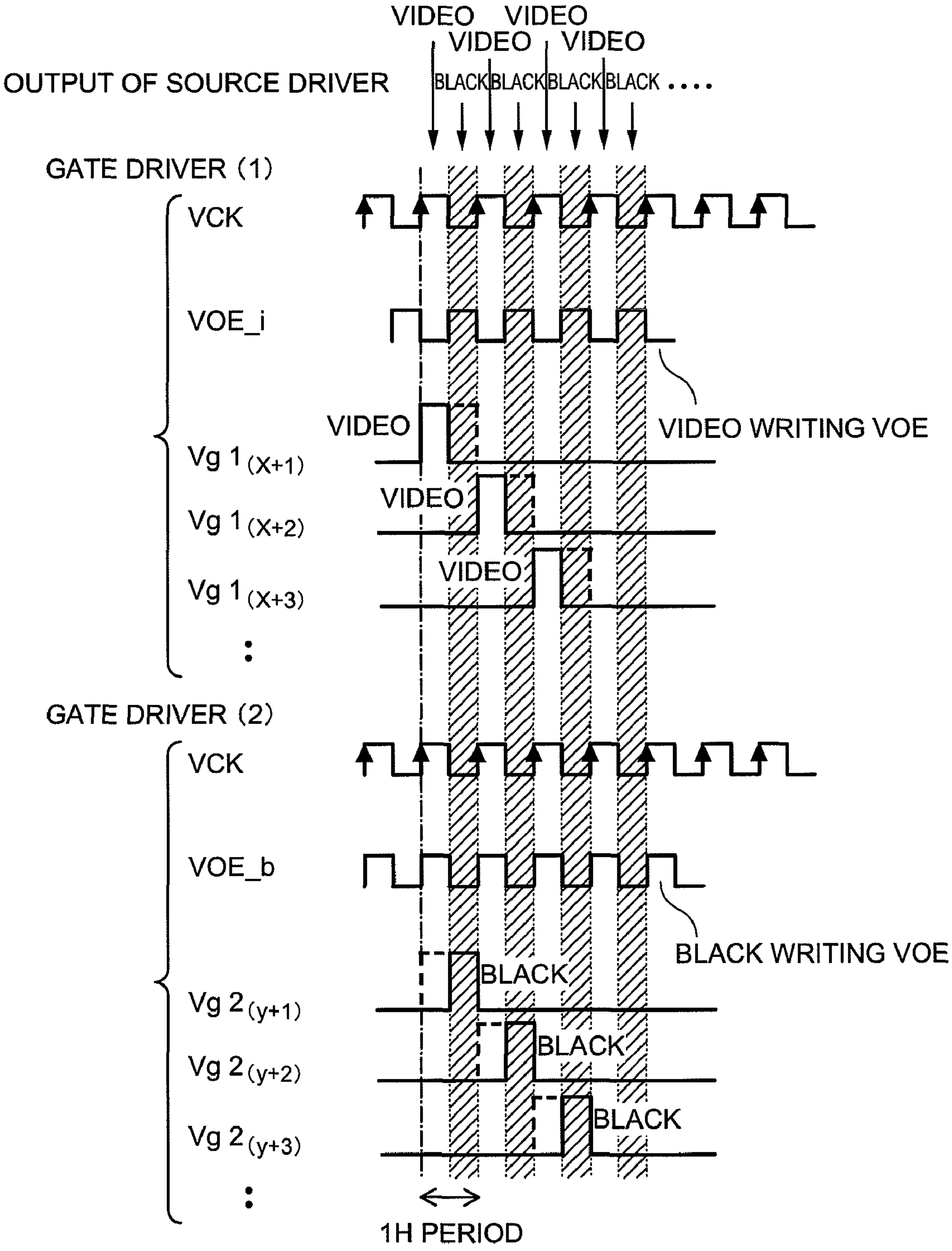
FIG. 4 is an illustration for describing an example of black insertion drive performed in the liquid crystal display device according to the first exemplary embodiment of the invention, which is a timing chart showing a case where a video signal is written to any of lines of a given gate driver (Y driver) and black is written to any of lines of another gate driver.
Figure 5:
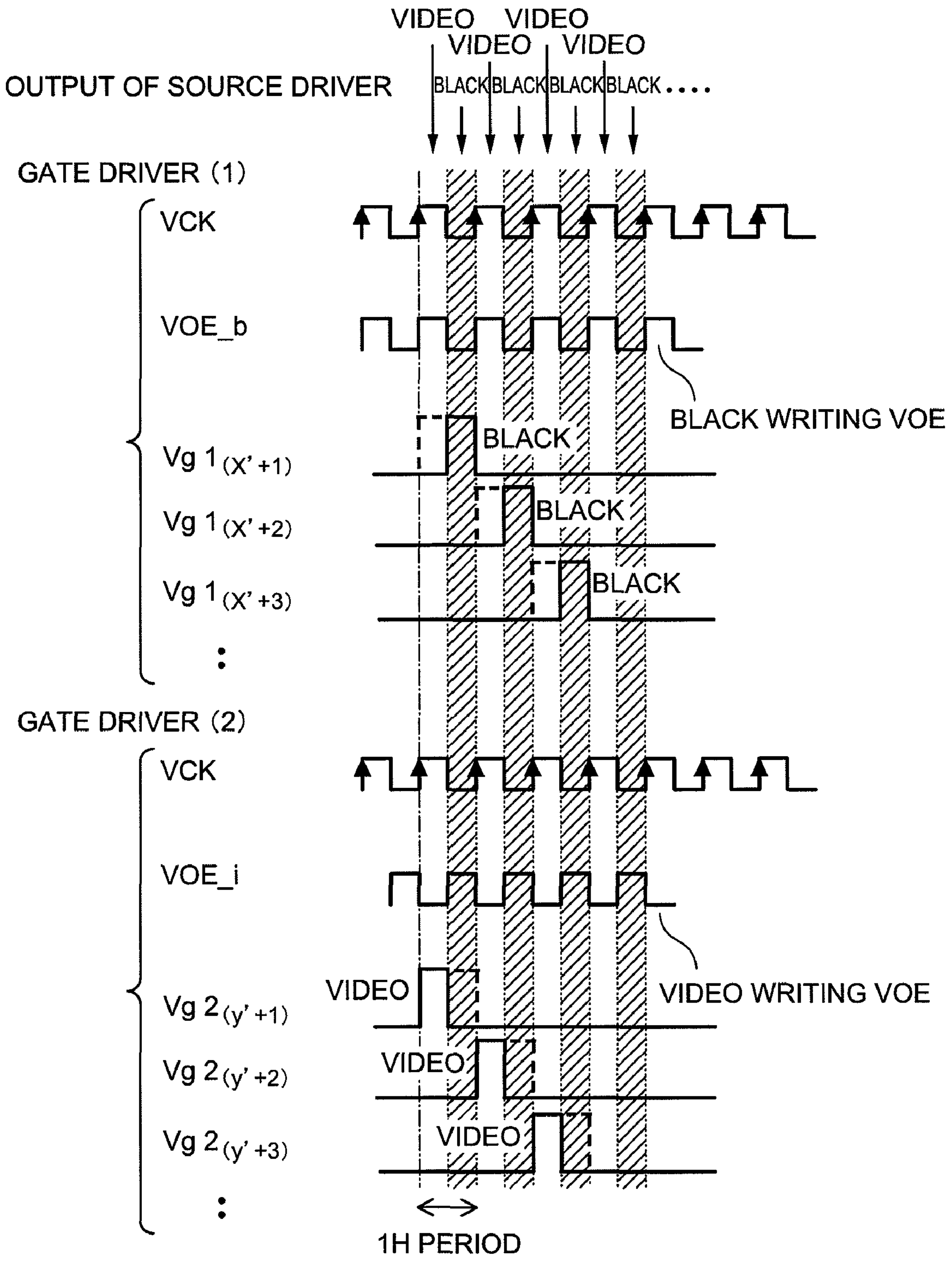
FIG. 5 is an illustration for describing an example of black insertion drive performed in the liquid crystal display device according to the first exemplary embodiment of the invention, which is a timing chart showing a case where black is written to any of lines of a given gate driver (Y driver) and a video signal is written to any of lines of another gate driver.

More specifically, selection controls are executed as in FIG. 4 and FIG. 5. FIG. 4 and FIG. 5 are timing charts of signals that are propagated on the liquid crystal display device of this exemplary embodiment.

FIG. 4 is a timing chart showing a case where the line video signal is supplied to the pixels on the gate lines V1-1 to V1-j which correspond to the gate driver 44-1 (gate driver (1)), and the line black image signal is supplied to the pixels on the gate lines V2-1 to V2-j which correspond to the gate driver 44-2 (gate driver (2)).

Inversely, FIG. 5 is a timing chart showing a case where the line black image signal is supplied to the pixels on the gate lines V1-1 to V1-j which correspond to the gate driver 44-1 (gate driver (1)), and the line video signal is supplied to the pixels on the gate lines V2-1 to V2-j which correspond to the gate driver 44-2 (gate driver (2)).

As shown in FIG. 4, VOE_i is inputted to the gate driver 44-1 (gate driver (1)) when supplying the line video signal to the pixels on the corresponding gate lines V1-1 to V1-j. With this, the gate-on signals (Vg1(x+1), Vg1(x+2), - - - ) are converted to the video display gate-on signals in the same pulse width as that of the line image signal output period of the source driver 46 and sequentially supplied to the gate lines V1-1 to V1-j from the gate driver 44-1 (gate driver (1)).

As shown in FIG. 4, when writing the video signal to any of the lines of the gate driver (1) and the black image signal to any of the lines of the gate driver (2) in 1H period, a video writing enable signal (VOE_i) for setting off the gate is inputted to the gate driver (1) in a period where the source driver 46 outputs black, and a black writing enable signal (VOE_b) for setting off the gate is inputted to the gate driver (2) in a period where the source driver 46 outputs video.

In the meantime, VOE_b is inputted to the gate driver 44-2 (gate driver (2)) when supplying the black image signal to the pixels on the corresponding gate lines V2-1 to V2-j. With this, the gate-on signals (Vg2(y+1), Vg2(y+2), - - - ) are converted to the black display gate-on signals in the same pulse width as that of the black image signal output period of the source driver 46 and sequentially supplied to the gate lines V2-1 to V2-j from the gate driver 44-2 (gate driver (2)).

As shown in FIG. 5, when writing the black image signal to any of the lines of the gate driver (2) and the video signal to any of the lines of the gate driver (1) in 1H period, a black writing enable signal (VOE_b) is inputted to the gate driver (1), and a video writing enable signal (VOE_i) is inputted to the gate driver (2).

In the first exemplary embodiment, the video signal and the black image signal can be written to different lines in 1H period (one horizontal scanning period) in this manner.

(Black Insertion Timing Control)

Next, details of black insertion timing control which uses a method of writing a video signal and a black image signal will be described. FIG. 6 is an illustration for describing an example of black insertion drive executed in the liquid crystal display device according to the first exemplary embodiment, and it shows the details of the black insertion drive when using three gate drivers.

As shown in FIG. 6, in this exemplary embodiment, input of the video display scanning start pulse (VSP_i) for the first gate driver for writing the video signal is performed at least once and input of the black display scanning start pulse (VSP_b) for the second gate driver for writing the black image signal is performed at least once within one frame period.

The video display scanning start pulse (VSP_i) is inputted at the start of a frame, and pixels of the liquid crystal display panel 10 are sequentially selected by one line while shifting the lines on the screen according to clock signals (VCK) of the gate driver.

Further, during this time, an enable signal (VOE_i) for writing the video signal is inputted to each gate driver, in a period where the lines connected to the respective gate drivers are being selected by the shift of the video start pulse (VSP_i).

In the meantime, the black display start pulse (VSP_b) is inputted with a delay with respect to the video start pulse (VSP_i) by the time expressed in a following expression according to the determined black insertion rate (Xp).

$$Tp=Tv\times(1-Xp)$$

Tv: Frame cycle (s)

The inputted black display scanning start pulse (VSP_b) sequentially selects the pixels of the liquid crystal display panel by one line by shifting the lines on the screen according to the clock signals (VCK) of the gate driver as in the case of the video display scanning start pulse (VSP_i).

During this time, an enable signal (VOE_b) for writing black is inputted to each gate driver, in a period where the lines connected to the respective gate drivers are being selected by the shift of the black display start pulse (VSP_b).

Figure 7A:
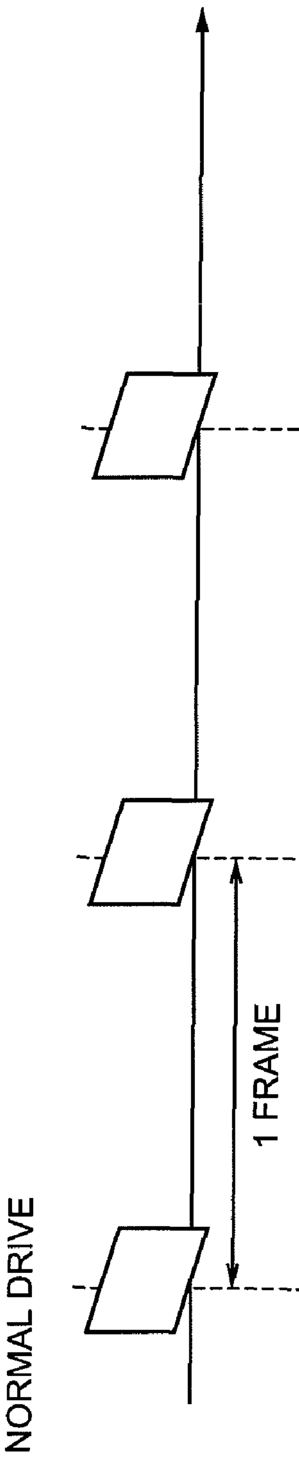
Figure 7B:
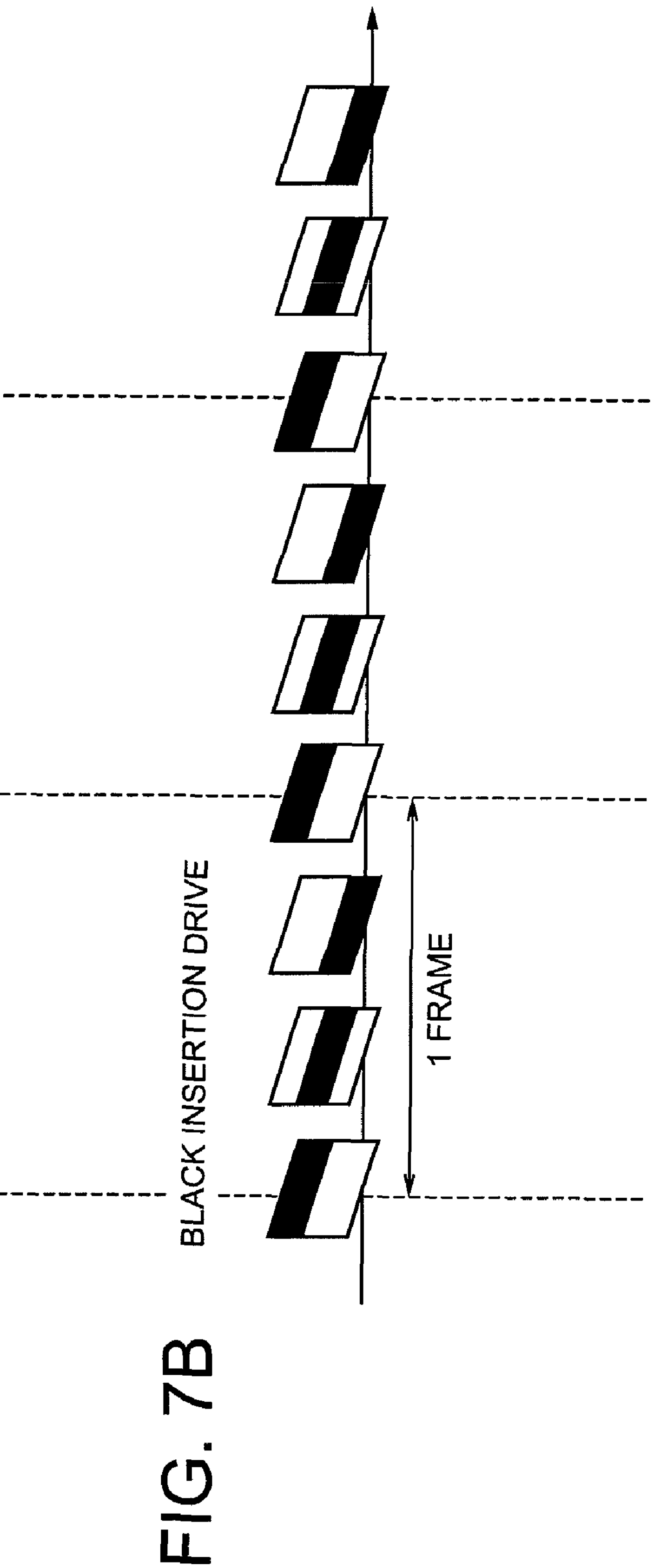

With such structure, a black band scrolls the screen in one frame as shown in FIG. 7B as the display on the screen, and it is possible to achieve the black insertion drive that is capable of controlling the black insertion rate (Xp) by changing the width of the black band.

The width of the black band is determined by the timing of the input of the black display scanning start pulse (VSP_b) with respect to the input of the video display scanning start pulse (VSP_i).

As shown in FIG. 6, the black display scanning start pulse (VSP_b) can be inputted at arbitrary timings, as long as it is the timing at which a single driver does not select the pixel line of the video signal and the pixel line of the black image signal simultaneously. Therefore, the black insertion rate can be adjusted in a delicate manner, so that it is possible to set the optimum black insertion rate in accordance with the use environment by considering a balance between the effect of improving the moving picture blurring as a merit of inserting the black image and the luminance deterioration as a demerit.

Further, regarding the black insertion drive of this exemplary embodiment, the line sequential scanning of the liquid crystal display panel is the same as that of the normal drive. However, this structure requires no frame memory, so that it can be achieved at a low cost. (Detailed Processing on Driver Side When Performing Scanning) Controls to have a plurality of gate drivers execute sequential selections according to the black insertion timing described above are as follows.

As shown in FIG. 6, VSP_i indicating a start of a frame is inputted to the gate driver 44-1 (gate driver (1)) from the black insertion driving part 51 along with VOE_i (video start pulse inputting step).

This VSP_i shifts the gate lines V1-1 to V1-j as a gate-on signal by synchronizing with the clock signal (VCK) that is inputted as well, and sets on TFTs of the pixels 42 in each of the gate lines V1-1 to V1-j. During this period, VOE_i is inputted to the gate driver 44-1 (gate driver (1)).

Subsequently, after scanning by the gate driver 44-1 (gate driver (1)) ends, VSP_i is shifted and inputted to the gate driver 44-2 (gate driver (2)) and, simultaneously with this input, VOE_i is inputted to the gate driver 44-2 (gate driver (2)) from the black insertion driving part 51.

The gate driver 44-2 (gate driver (2)) has VSP_i shift the corresponding gate lines V2-1 to V2-j as the gate-on signal. During this period, VOE_i is inputted also to the gate driver 44-2 (gate driver (2)).

Thereafter, VSP_i is shifted and inputted to the gate driver 44-i (gate driver i) in the same manner, and VOE_i is inputted from the black insertion driving part 51 simultaneously.

The gate driver 44-i (gate driver i) also has VSP_i shift the corresponding gate lines Vi-1 to Vi-j as the gate-on signal, and VOE_i is inputted during this period (video scanning step).

Further, VOE_b is inputted to the gate drivers 44-1 to 44-i in other periods.

Furthermore, according to the timing determined in accordance with the specific black insertion rate, VSP_b from the black insertion driving part 51 is inputted to the gate driver 44-1 (gate driver (1)) once within a frame period (black display scanning start pulse inputting step).

Also, VSP_b shifts the corresponding gate lines V1-1 to V1-j as a gate-on signal with the clock signal (VCK) of the gate driver 44-1 (gate driver (1)), and sets on TFTs of the pixels 42 in each of the gate lines V1-1 to V1-j. During this period of black image display scanning, VOE_b is inputted to the gate driver 44-1 (gate driver (1)).

When black image display scanning by the gate driver 44-1 (gate driver (1)) ends, VSP_b is shifted and inputted to the gate driver 44-2 (gate driver (2)), and VSP_b shifts the corresponding gate lines V2-1 to V2-j as the gate-on signal. During this shifting period, VOE_b is inputted also to the gate driver 44-2 (gate driver (2)).

Thereafter, VSP_b is shifted and inputted to the gate driver 44-i (gate driver i) in the same manner, and black image insertion scanning in the gate driver 44-i (gate driver 44-i) is started (black scanning step).

(2) Scanning Backlight Drive Control Processing

Next, details of scanning backlight drive that is a feature of this exemplary embodiment will be described. Prior to that, "internal structure of backlight unit" as a premise will be described shortly. Thereafter, "light-up control of backlight blocks" and "optimum set values for each parameter" will be described in this order.

(Internal Structures of Backlight Unit)

Figure 8:
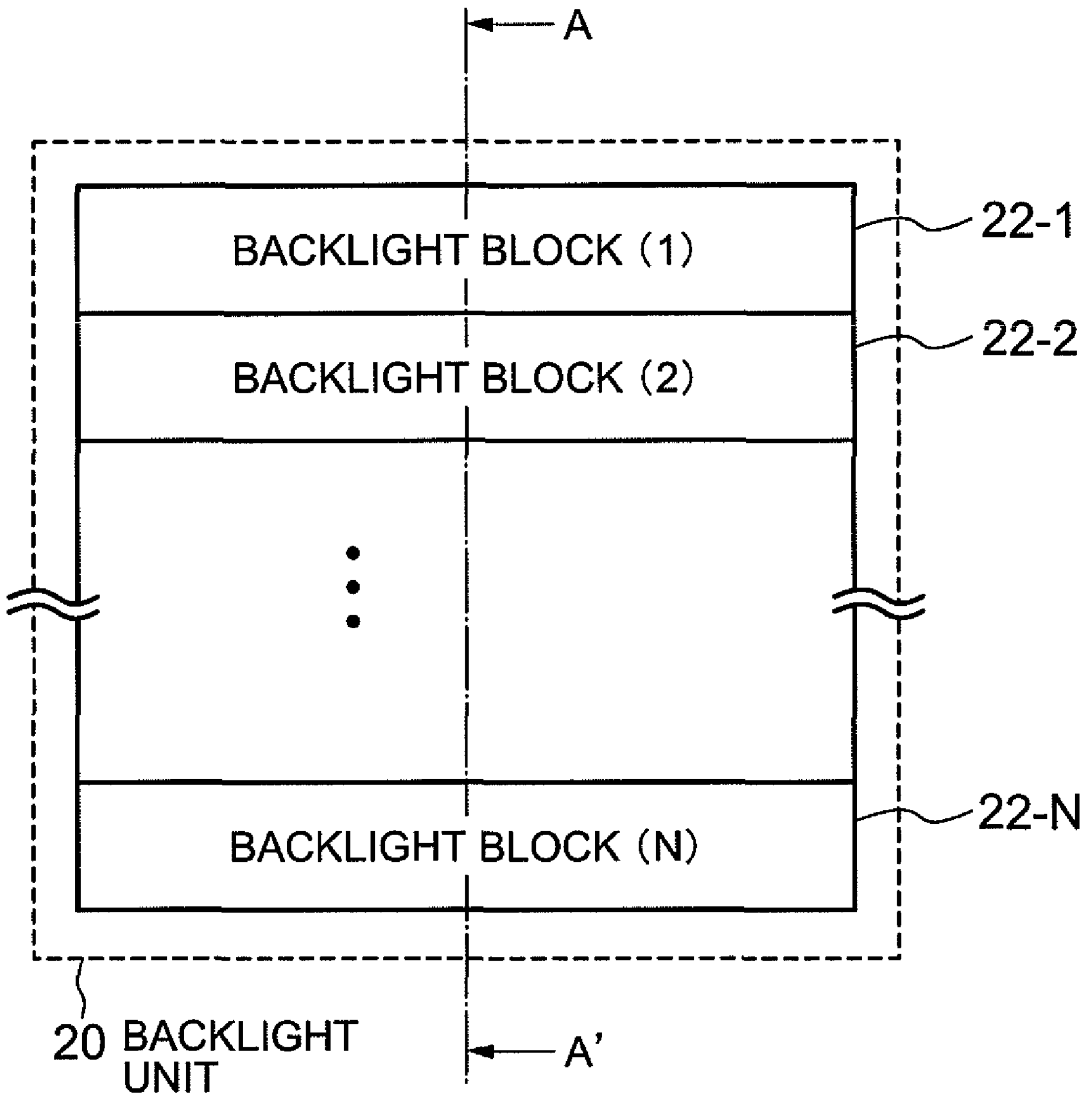
FIG. 8 is an explanatory diagram showing an example of detailed structures of a backlight unit of the liquid crystal display device shown in FIG. 1.
Figure 9:
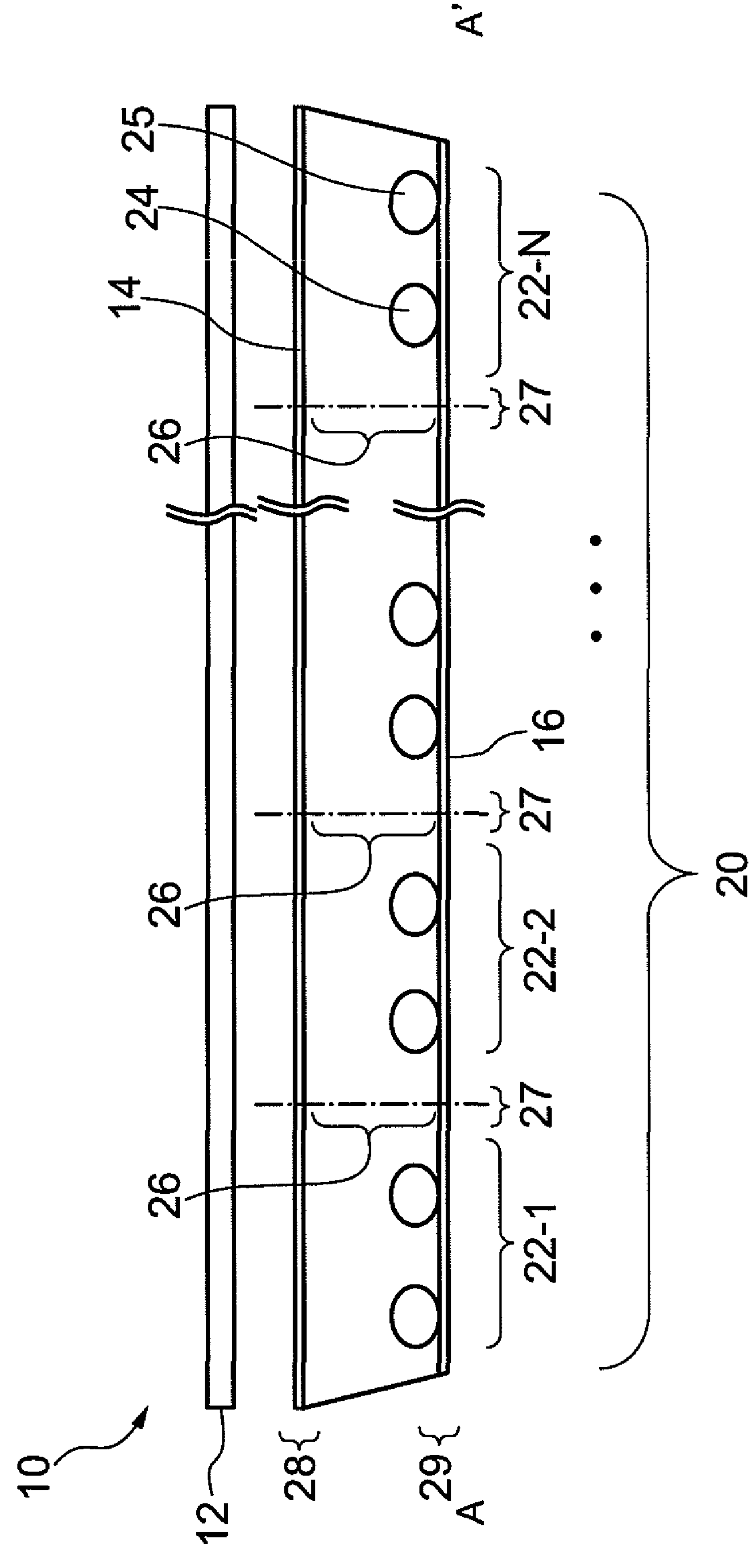
FIG. 9 is a sectional view showing an example of a sectional structure of the backlight unit of FIG. 8 taken along line A-A'.

FIG. 8 and FIG. 9 show the internal structures of the backlight unit according to this exemplary embodiment. As shown in FIG. 8, the backlight unit 20 has a plurality of divided backlight blocks (light source blocks) 22-1 to 22-N. Each of the backlight blocks 22-1 to 22-N is arranged in parallel to the line sequential scanning direction of the liquid crystal display panel 10.

FIG. 9 shows the sectional structure of the backlight unit 20. FIG. 9 is a sectional view of the backlight unit 20 shown in FIG. 8 taken along the line A-A'.

As shown in FIG. 9, the backlight unit 20 is formed on the back-face side (back-face part) of the liquid crystal display panel 10 by opposing to a substrate part 12 that configures the liquid crystal display panel main body. The substrate part 12 is formed by a transparent substrate, and it transmits light from the backlight unit 20. The substrate part 12 may be an array substrate of the liquid crystal display panel main boy side or a counter substrate.

The backlight unit 20 has a light diffusing part 14 over a top part 28 of the substrate part 12 side. The light diffusing part 14 is formed with a diffusion plate, a diffusion sheet, a lens sheet, etc. It is preferable for the light diffusing part 14 to be formed by stacking those sheets. The sheet structure of the light diffusing part 14 can be selected in accordance with a desired display performance. Further, the backlight unit 20 has a light reflecting part 16 over a bottom part 29 that is the opposite-side face from the substrate part 12. The light reflecting part 16 is formed with a reflection sheet, for example.

A single backlight block 22-1 has a plurality of light sources 24 and 25 formed on the light reflecting part 16. In the case of FIG. 9, there are two light sources formed in the single backlight block 22-1. However, the number of light sources is not limited to two. The light source 24 may be configured with CCFL, LED, and the like, for example. The light sources 24 and 25 contained in the single backlight block 22-1 are controlled to light up and off collectively.

Note here that the structure of block boundary parts 27 between each of the backlight blocks 22-1 to 22-N may simply be in such a form with which light leaks and reaches at least to the neighboring backlight blocks. In this exemplary embodiment, as show in FIG. 9, it is so formed that the light source 24 is disposed on the flat light reflecting part 16, and the boundary part 27 between each of the backlight blocks has no protruded structure but has a space part 26.

Figure 10:
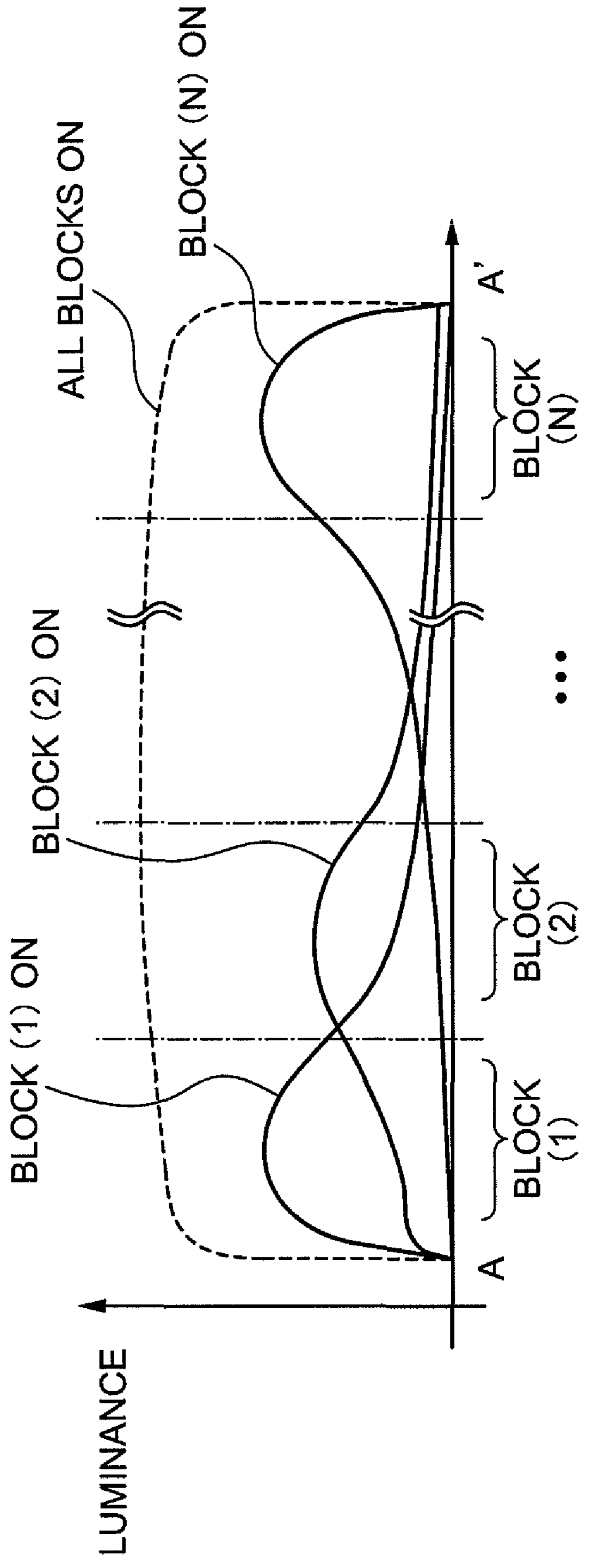
FIG. 10 is an explanatory diagram showing an example of luminance distributions of N-number of backlight blocks in the sectional structure of the backlight unit shown in FIG. 9.

As shown in FIG. 10, this is a structure where light from a light-up block leaks to the neighboring backlight block, when each of the backlight blocks 22-1 to 22-N is lighted up individually.

(Light-Up Control of Backlight Block)

Figure 11:
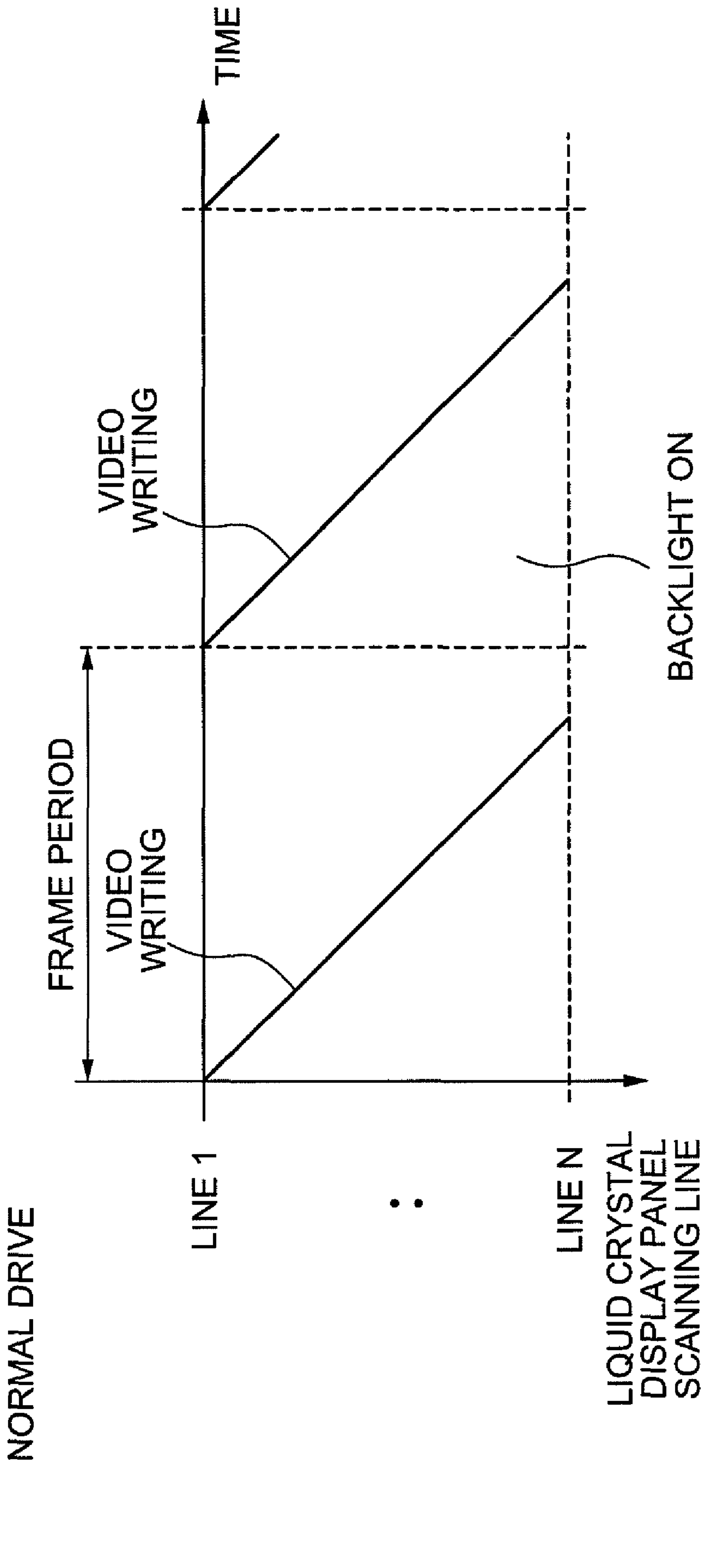
FIG. 11 is an explanatory diagram for describing an example of light-up period of a backlight when writing a video signal in normal drive performed in the liquid crystal display device.
Figure 12:
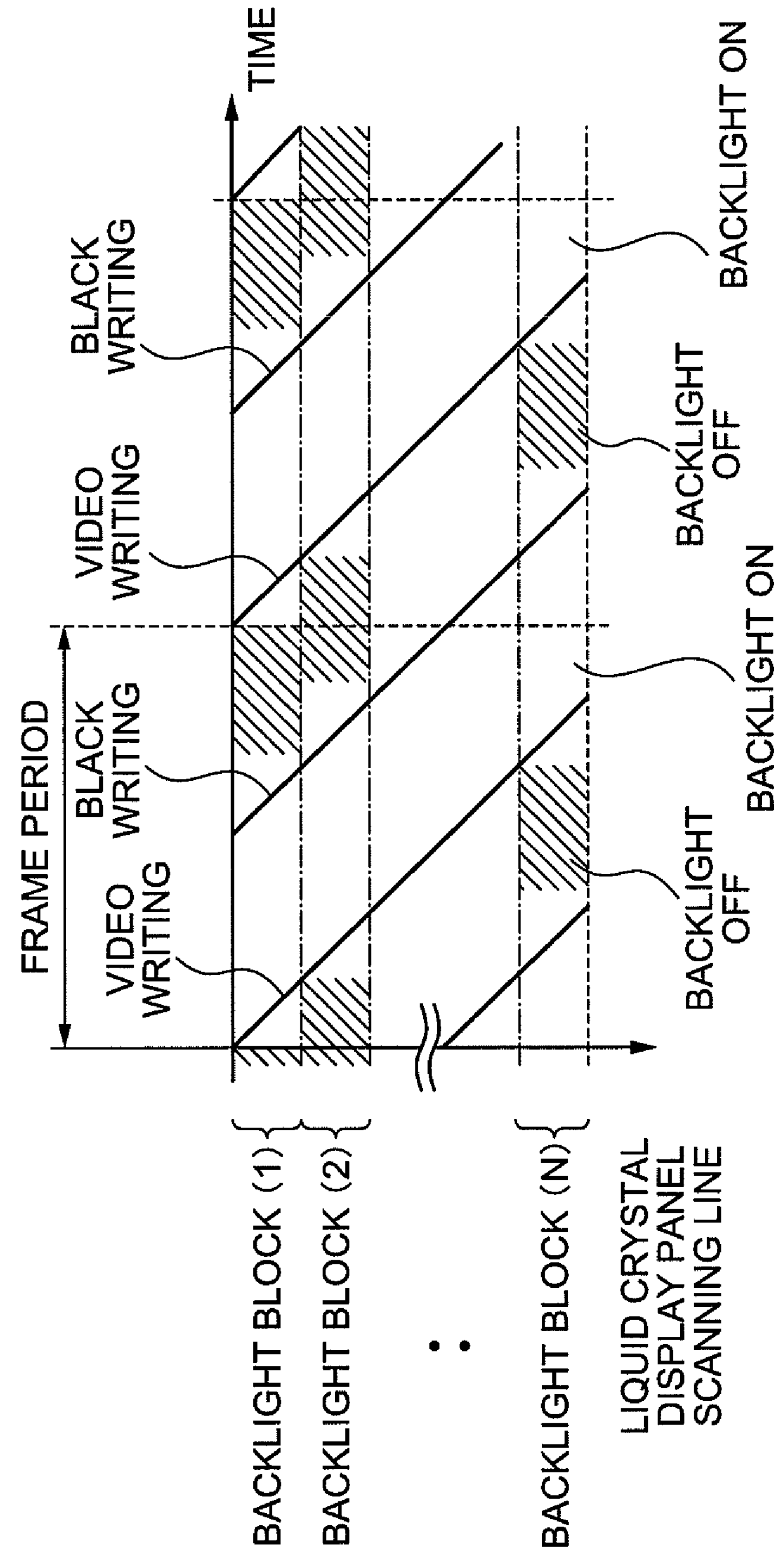
FIG. 12 is an explanatory diagram for describing an example of a corresponding relation between a black insertion period and a light-up period as well as a light-off period of the N-number of backlight blocks in scanning backlight drive performed in the liquid crystal display device according to the first exemplary embodiment of the invention.

FIG. 11 and FIG. 12 show the details of light-up control of each light source block performed in the scanning backlight drive of this exemplary embodiment.

As shown in FIG. 12, the light-up control of the backlight is so performed that light up and off are executed sequentially by shifting the time by each backlight block in accordance with the time where the black image signal is scanned in the liquid crystal display panel area located in front of each of the backlight blocks.

Figure 13:
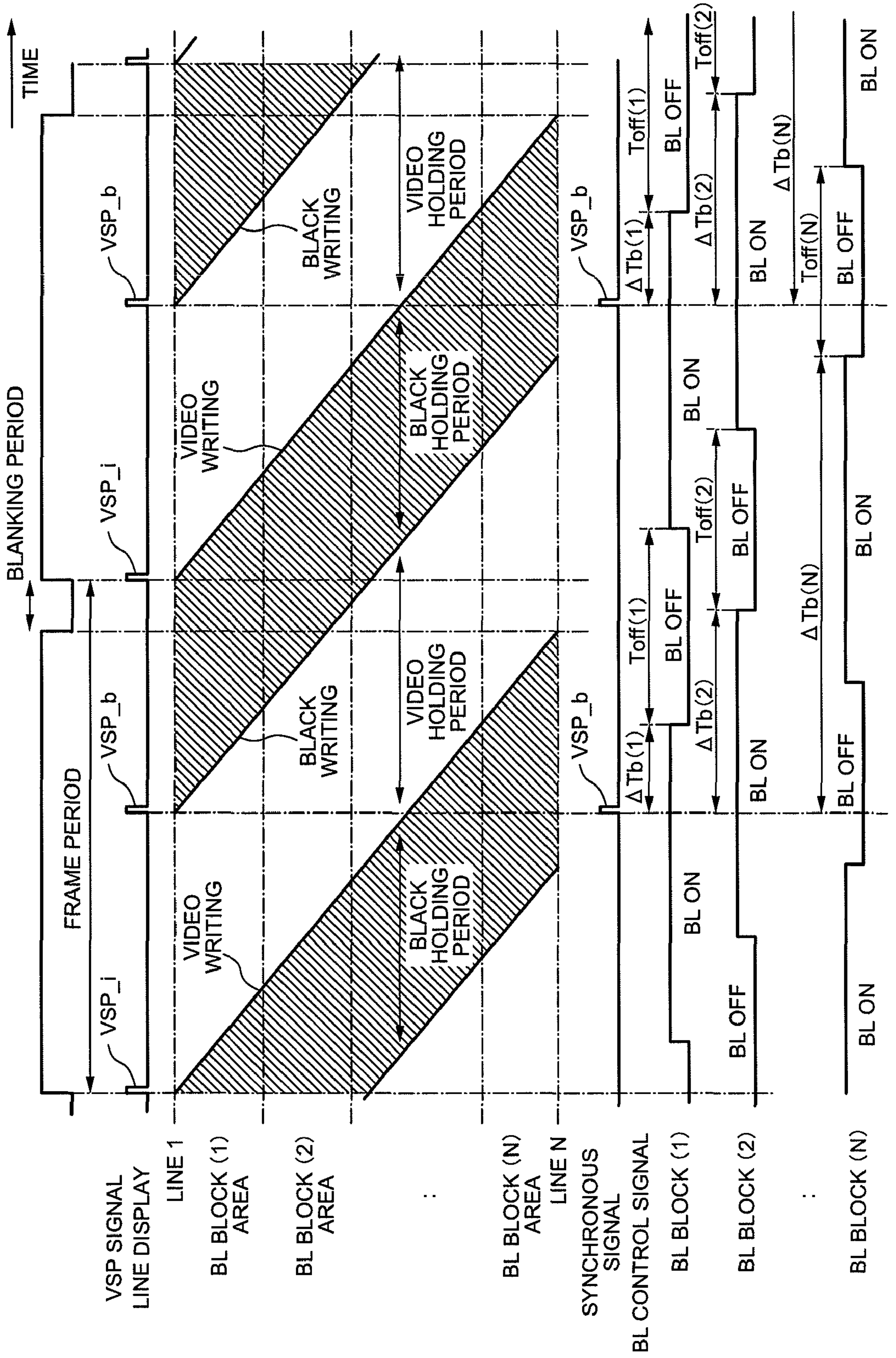
FIG. 13 is an explanatory diagram for describing an example of details of light-up timing control of the N-number of backlight blocks in scanning backlight drive performed in the liquid crystal display device according to the first exemplary embodiment of the invention.

For example, as shown in FIG. 13, a synchronous signal is generated by having the above-described black display scanning start pulse (VSP_b) as the reference, and performs the light-up timing control with a BL control signal based on the synchronous signal. At this time, the light-off start time (ΔTb (n)) of the (n)-th backlight from the writing start side to the line sequential scanning direction of the liquid crystal display panel may be in a following expression by having shift in the luminance response of the light source and transmittance response of the liquid crystal display panel (τ) and the number (N) of blocks of the divided backlight blocks as the parameters.

$$\Delta Tb(n)=\tau+Tv\times(V\mathrm{disp}/N)/V\mathrm{total}\times n$$

Liquid crystal display panel driven line number: Vtotal (H)

Liquid crystal display panel display line number: Vdisp (H)

Frame cycle: Tv (s)

Further, the light-off period (Tb) of each backlight block can be expressed as in a following expression with a backlight light-off rate (Xb).

$$Tb=Tv\times Xb$$

While this exemplary embodiment uses the black display scanning start pulse (VSP_b) as the reference for the synchronous signal of the backlight, it is also possible to use the video display scanning start pulse (VSP_i) as the reference.

Next, the liquid crystal display device of this exemplary embodiment using the aforementioned black insertion drive and the scanning backlight drive will be described.

Figure 14:
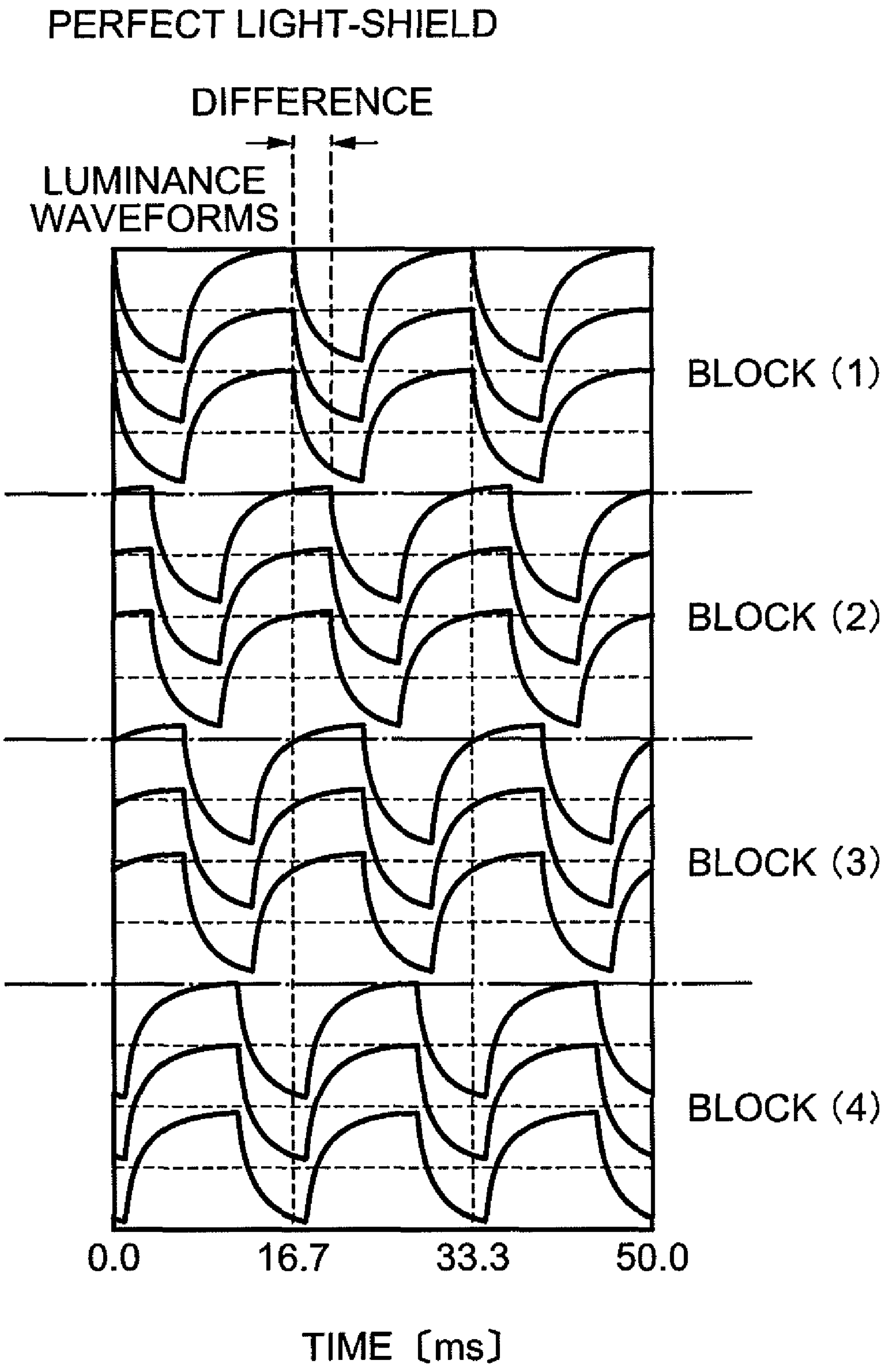
FIG. 14 is an explanatory diagram showing an example of luminance waveforms of each screen part when scanning backlight drive is performed with a perfect light-shielding structure.
Figure 15:
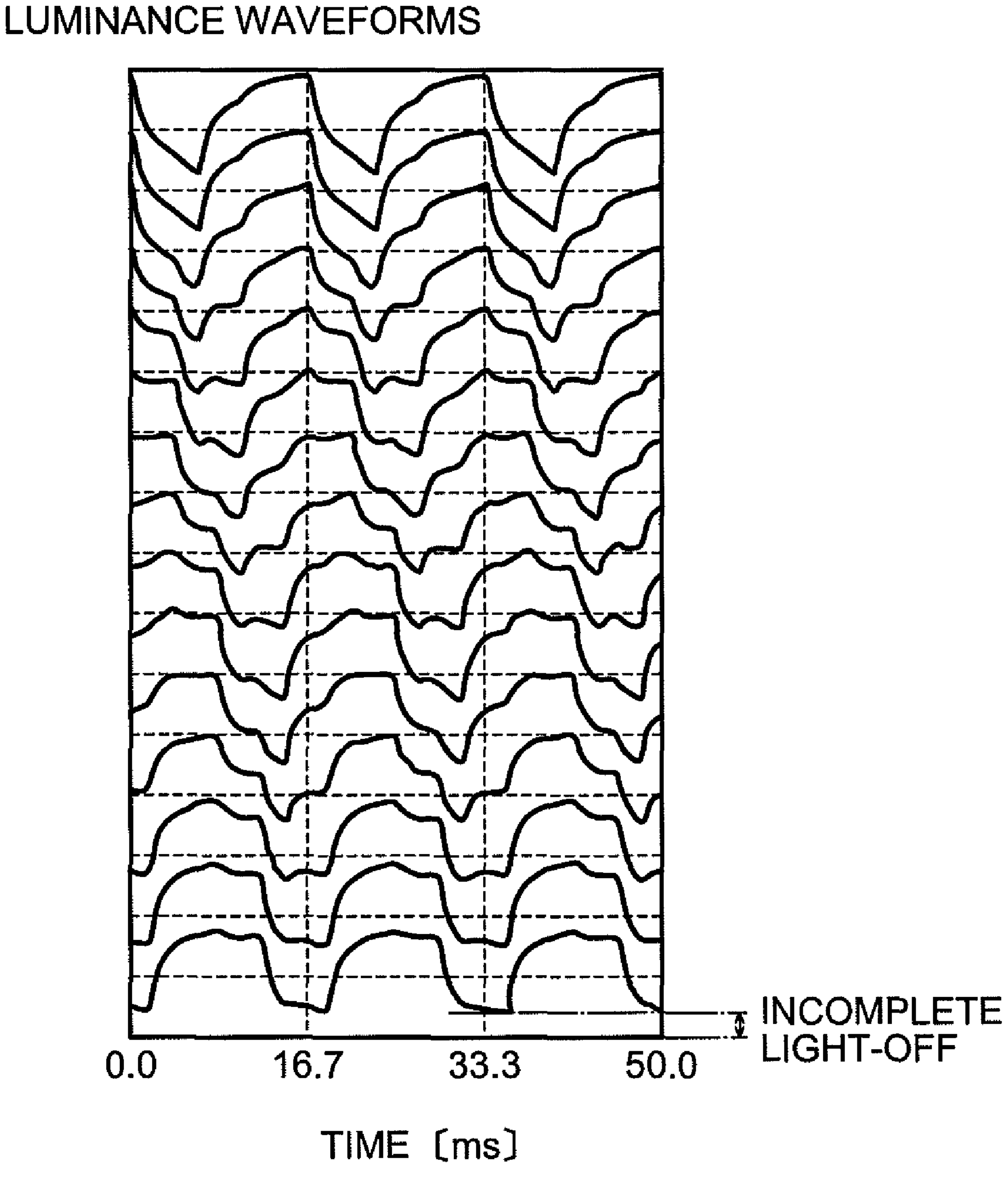
FIG. 15 is an illustration showing an example of luminance waveforms of each screen part when scanning backlight drive is performed with a structure in which light leaks between neighboring backlight blocks of the liquid crystal display device according to the first exemplary embodiment of the invention, which shows a case with four divided backlight blocks (dividing number is 4)
Figure 16:
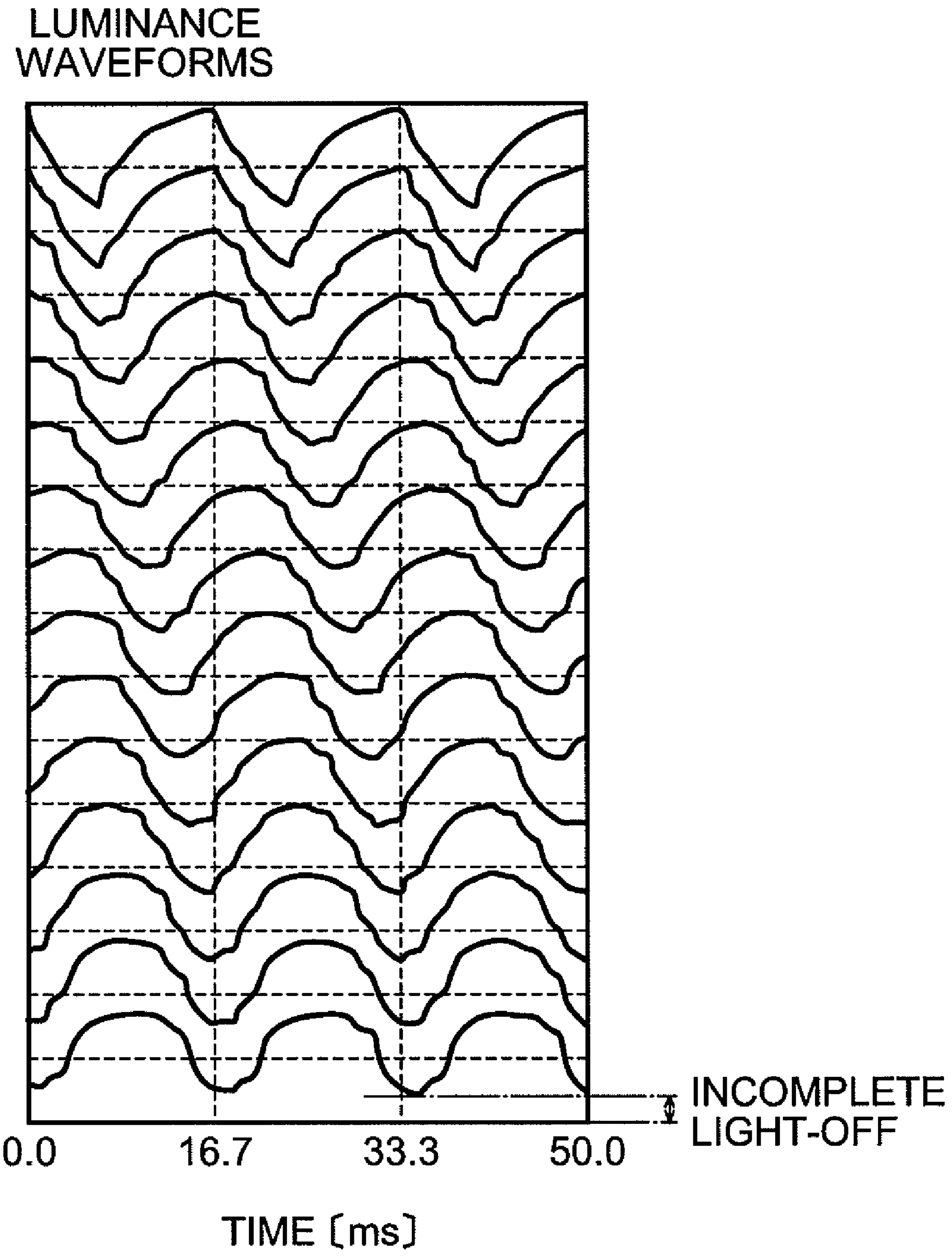
FIG. 16 is an illustration showing an example of luminance waveforms of each screen part when scanning backlight drive is performed with a structure in which light leaks between neighboring backlight blocks of the liquid crystal display device according to the first exemplary embodiment of the invention, which shows a case with eight divided backlight blocks (dividing number is 8)

FIG. 14 to FIG. 16 show the luminance waveforms of the screens of each of the scanning backlight drive of the light-shielding structure according to the related technique and the luminance waveforms of the scanning backlight drive of this exemplary embodiment in the structure with which the light leaks to the neighboring backlight block.

As shown in FIG. 14, with the backlight scanning drive when the light is completely shielded between the backlight blocks, there is a step generated in the boundary parts between each of the backlight blocks in the luminance waveform of that scanning backlight drive. As a result, there is generated a gap in the moving picture at the boundary parts of the backlight blocks.

FIG. 15 and FIG. 16 show examples of the structure of the liquid crystal display device according to this exemplary embodiment, with which the light reaches to the neighboring light source blocks.

As shown in FIG. 15 and FIG. 16, while the light-off state becomes incomplete due to the light leakage to the neighboring backlight blocks, the luminance difference between the backlight blocks can be eased by increasing the number (dividing number) of the backlight blocks to be in a fractionalized form.

Figure 17:
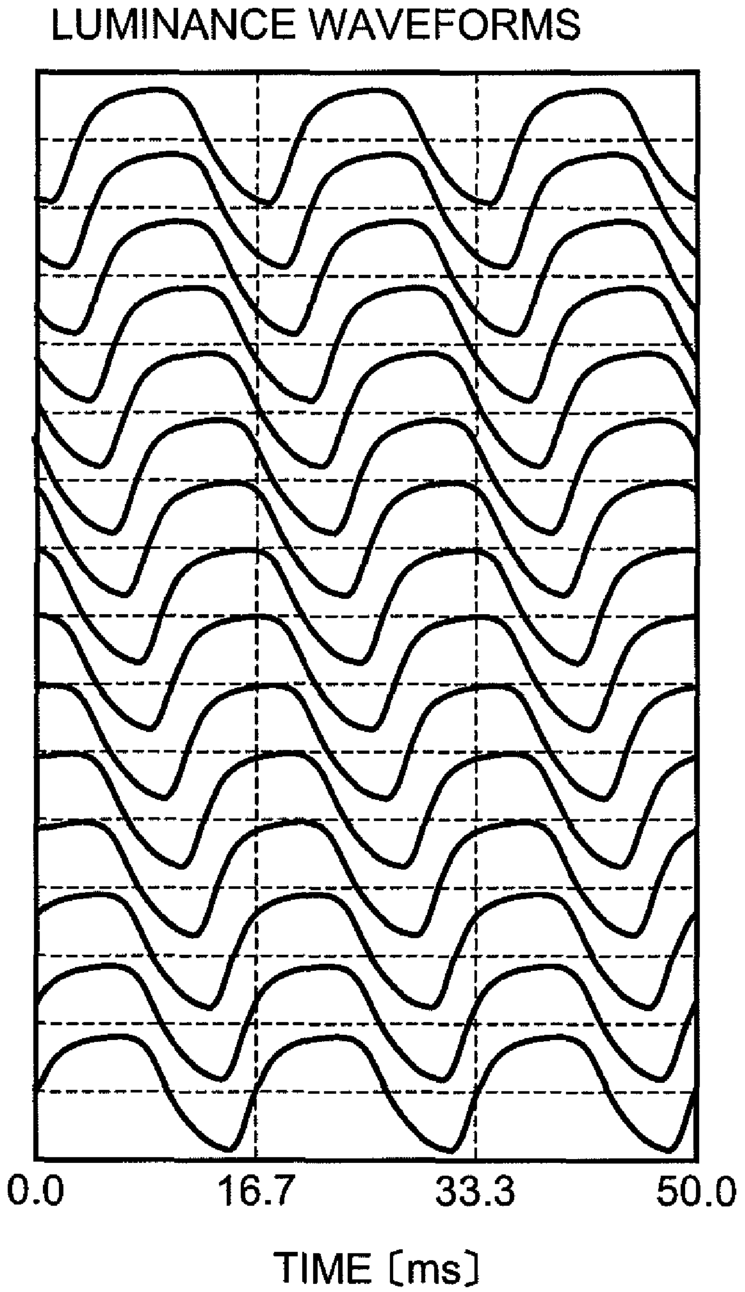
FIG. 17 is an explanatory diagram showing luminance waveforms of each screen part when black insertion drive is performed in the liquid crystal display device.
Figure 18:
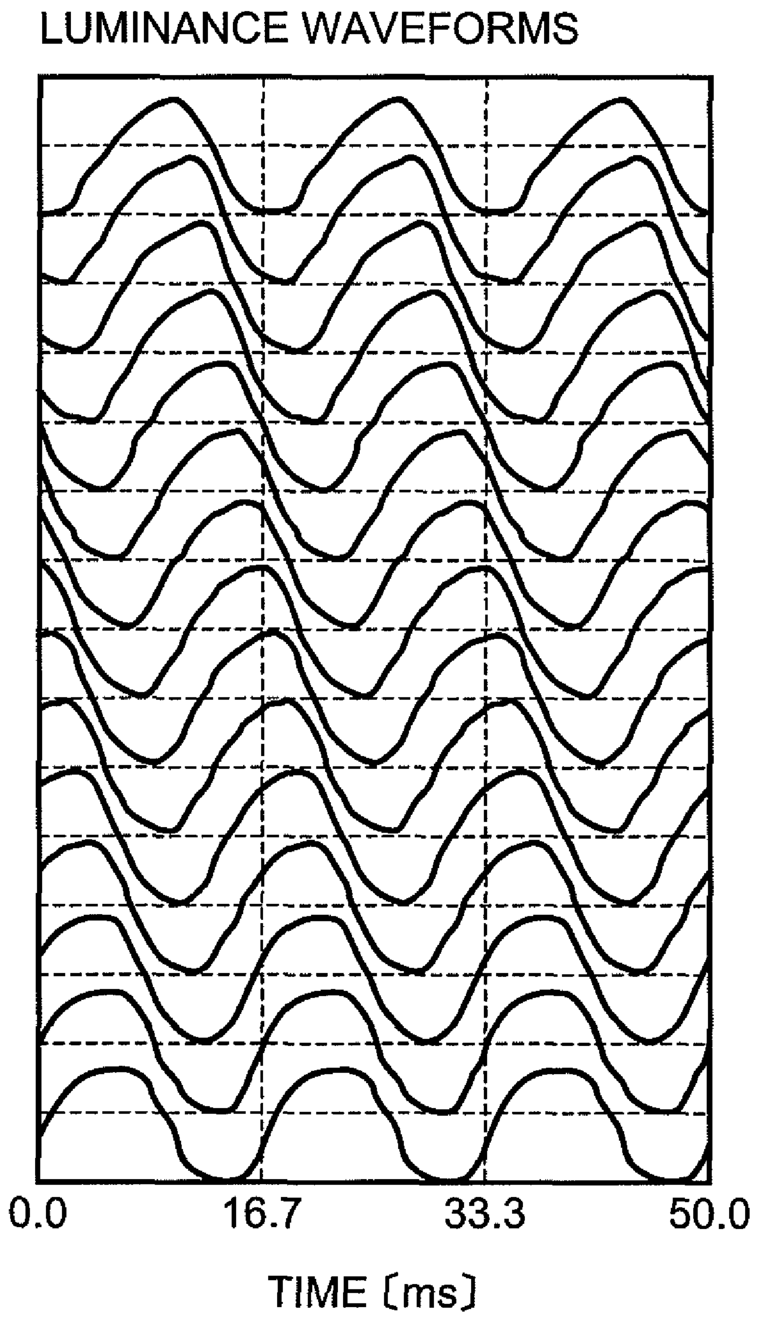
FIG. 18 is an explanatory diagram showing an example of luminance waveforms of each screen part when light-up timing control of the backlight blocks is performed by synchronizing with the timing of the black insertion drive in the liquid crystal display device according to the first exemplary embodiment of the invention.

FIG. 17 and FIG. 18 show the luminance waveforms of each screen part of the liquid crystal display device when black insertion drive is performed, and the luminance waveforms of each screen part of the liquid crystal display device when black insertion drive is performed to the scanning backlight.

FIG. 17 shows the transmittance waveforms of each screen part when only the black insertion drive is performed in the liquid crystal display device of this exemplary embodiment.

Further, when the black insertion drive is performed by synchronizing with the timings by having the scanning backlight of this exemplary embodiment described above as the light source (combine the black insertion drive with the scanning backlight drive), the liquid crystal display device of this exemplary embodiment takes the luminance distribution as in FIG. 18.

As shown in FIG. 17 and FIG. 18, the incomplete light-off state in the scanning backlight drive described above caused due to the light leakage to the neighboring backlight blocks can be improved to a complete light-off state through performing the black insertion by synchronizing with the timing at which the panel transmittance of the black insertion drive becomes the minimum.

Further, in the case of employing only the scanning backlight drive with which the light leaks to the neighboring backlight blocks, the luminance difference between the backlight blocks still exist even though it is eased. However, it can be seen that the luminance continuously shifts in the scanning direction when the continuous transmittance waveforms of the black insertion drive are combined therewith.

Figure 21:
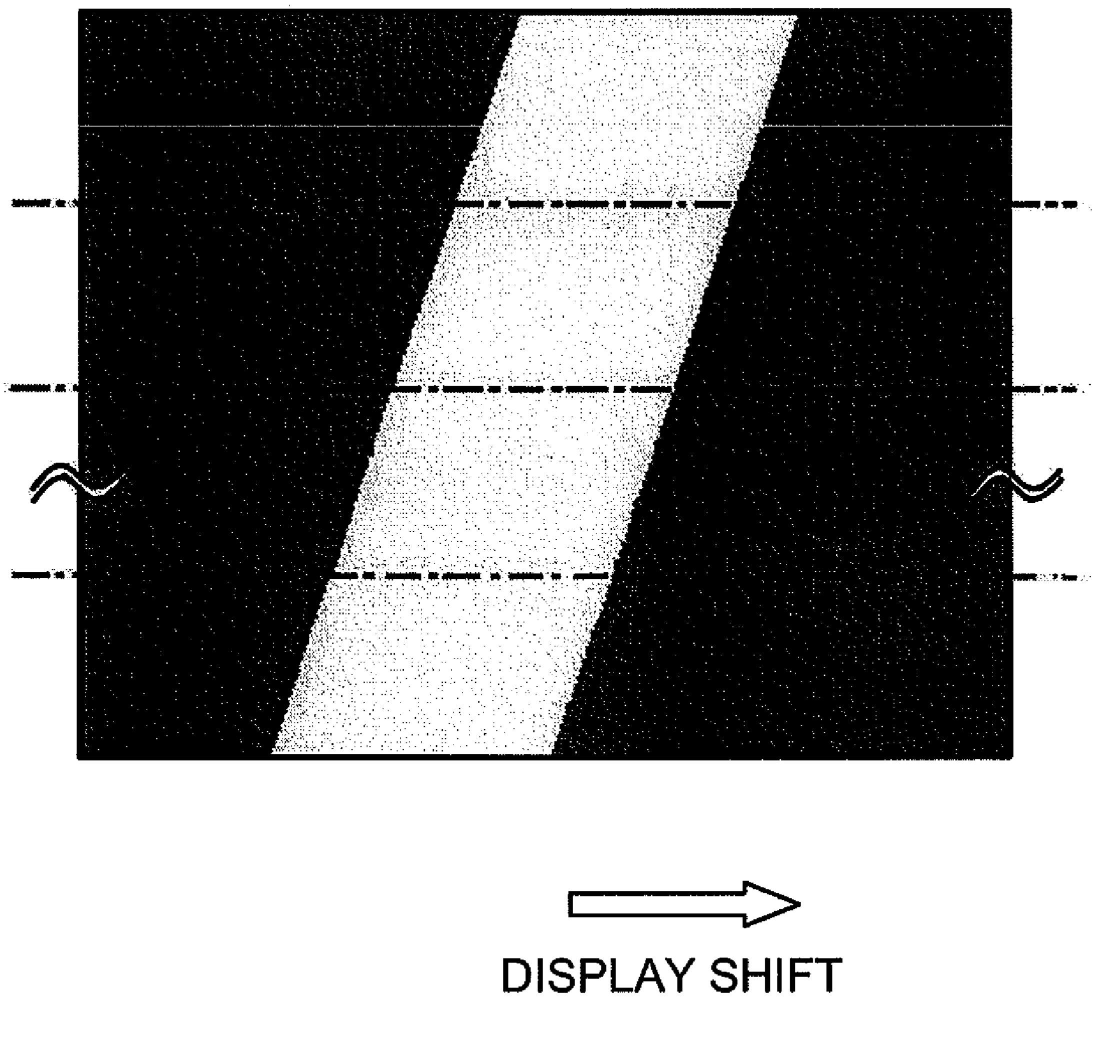
FIG. 21 is an explanatory diagram showing an example of a moving picture when scanning backlight drive is performed in the liquid crystal display device according to the first exemplary embodiment of the invention.

FIG. 21 shows a moving picture obtained with the first exemplary embodiment.

Figure 20:
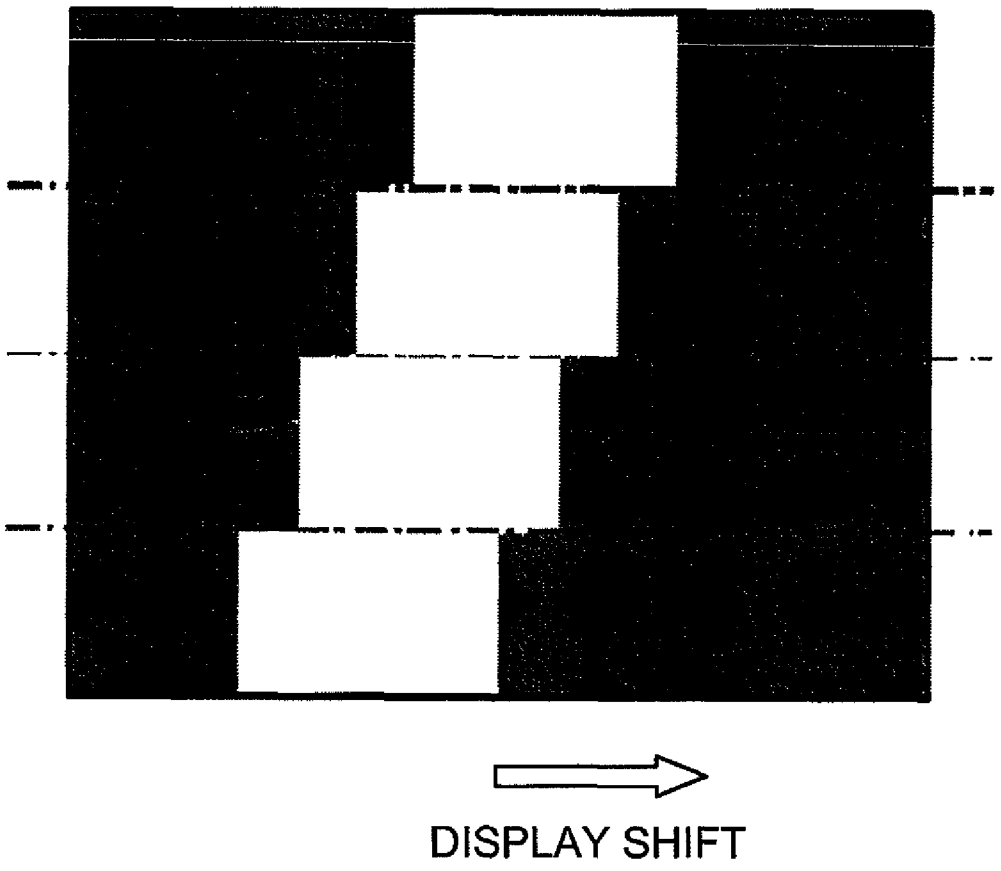
FIG. 20 is an explanatory diagram showing an example of a moving picture when scanning backlight drive is performed in a liquid crystal display device of a related technique with perfect light-shielding structure.

The structure of this exemplary embodiment can have the continuous waveforms in the scanning direction, through: having the gap parts 26 where the light reaches to the neighboring backlight blocks so that the luminance difference between the backlight blocks causing the gap in the moving picture can be eased; and combining the continuous transmittance waveforms of the black insertion drive. Therefore, there is no gap of the moving picture generated, unlike the case of the scanning backlight drive of the related technique as in FIG. 20.

Figure 19:
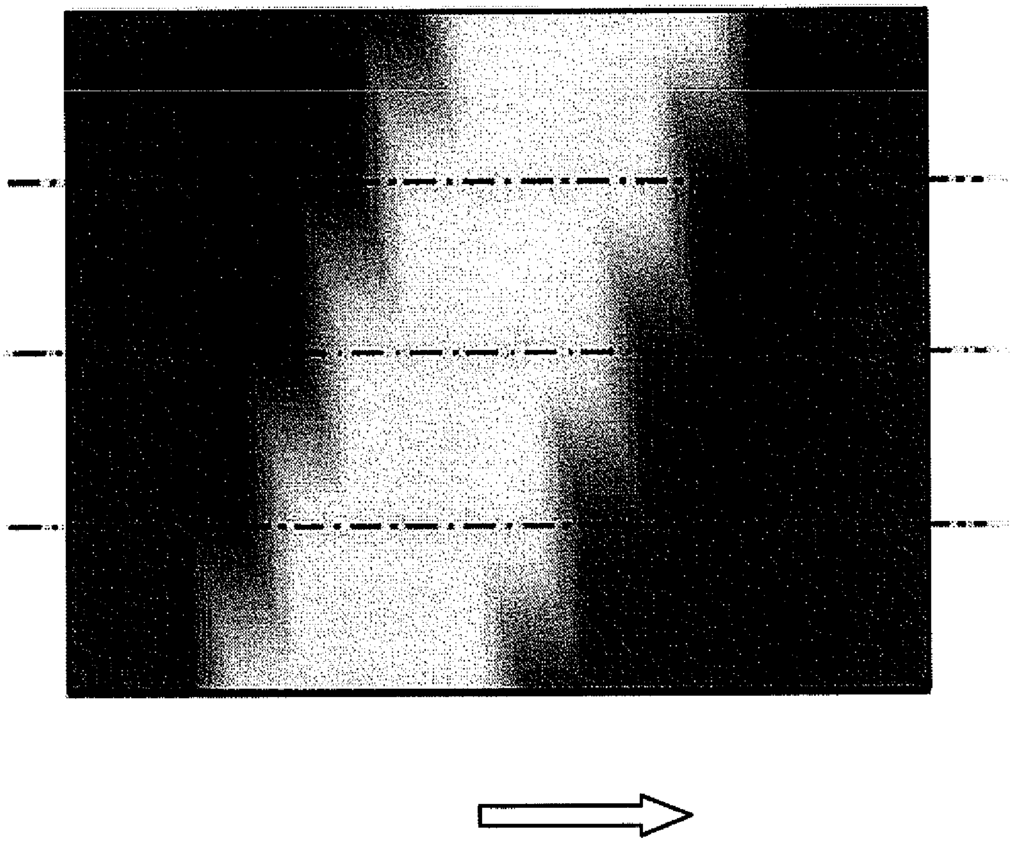
FIG. 19 is an explanatory diagram showing an example of a moving picture when scanning backlight drive is performed in a liquid crystal display device of a related technique with no light shielding structure.

Further, the incomplete light-off state in the scanning backlight drive described above caused due to the light leakage to the neighboring backlight blocks can be improved to a state with a low luminance level when the light is off, through performing the black insertion by synchronizing with the timing at which the panel transmittance of the black insertion drive becomes the minimum. Thus, there is no generation of ghost image, unlike the case of the scanning backlight drive of the related technique as in FIG. 19.

Thus, as shown in FIG. 21, it is possible to improve the motion blur of the moving picture uniformly on the whole screen.

Furthermore, coloring in the motion blur of the moving picture caused in the case of CCFL and the time zones where coloring in the scanning backlight drive occurs can be lightened by setting the parameters in such a manner that the panel transmittance in the black insertion drive becomes the minimum. This can be applied to any kinds of light sources.

Further, the light-shielding structure is excluded, so that the display unevenness due to the individual difference is the light sources can be lightened, and it is unnecessary to perform the luminance control of the light source by each backlight block as in the case or the normal drive. Furthermore, since the light-shielding structure is omitted, the number of components is decreased, and there is no dark display line that is generated due to a shadow of the light-shielding wall. Moreover, this exemplary embodiment can be achieved with the practically achievable number (dividing number) of divided blocks of the backlight.

With the exemplary embodiment described above, it is possible to configure the comprehensively excellent display device with a low-cost structure with which the picture quality deterioration such as the increase in the power consumption, deterioration of the contrast, generation of the luminance unevenness, and generation of gap in the moving picture can be lightened, and the motion blur of the moving picture can be improved.

(Optimum Set Values for Each Parameter)

Details of each parameter of this exemplary embodiment will be described in detail hereinafter.

As described above, this embodiment can provide the maximum effects through performing optimization in accordance with an electro-optics response of the display panel (the transmittance response of the liquid crystal display panel, for example) in the black insertion drive, the luminance response of the light source in the scanning backlight drive, and the speed of the line sequential scanning of the black insertion drive by having the black insertion rate (Xp) of the black insertion drive, the dividing number (N) of the scanning backlight drive, the light-off rate (Xp) of the backlight drive, and the correction constant (τ) for the luminance response of the backlight and the transmittance rate of the liquid crystal display panel as the parameters.

FIG. 22 to FIG. 26 show the optimum set values and the results obtained thereby, when an IPS mode is employed for the liquid crystal display panel and CCFL is used for the light source of the scanning backlight drive.

Figure 22:
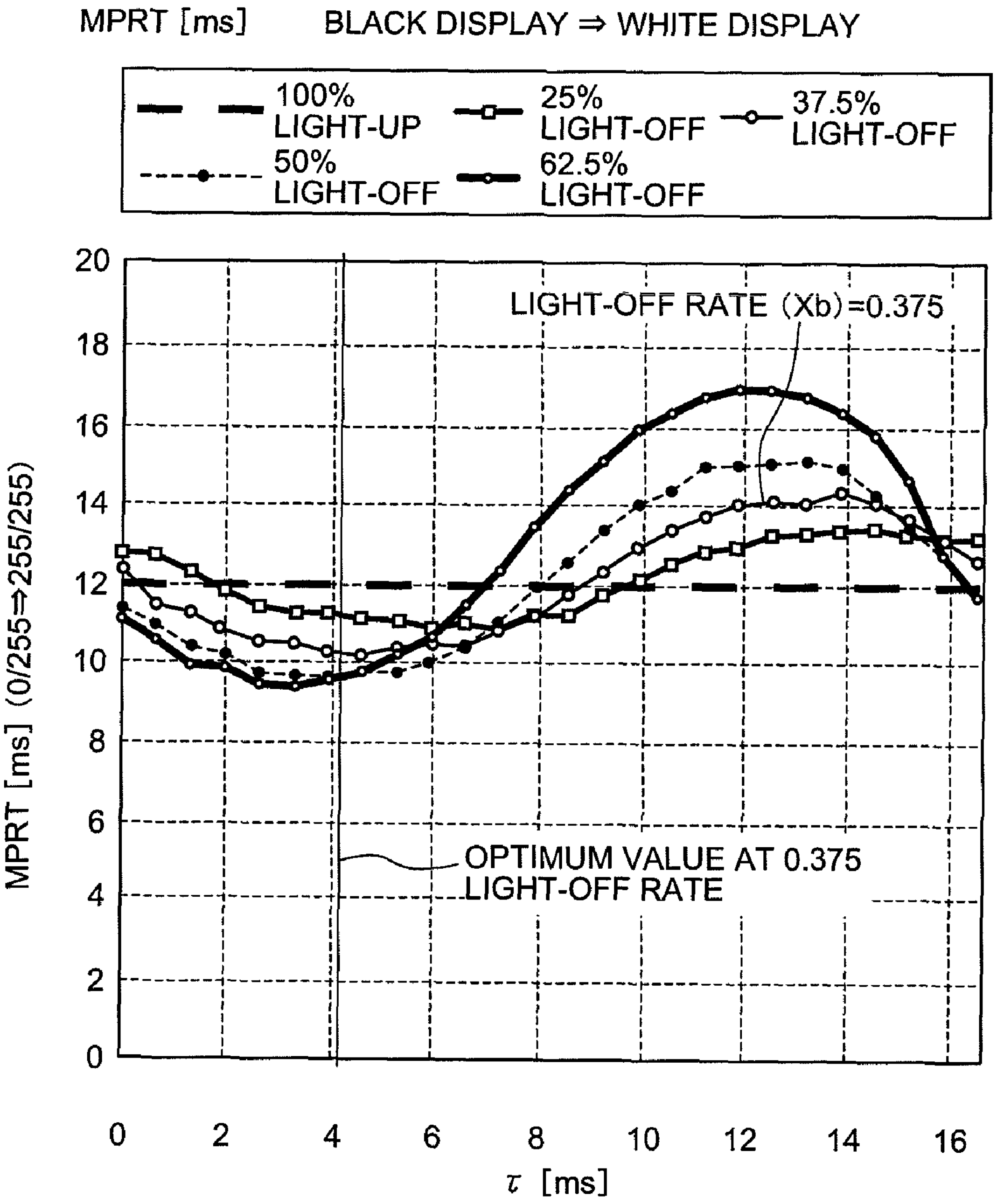
FIG. 22 is an illustration showing an example of a correlation between correction constant (τ) and Moving Picture Response Time (MPRT) with each light-off rate obtained in the liquid crystal display device according to the first exemplary embodiment of the invention, which is an explanatory diagram showing a case of black display→white display.
Figure 23:
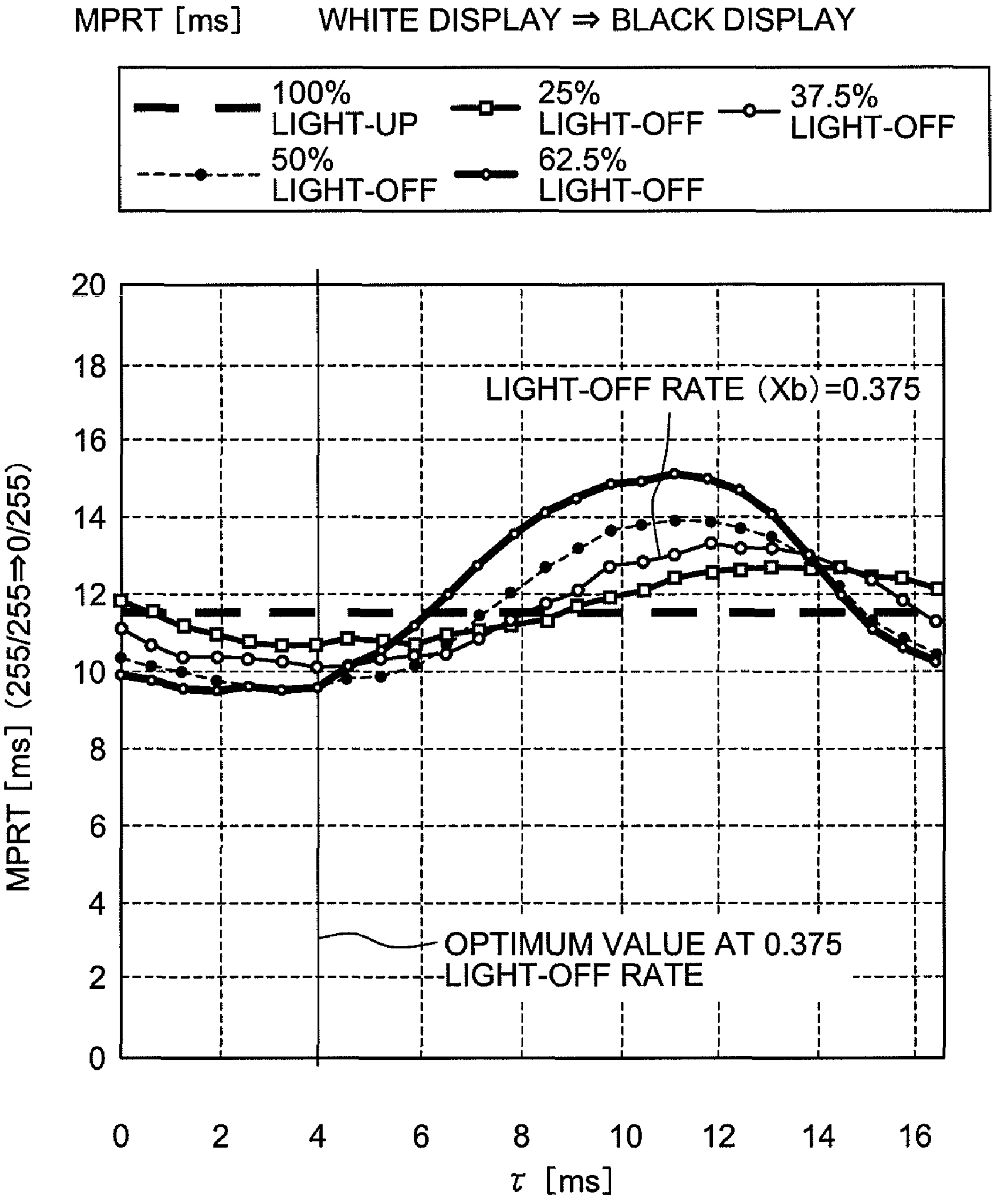
FIG. 23 is an illustration showing an example of a correlation between correction constant (τ) and Moving Picture Response Time (MPRT) with each light-off rate obtained in the liquid crystal display device according to the first exemplary embodiment of the invention, which is an explanatory diagram showing a case of white display→black display.

FIG. 22 and FIG. 23 are illustrations showing the Moving Picture Response Time (MPRT) (it shows with the Blurred Edge Time (BET) from 0/255 to 255/255 step as typical values) which indicate the amount of motion blur in the moving picture of hold-type display device, when the correction constant (τ) is changed under a condition where the backlight is divided into eight blocks (dividing number N=8) and the black insertion rate (Xp) is 0.5.

Figure 24:
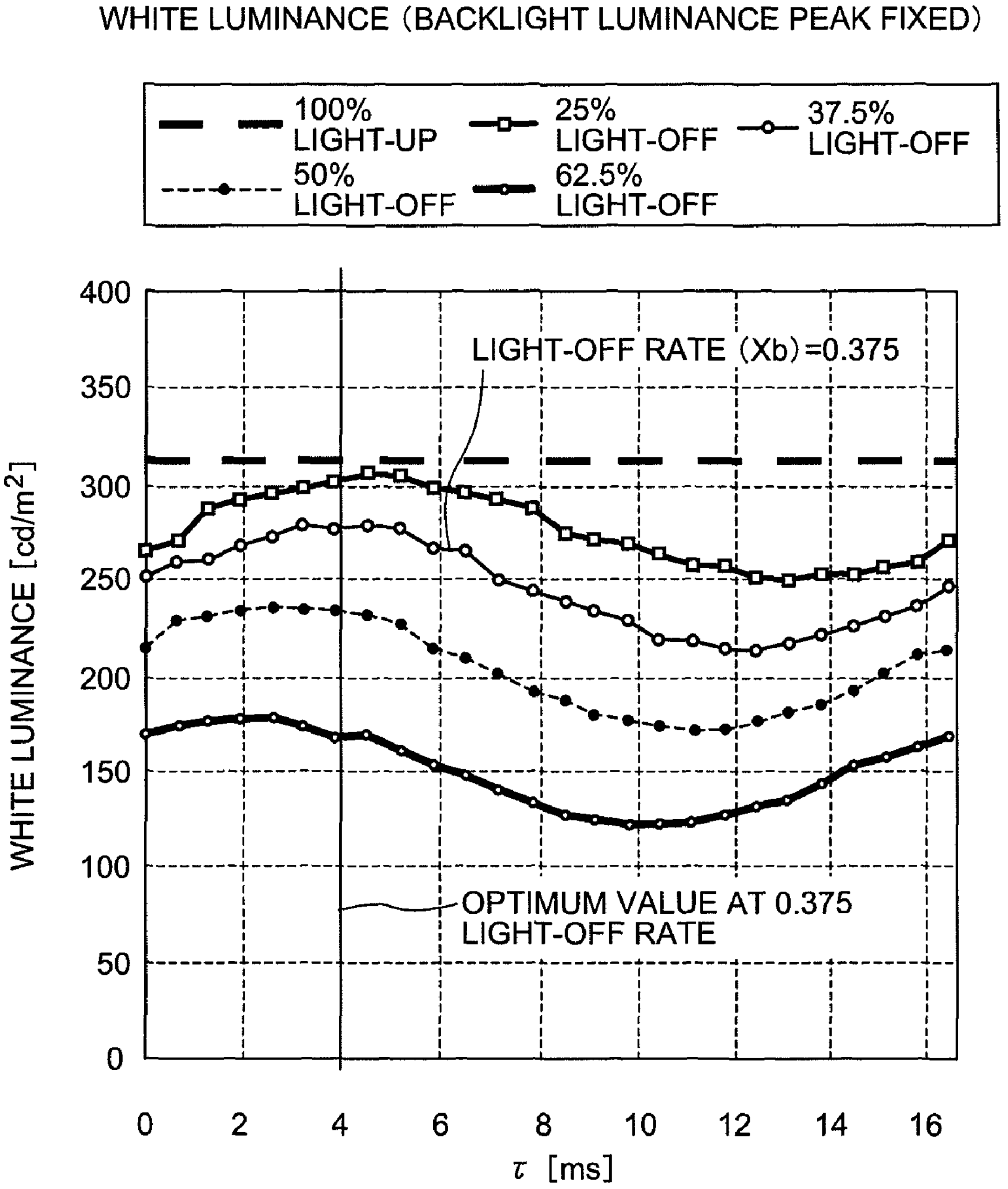
FIG. 24 is an illustration showing an example of a correlation between correction constant (τ) and white luminance with each light-off rate obtained in the liquid crystal display device according to the first exemplary embodiment of the invention.
Figure 25:
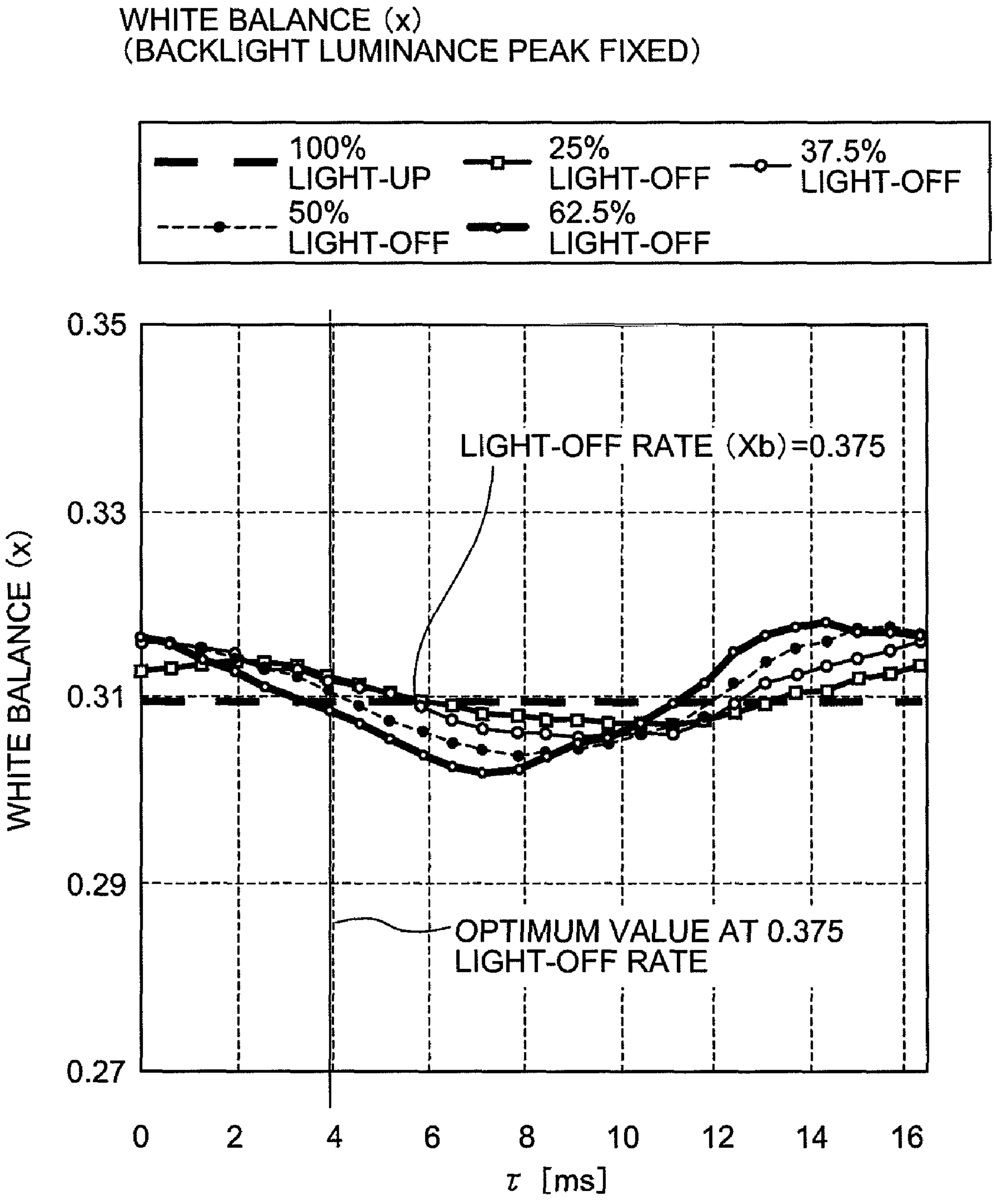
FIG. 25 is an illustration showing an example of a correlation between correction constant (τ) and white balance (x) with each light-off rate obtained in the liquid crystal display device according to the first exemplary embodiment of the invention.
Figure 26:
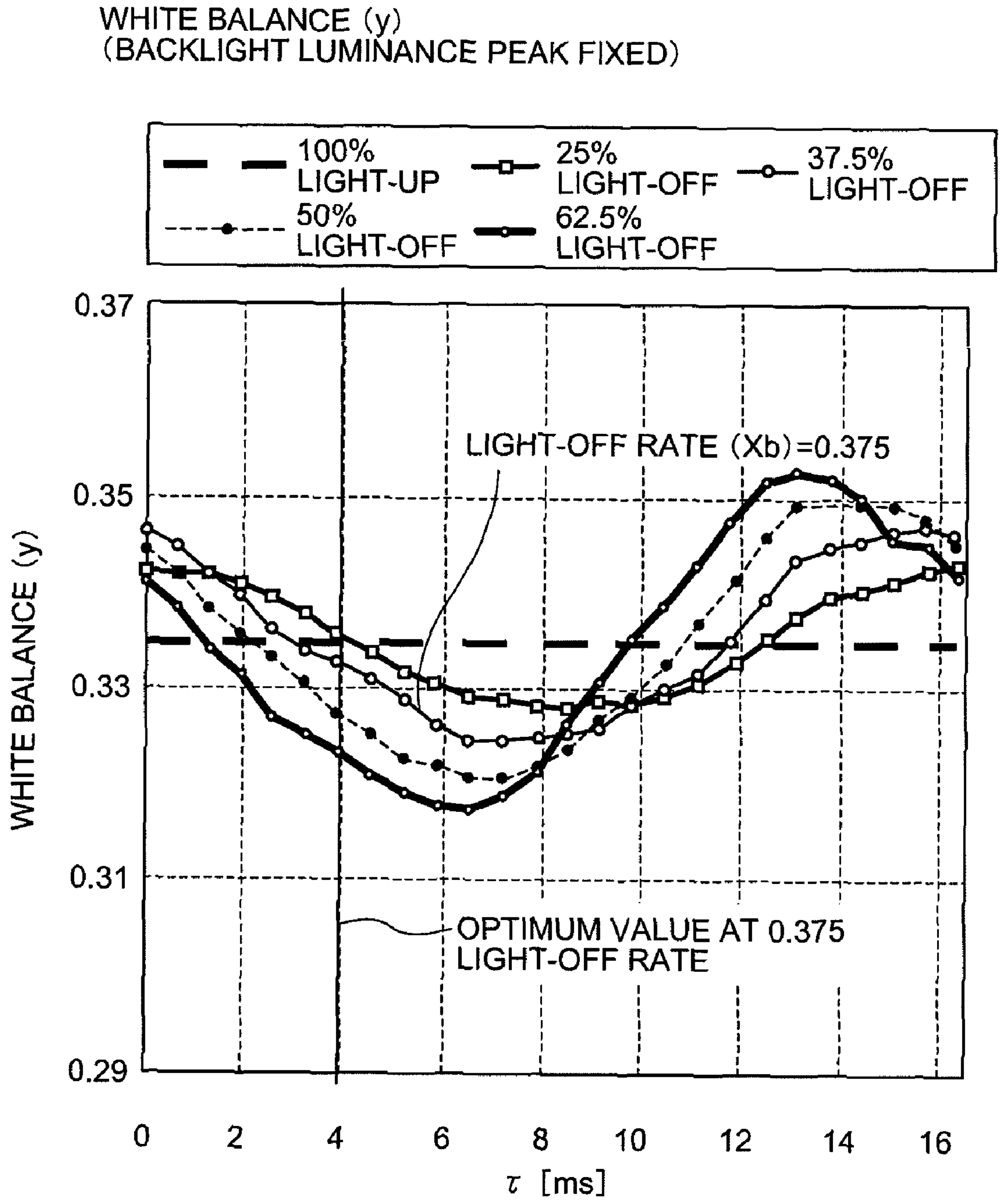
FIG. 26 is an illustration showing an example of a correlation between correction constant (τ) and white balance (y) with each light-off rate obtained in the liquid crystal display device according to the first exemplary embodiment of the invention.

FIG. 24 shows the white luminance, and FIG. 25 and FIG. 26 show the white balance of white display. Each measurement is conducted at the block boundary part of the scanning backlight where the picture quality change due to the correction constant (τ) is significant.

As a way of example, FIG. 22 to FIG. 26 show the optimum values of the correction constant (τ) when the light-off rate (Xb) of the backlight is 0.375.

As shown in FIG. 22, when the light-off rate (Xb) is 0.375 in a case of changing from black display to white display, Moving Picture Response Time (MPRT) becomes the minimum when the correction constant (τ) takes the optimum value. Further, as shown in FIG. 23, when the light-off rate (Xb) is 0.375 in a case of changing from white display to black display, Moving Picture Response Time (MPRT) becomes the minimum when the correction constant (τ) takes the optimum value.

Furthermore, as shown in FIG. 24, in a case where the light-off rate (Xb) is 0.375, the white luminance becomes the maximum when the correction constant (τ) takes the optimum value. Moreover, as shown in FIG. 25, in a case where the light-off rate (Xb) is 0.375, the change in the white balance (x) becomes small when the correction constant (τ) takes the optimum value. Furthermore, as shown in FIG. 26, in a case where the light-off rate (Xb) is 0.375, the change in the white balance (y) becomes small when the correction constant (τ) takes the optimum value.

As described, it can be seen that the motion blur becomes the minimum, while the white luminance becomes the maximum and the change in the white balance becomes small, when the correction constant (τ) takes the optimum value.

Next, shown is the subjective evaluation result of the blurring in the moving picture and coloring in the motion blur under a condition where the correction constant (τ) takes the optimum value, and the number (dividing number: N) of the backlight blocks as well as the light-off rate (Xb) is changed.

Figure 27:
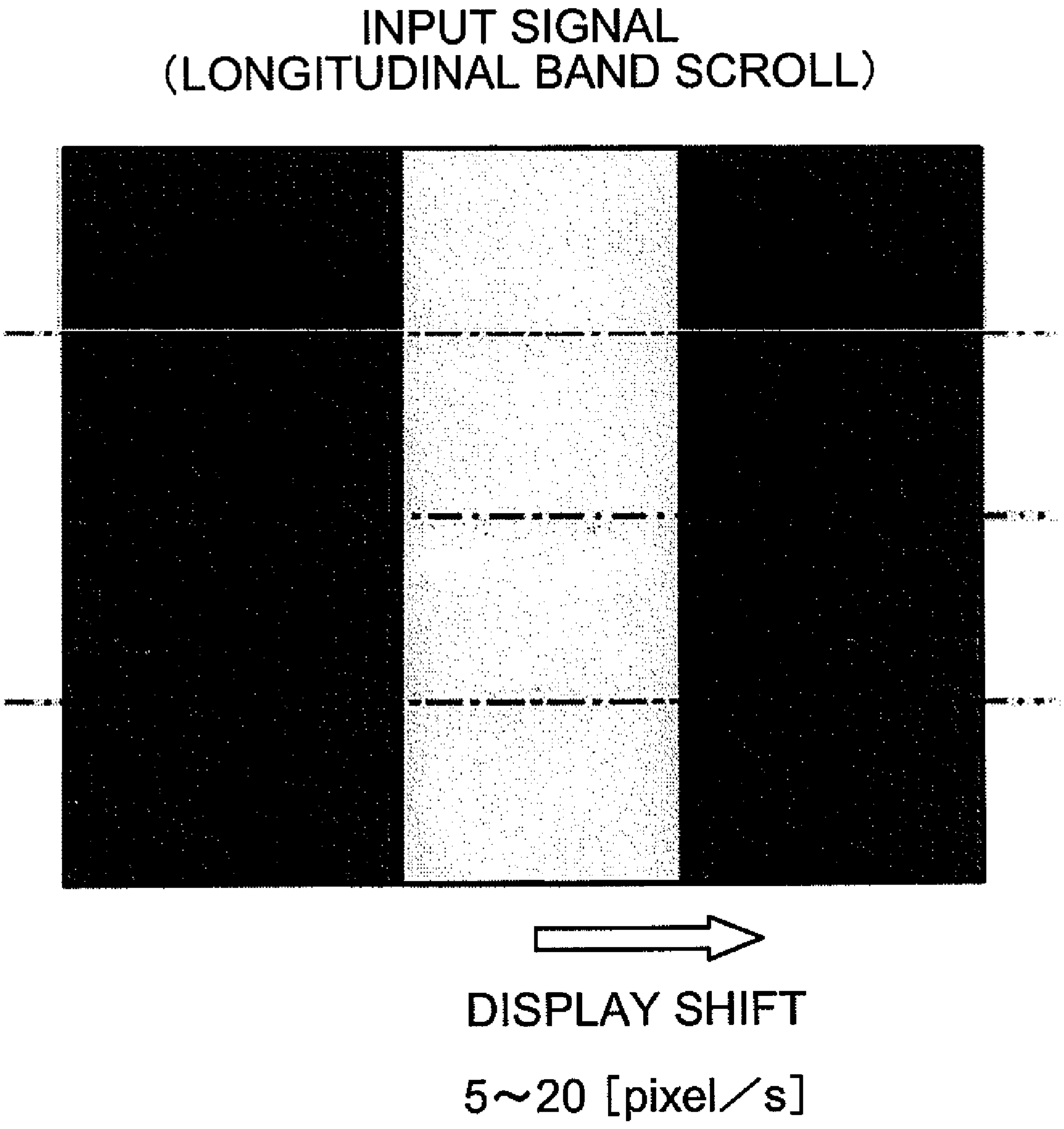
FIG. 27 is an explanatory diagram showing an example of a screen used for evaluating distortion of a moving picture and coloring of motion blur in the liquid crystal display device according to the first exemplary embodiment of the invention when the dividing number (N) of the backlight blocks and the light-off rate (Xb) are changed while having an optimum value of the correction constant (τ), which shows a state of an input image when a longitudinal band screen is scrolled laterally.
Figure 28:
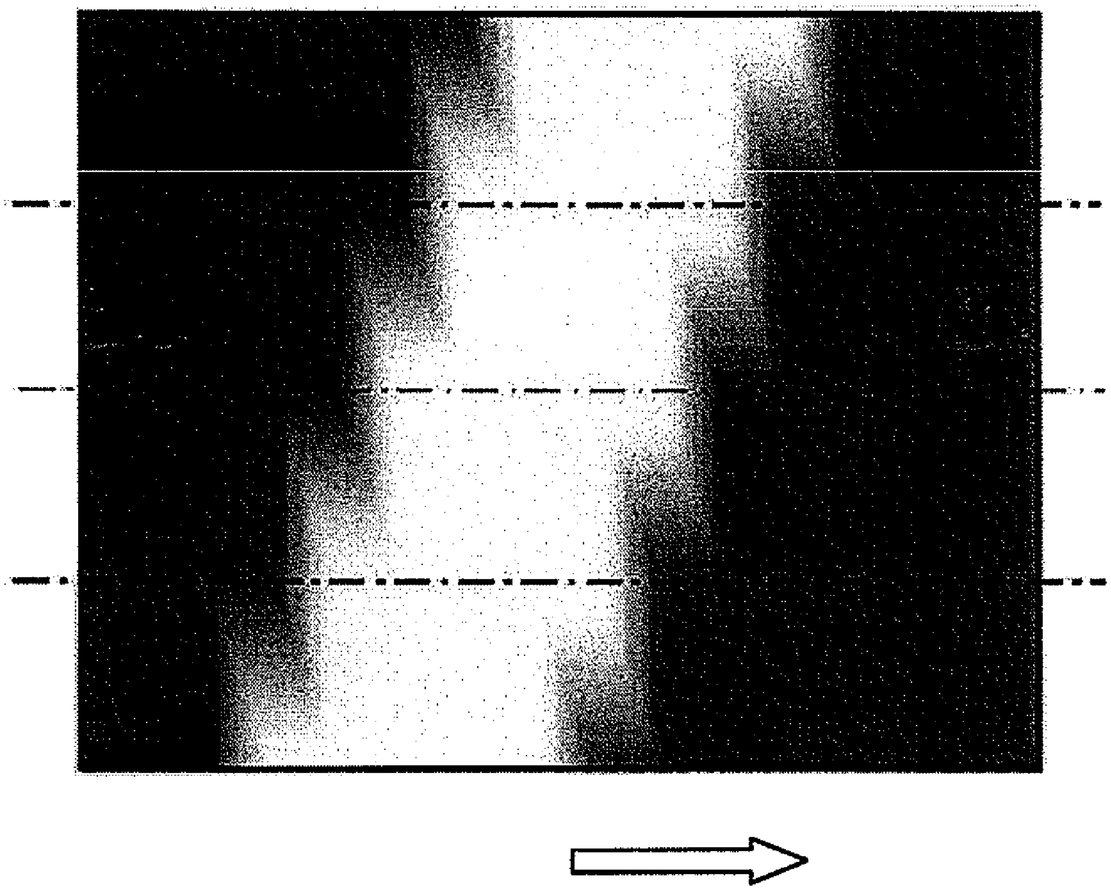
FIG. 28 is an explanatory diagram showing an example of a screen used for evaluating distortion of a moving picture and coloring of motion blur in the liquid crystal display device according to the first exemplary embodiment of the invention when the dividing number (N) of the backlight blocks and the light-off rate (Xb) are changed while having an optimum value of the correction constant (τ), which shows a display state where the distortion of a moving picture and coloring of motion blur are easily recognized.

FIG. 27 shows the display screen used for the subjective evaluation.

As an input signal, a longitudinal band screen is scrolled laterally. The scrolling speed of the display is 5-20 (pixel/frame), and it is a speed with which the signal crosses the screen at 0.85-3.3 (s) in the horizontal direction.

This screen shows a display where the blurring in the moving picture and the coloring in the motion blur due to dividing the backlight into blocks tend to be recognized.

Figure 29:
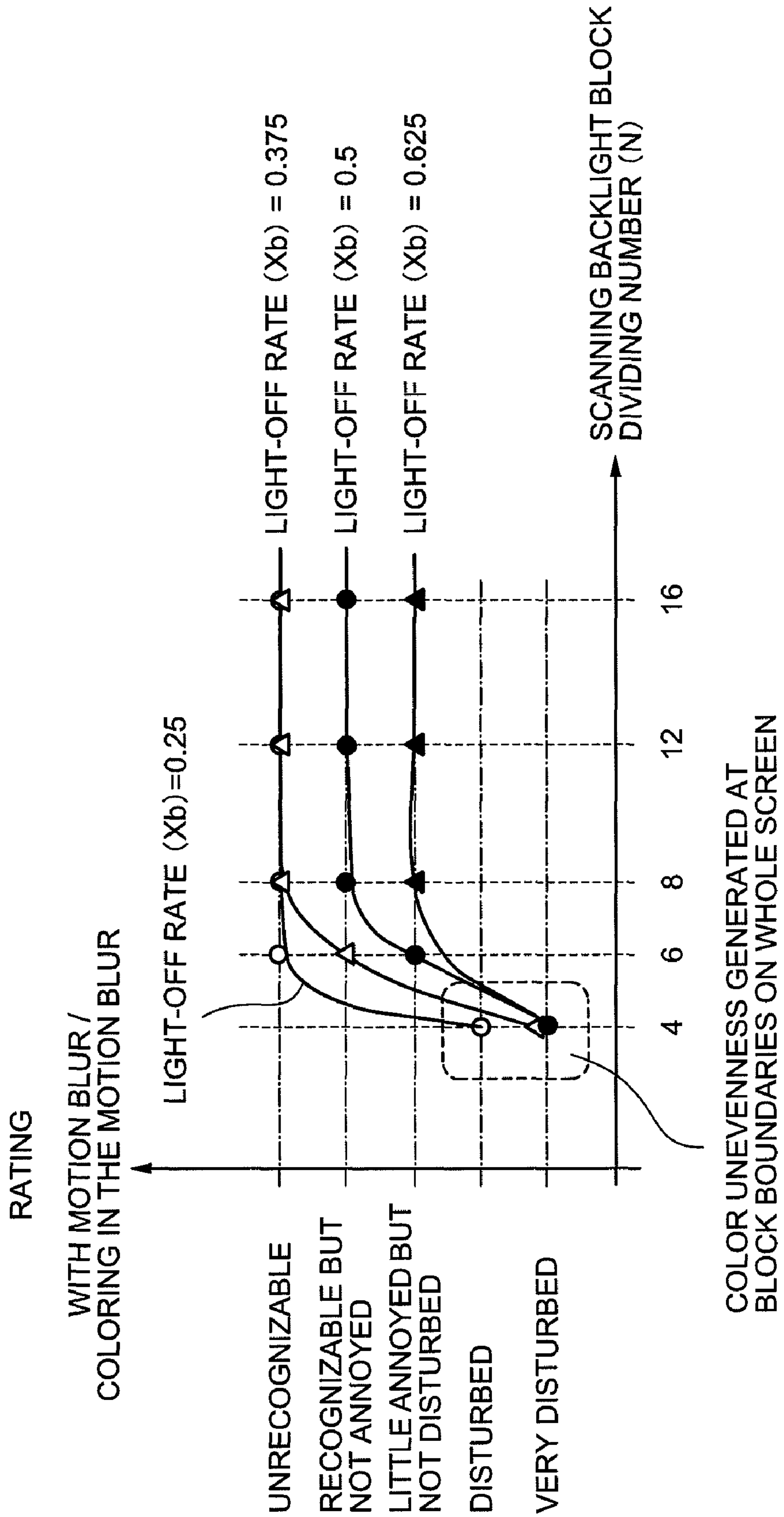
FIG. 29 is an explanatory diagram showing an example of evaluation result regarding distortion of a moving picture and coloring of motion blur in the liquid crystal display device according to the first exemplary embodiment of the invention when the dividing number (N) of the backlight blocks and the light-off rate (Xb) are changed while having an optimum value of the correction constant (τ)

FIG. 29 shows the subjective evaluation result mentioned above. Shown in FIG. 29 is the case where the dividing number (N) of the backlight and the light-off rate (Xb) of the backlight are changed under a condition where the black insertion rate (Xp) is 0.5.

As shown in FIG. 29, under the condition where the black insertion rate (Xp) is 0.5, when the dividing number (N) of the divided backlight blocks is equal to or larger than 8, the blurring in the moving picture and the coloring in the motion blur caused due to dividing the backlight into blocks become insignificant if the light-off rate (Xb) of the backlight is equal to or smaller than 0.375. Thus, a fine picture quality can be obtained. Further, under the condition where the black insertion rate (Xp) is 0.5, when the dividing number (N) of the divided backlight blocks is equal to or larger than 6, the blurring in the moving picture and the coloring in the motion blur caused due to dividing the backlight into blocks become insignificant if the light-off rate (Xb) of the backlight is equal to or smaller than 0.25. Thus, a fine picture quality can be obtained.

Based on this, the main factors have been investigated and verified. As a result, it is found that a fine picture quality can be obtained when the black insertion rate (Xp) and the light-off rate (Xb) of the backlight are in a following relation.

$$Xb \leqq Xp-(V\mathrm{disp}/N)/V\mathrm{total}$$

The relation of this expression will be described by referring to FIG. 30. FIG. 30 shows the black insertion drive executed in a single backlight block.

As shown in FIG. 30, when the dividing number of the backlight block is N, the line sequential scanning of the liquid crystal panel is performed in a following period in a single backlight block in the case of black insertion drive of this exemplary embodiment.

$$(\text{1 backlight block black scanning period})=Tv\times(V\mathrm{disp}/N)/V\mathrm{total}$$

The above-described relational expression (inequality) means that it is possible to achieve a fine picture quality when the light-off period of the backlight is set to be equal to or shorter than a period from the end of the black display scanning of the all display lines within a single backlight block to the start of video signal scanning on any of the display lines (preferably the first line) within the single backlight block.

That is, a following expression can be obtained by transforming the above-described relational expression (inequality).

$$(\text{Light-off period } Tb)=(Tv\times Xb)\leqq Tv\times Xp-Tv\times(V\mathrm{disp}/N)/V\mathrm{total}$$

As described above, in order to bring out the effect of the continuous transmittance waveforms of the black insertion drive, the black insertion drive of the liquid crystal display panel is performed in each of the divided light source blocks with the high-luminance state backlight and the backlight is turned off after shielding the transmission light continuously, while video display drive of the liquid crystal display panel is performed in a high-luminance state by lighting up the backlight and releasing the transmission light. In this manner, a fine picture quality can be obtained.

It is to be noted here that the light-off period Tb becomes equal to or smaller than the above-described condition. The relation between the start timing of the black insertion scanning and the start timing of the light-off period Tb is preferable to be shifted by the period of the optimum value of the above-described correction constant (τ).

Further, the optimum set values for each parameter in this exemplary embodiment are merely presented as a way of example, and not intended to be limited only to such values. It is to be understood that the drives with optimum set values of the parameters in various other conditions are included within the scope of the invention. Furthermore, the scope of the invention also includes the drives that utilize correlations between each of the parameters obtained when a specific parameter among those parameters is fixed to a specific condition and the other parameters are changed.

(Effects of First Exemplary Embodiment)

Following effects are obtained with the exemplary embodiment described above.

This exemplary embodiment includes, on the back face of the liquid crystal panel, the backlight that is divided into backlight blocks in parallel to the line sequential scanning direction of the liquid crystal display panel, and each of the backlight blocks can be individually lighted up and off. In this exemplary embodiment, performed is the scanning backlight drive which sequentially lights up and off each light source block of the backlight according to the scanning timing of the liquid crystal display panel.

The divided light source blocks for achieving the scanning backlight drive are so structured that the light of the light-up block leaks at least to the neighboring backlight block.

A signal obtained by inserting a black signal or a dark signal ("black signal" is used hereinafter as a general term) to an input video signal by a specific proportion is written to the liquid crystal display panel by line sequential scanning, and each of the backlight blocks is turned off for the sequential blinking of the backlight blocks by synchronizing with the scanning of black or dark signal performed on the liquid crystal display panel.

Firstly, the black insertion and the scan backlight drive using no light shielding plate are combined to lighten the luminance difference in the boundary parts between the backlight blocks by the light leaked from the neighboring backlight blocks. Further, the black or dark display transmittance waveforms of the panel continuously shifting in the scanning direction are combined. With this, the display luminance can be changed continuously in the screen scanning direction. Therefore, the gap in the moving picture and the uneven motion blur within the screen, which are the issues of the scanning backlight drive of the related technique, can be suppressed with a simple structure without increasing the number of blocks (dividing number) of the backlight.

For the incomplete light-off state caused due to the light leaked from the neighboring backlight blocks, the light-off effect is improved by combining the black or dark display by synchronizing with the light-off. Thus, there is no generation of ghost-image-like motion blur that is the issue of the scanning backlight drive of the related technique. Therefore, it is possible to reduce the motion blur of the moving picture.

As described above, this exemplary embodiment is capable of improving the motion blur of the moving picture uniformly on the whole screen with a simple structure without increasing the number of blocks (dividing number) of the backlight, while having no generation of the gap in the moving picture, unevenness in the improvements of the motion blur within the screen, and the ghost-image-like motion blur, which are the issues of the scanning backlight drive of the related technique. Thus, it is possible to achieve a high picture quality display device with a fine total balance in the motion blur of the moving picture, the luminance efficiency, and the contrast.

Secondly, this exemplary embodiment is capable of suppressing color unevenness between the light source blocks and coloring of the motion blur of the moving picture not only in a case of using LED whose optical response is quick but also in a case of using CCFL (whose optical response is slow and the optical response varies depending on the light wavelength, so that emitted light/afterglow is colored) as the backlight, since black or dark display is inserted to the display to shield the emitted light of the responding backlight that generates color. Therefore, it is possible to provide fine display of moving pictures regardless of the types of the backlight light source.

Thirdly, this exemplary embodiment is capable of achieving it without increasing the speed of the line sequential scanning. Thus, it is possible to provide such structure without a frame memory at a low cost. (Various Modification Examples of First Exemplary Embodiment) While the exemplary embodiment shows the results of the case of IPS panel, the present invention can be achieved in the same manner with other display-type panels such as a TN panel and a VA panel as in a modification example of the exemplary embodiment.

Figure 31:
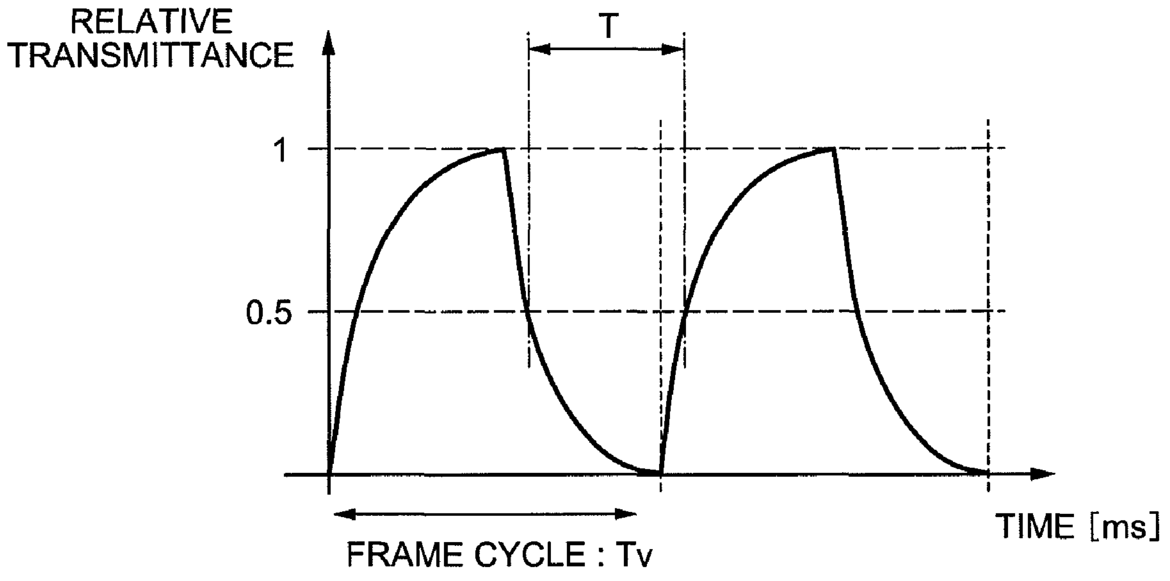
FIG. 31 is an explanatory diagram showing an example of a relative transmittance when a liquid crystal display panel of the liquid crystal display device according to the first exemplary embodiment of the invention is an IPS panel.
Figure 32:
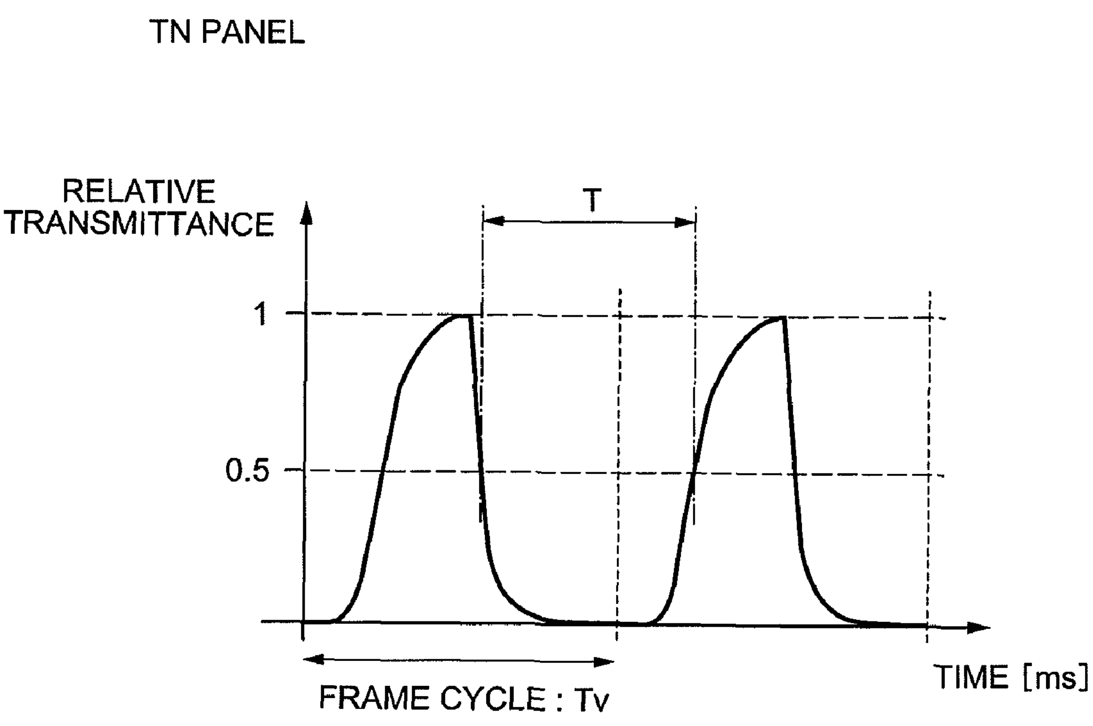
FIG. 32 is an explanatory diagram showing an example of a relative transmittance when a liquid crystal display panel of the liquid crystal display device according to the first exemplary embodiment of the invention is a TN panel.

However, as shown in FIG. 31 and FIG. 32, in the cases of the TN panel and the VA panel, there is a large difference in the properties of on and off states of the transmittance waveforms. Thus, it is possible to achieve the same structure by using a practical black insertion rate (Xp') of the liquid crystal panel while setting the transmittance of 0.5 as a threshold value in the all-white display.

$$Xp'=Tp'/Tv$$

That is, the light-up timing control part can perform controls based on the light-off period and the number of blocks set according to the black image insertion rate, by having the practical black image insertion rate as "Xp'=Tp'/Tv" where the practical black image insertion period of the display panel is "Tp", and the frame period is "Tv", and by having the practical light-off rate as "Xb'=Tb'/Tv" where the practical light-off period of the back-face light source is "Tb'" and the frame period is "Tv".

Figure 33:
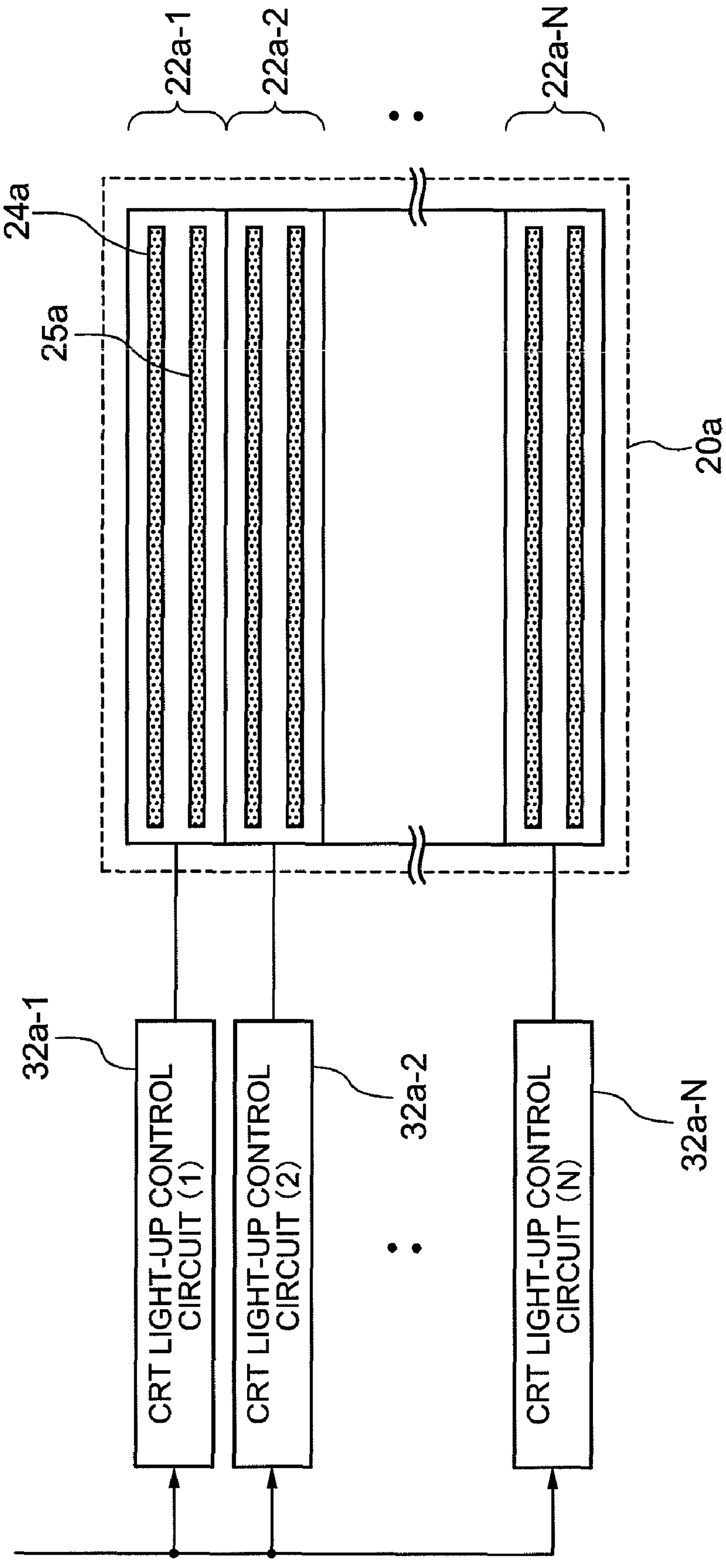
FIG. 33 is an explanatory diagram showing an example of detailed structures when the light source of the backlight block is formed with a cathode ray tube in the liquid crystal display device according to the first exemplary embodiment of the invention.

Further, as shown in FIG. 33, in one modification example of this exemplary embodiment, it is possible to form a backlight unit 20 having cathode ray tubes 24*a* and 25*a* as the light sources. In this case, the light-up control circuits can be configured with cathode-ray-tube light-up control circuits 32*a*-1 to 32*a*-N.

The cathode ray tubes 24*a* and 25*a* are disposed in such a manner that the major-axis side thereof come to be in parallel to each of backlight blocks 22*a*-1 to 22*a*-N.

The cathode ray tubes 24*a* and 25*a* can be formed with cold cathode ray tubes (CCFLs), hot cathode ray tubes (HCFLs), external electrode cathode ray tubes (EEFLs), or flat cathode ray tubes (FFLs), for example.

Figure 34:
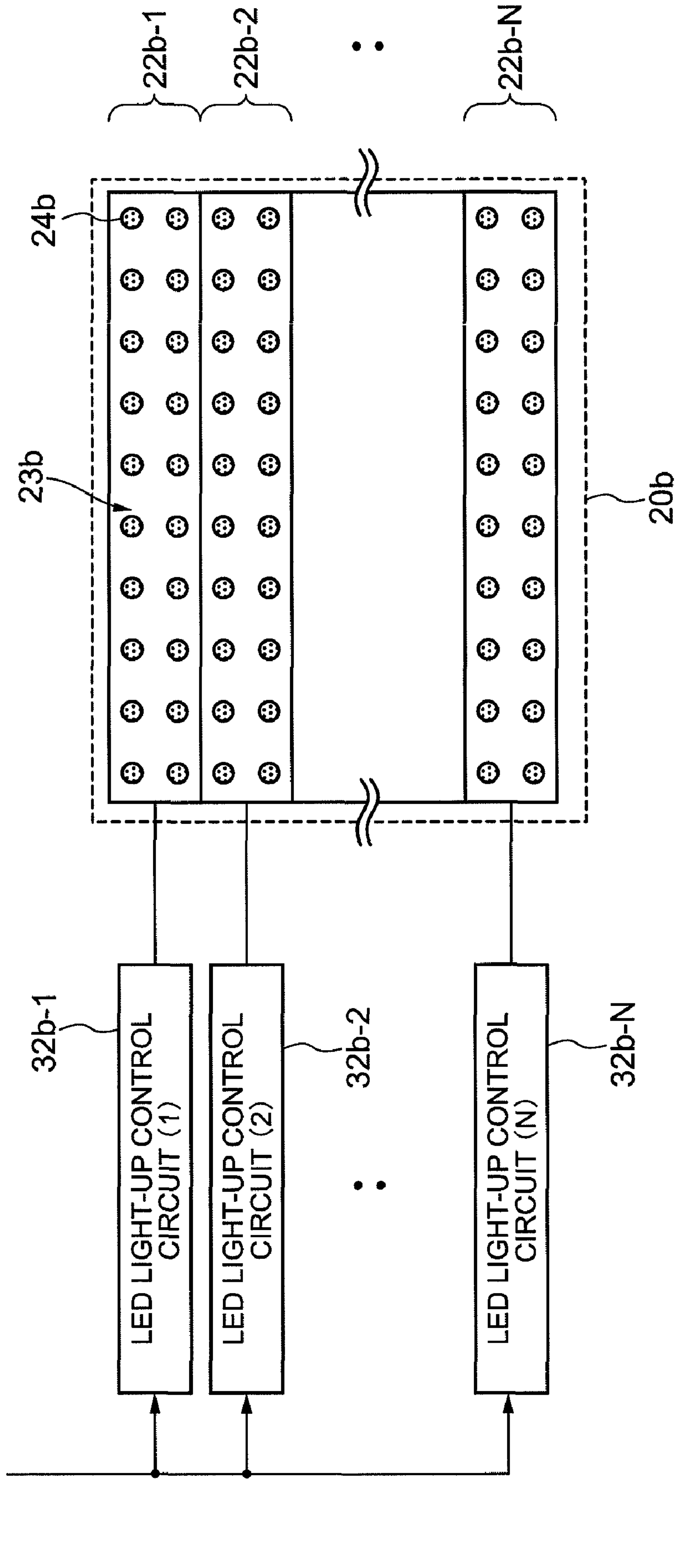
FIG. 34 is an explanatory diagram showing an example of detailed structures when the light source of the backlight block is formed with an LED in the liquid crystal display device according to the first exemplary embodiment of the invention.

Further, as shown in FIG. 34, with a modification example of the exemplary embodiment, it is possible to configure a backlight unit 20*b* that is formed by an LED array 23*b* in which a plurality of LEDs 24*b* are arranged in array as the light source. In this case, the light-up control circuits for controlling light-up of each of backlight blocks **22*b*-1 to 22*b*-N can be configured with LED light-up control circuits 32*b*-1 to 32*b*-N.

Furthermore, as shown in FIG. 35 to FIG. 38, the boundary part between the backlight blocks for the scanning backlight drive may be in such a form that the light of the lighted-up block leaks to some extent and reaches at least to the neighboring backlight block, and projected structure for controlling the light amount and the light direction may also be provided in the boundary parts of each of the backlight blocks.

This structure can be achieved when an appropriate space part is provided between the protruded end part of the projected structure in the boundary part of each of the backlight blocks and a sheet provided on the liquid crystal display panel side of the backlight.

Figure 35:
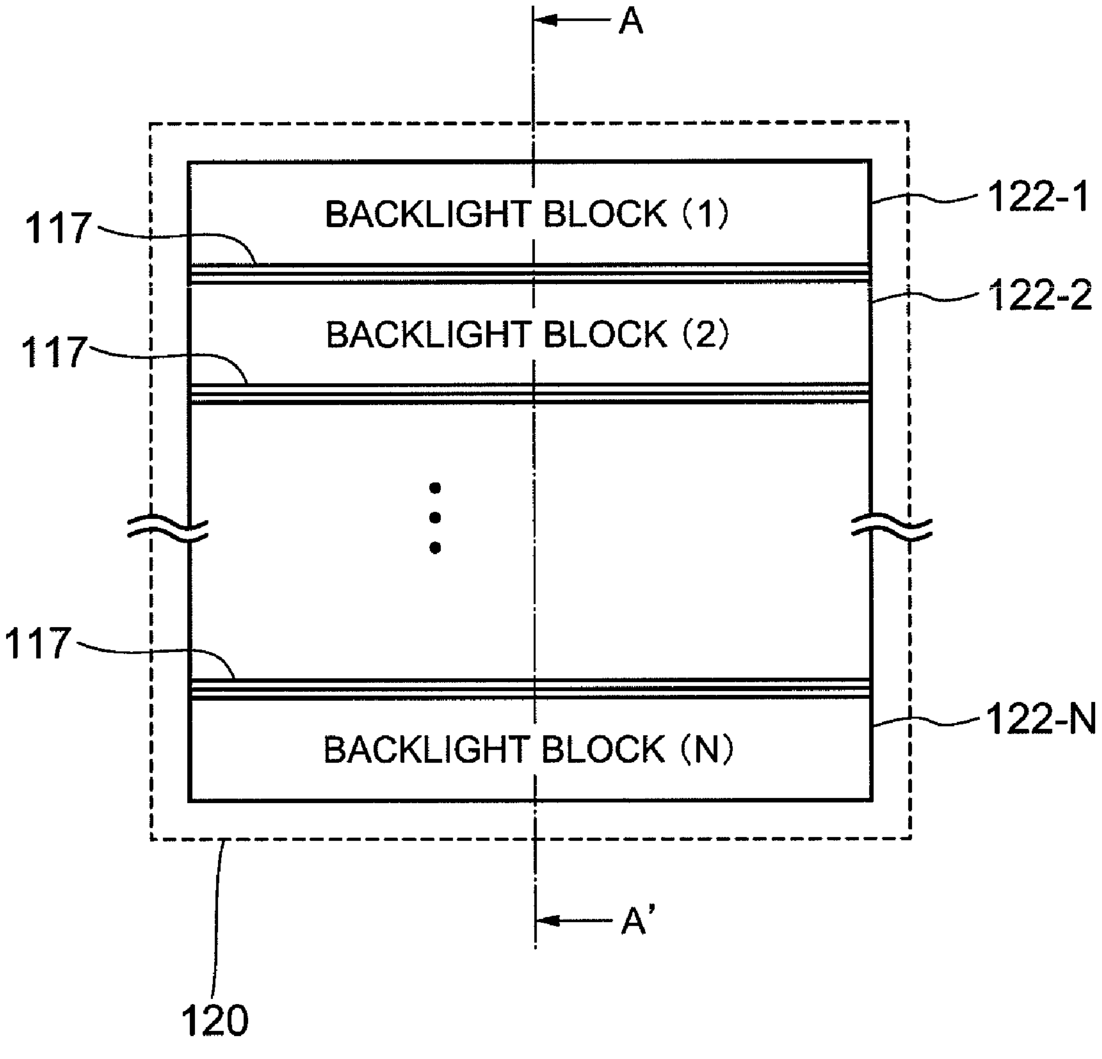
FIG. 35 is an explanatory diagram showing an example of detailed structures of a backlight unit according to a modification example of the liquid crystal display device according to the first exemplary embodiment of the invention.

Specifically, in a modification example of the exemplary embodiment, a backlight unit 120 has a plurality of divided backlight blocks (light source blocks) 122-1 to 122-N as shown in FIG. 35. Each of the backlight blocks 122-1 to 122-N is arranged in parallel to the line sequential scanning direction of a liquid crystal display panel 110. Further, a block light-shielding structure 117 as an example of the protruded structure is arranged in each of the boundary parts between the backlight blocks 122-1 to 122-N in parallel to the line sequential scanning direction of a liquid crystal display panel 110.

Figure 36:
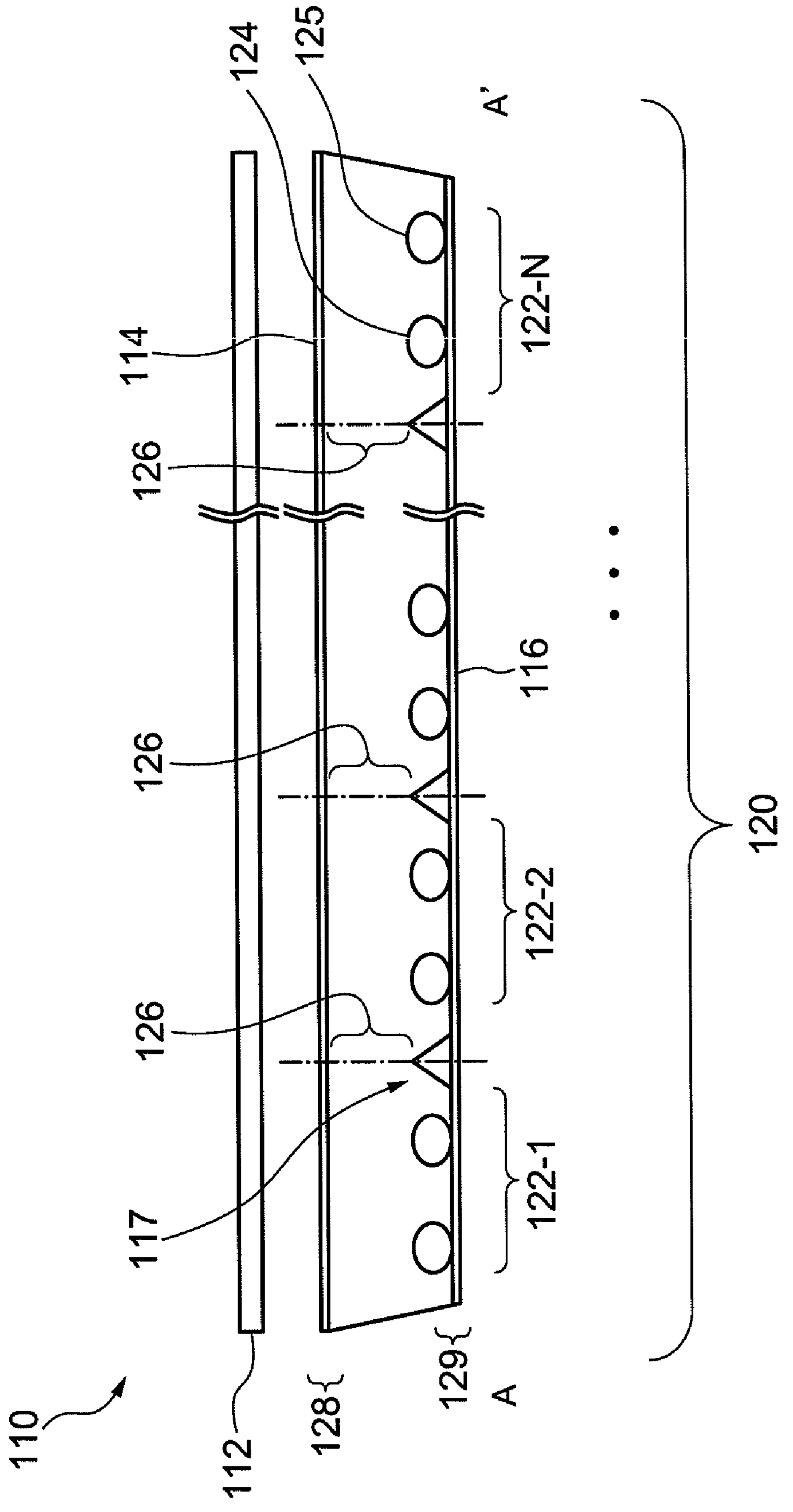
FIG. 36 is a sectional view showing an example of a sectional structure of the backlight unit of FIG. 35 taken along line A-A'.

FIG. 36 shows the sectional structure of this backlight unit 120. FIG. 36 is a sectional view of the backlight unit 120 shown in FIG. 35 taken along the line A-A'.

As shown in FIG. 36, the backlight unit 120 is formed on the back-face side (back-face part) of the liquid crystal display panel 110 by opposing to a substrate part 112 that configures the liquid crystal display panel main body. The substrate part 112 is formed by a transparent substrate, and it transmits light from the backlight unit 120. The substrate part 112 may be an array substrate of the liquid crystal display panel main boy side or a counter substrate.

The backlight unit 120 has a light diffusing part 114 over a top part of the substrate part 112 side. The light diffusing part 114 is formed with a diffusion plate, a diffusion sheet, a lens sheet, etc. It is preferable for the light diffusing part 114 to be formed by stacking those sheets. The sheet structure of the light diffusing part 114 can be selected in accordance with a desired display performance. Further, the backlight unit 120 has a light reflecting part 116 over a bottom part that is the opposite-side face from the substrate part 112. The light reflecting part 116 is formed with a reflection sheet, for example.

A single backlight block 122-1 has a plurality of light sources 124 and 125 formed on the light reflecting part 116. In the case of FIG. 36, there are two light sources formed in the single backlight block 122-1. However, the number of light sources is not limited to two. The light source 124 may be configured with CCFL, LED, and the like, for example. The light sources 124 and 125 contained in the single backlight block 122-1 are controlled to light up and off collectively.

Note here that the structure of block boundary parts between each of the backlight blocks 22-1 to 22-N may simply be in such a form with which light leaks and reaches at least to the neighboring backlight block. In this exemplary embodiment, as shown in FIG. 36, the light-shielding structure 117 as an example of the protruded structure is arranged in each of the boundary parts between the backlight blocks 122-1 to 122-N.

The block light-shielding structure 117 configured in the manner described above is a protruded part that is projected from a bottom part 129 of the backlight unit 120, and it is formed to have a substantially triangular section. A space part 126 is formed between the projected end part of the projection part and a top part 128 of the backlight unit 120, so that light leaks to the neighboring backlight blocks 122-1 to 122-N. One of the sloping faces of the substantially triangular block light-shielding structure 117 has the reflected light thereof converged to the direction of the backlight block 112-1, while the other sloping face of the substantially triangular block light-shielding structure 117 has the reflected light thereof converged to the direction of the other backlight block 112-2.

Figure 37:
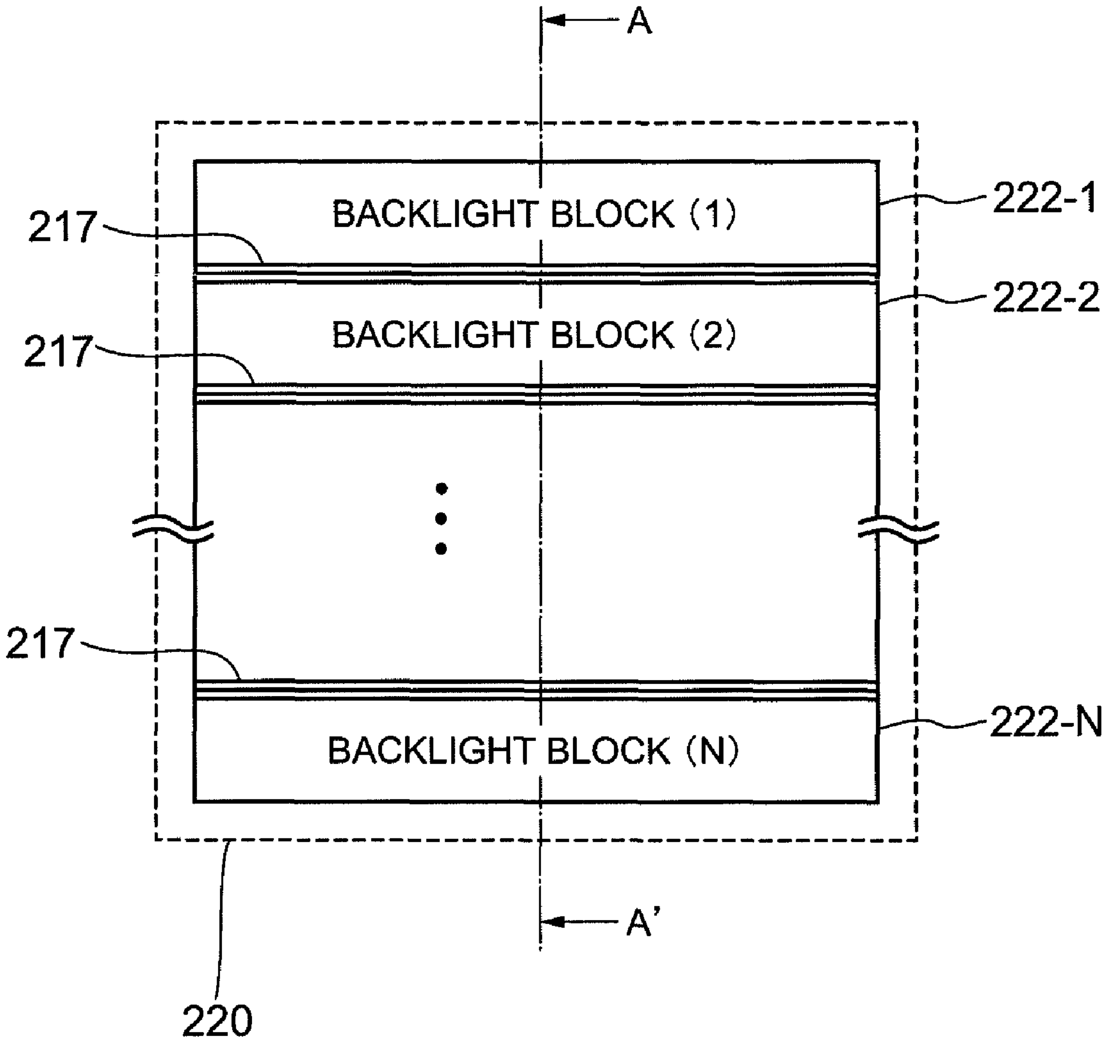
FIG. 37 is an explanatory diagram showing an example of detailed structures of a backlight unit according to a modification example of the liquid crystal display device according to the first exemplary embodiment of the invention.

Further, in a modification example of the exemplary embodiment, a backlight unit 220 has a plurality of divided backlight blocks (light source blocks) 222-1 to 222-N as shown in FIG. 37. Each of the backlight blocks 222-1 to 222-N is arranged in parallel to the line sequential scanning direction of a liquid crystal display panel 210. Further, a block light-shielding structure 217 as an example of the protruded structure is arranged in each of the boundary parts between the backlight blocks 222-1 to 222-N in parallel to the line sequential scanning direction of the liquid crystal display panel 210.

Figure 38:
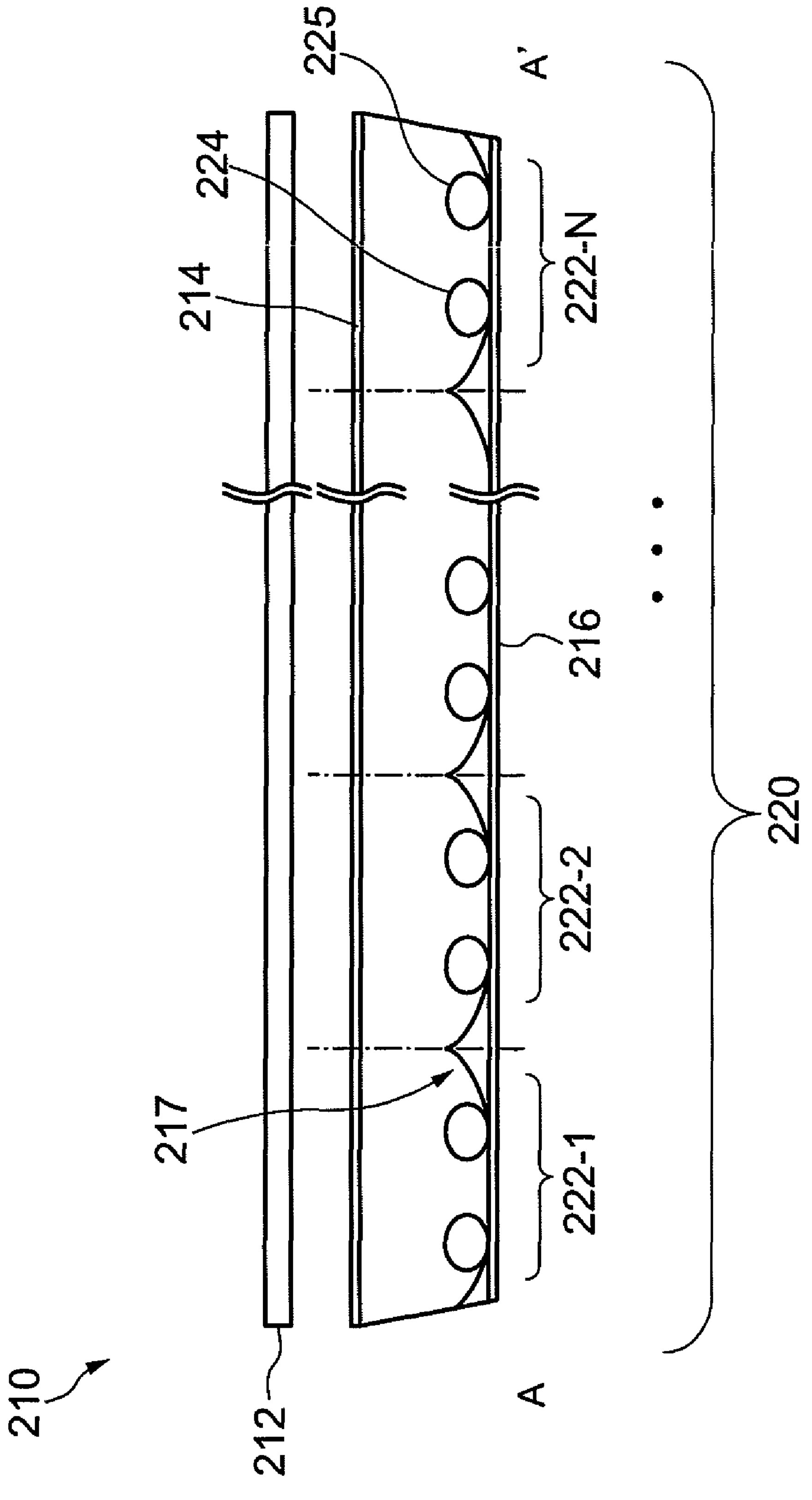
FIG. 38 is a sectional view showing an example of a sectional structure of the backlight unit of FIG. 37 taken along line A-A'.

FIG. 38 shows the sectional structure of this backlight unit 220. FIG. 38 is a sectional view of the backlight unit 220 shown in FIG. 37 taken along the line A-A'.

As shown in FIG. 38, the backlight unit 220 is formed on the back-face side (back-face part) of the liquid crystal display panel 210 by opposing to a substrate part 212 that configures the liquid crystal display panel main body. The substrate part 212 is formed by a transparent substrate, and it transmits light from the backlight unit 220. The substrate part 212 may be an array substrate of the liquid crystal display panel main boy side or a counter substrate.

The backlight unit 220 has a light diffusing part 214 over a top part of the substrate part 212 side. The light diffusing part 214 is formed with a diffusion plate, a diffusion sheet, a lens sheet, etc. It is preferable for the light diffusing part 214 to be formed by stacking these sheets. The sheet structure of the light diffusing part 214 can be selected in accordance with a desired display performance. Further, the backlight unit 220 has a light reflecting part 216 over a bottom part that is the opposite-side face from the substrate part 212. The light reflecting part 216 is formed with a reflection sheet, for example.

A single backlight block 222-1 has a plurality of light sources 224 and 225 formed on the light reflecting part 216. In the case of FIG. 38, there are two light sources formed in the single backlight block 222-1. However, the number of light sources is not limited to two. The light source 224 may be configured with CCFL, LED, and the like, for example. The light sources 224 and 225 contained in the single backlight block 222-1 are controlled to light up and off collectively.

Note here that the structure of block boundary parts between each of the backlight blocks 222-1 to 222-N may simply be in such a form with which light leaks and reaches at least to the neighboring backlight block. In this exemplary embodiment, as shown in FIG. 38, the light-shielding structure 217 as an example of the protruded structure is arranged in each of the boundary parts between the backlight blocks 222-1 to 222-N.

The block light-shielding structure 217 configured in the manner described above is a protruded part that is projected from the bottom part of the backlight unit 220. A space part is formed between the projected end part of the projection part and the top part of the backlight unit 220, so that light leaks to the neighboring backlight blocks 222-1 to 222-N. One of the sloping faces of the substantially triangular block light-shielding structure 217 has the reflected light thereof converged to the direction of the backlight block 222-1, while the other sloping face of the substantially triangular block light-shielding structure 217 has the reflected light thereof converged to the direction of the other backlight block 222-2.

With this, the converging property of the light of the lighted-up backlight block can be improved even though the number of components is increased. Thus, it is possible to improve the luminance efficiency further through decreasing the unnecessary light leakage in a light-off state from the lighted-up backlight block towards the backlight blocks that are farther than the neighboring block and by controlling the amount and direction of the light leakage.

Here, the corresponding relations between the structural elements of the exemplary embodiment and the structural elements of the invention will be described. The black insertion driving part 51 of the exemplary embodiment can configure the "black image insertion driving part" of the present invention. Further, the light-up timing control part 58 of the exemplary embodiment can configure the "light-up timing control part" of the present invention. Furthermore, the liquid crystal display panel 10 of the exemplary embodiment can configure the "display panel" of the present invention. Moreover, the source driver group 46 of the exemplary embodiment can configure the "source line driving part" of the present invention. Further, the gate driver group 44 of the exemplary embodiment can configure the "gate line driving part" of the present invention. Furthermore, the light-up control circuits 32 (32-1 to 32-N) of the exemplary embodiment can configure the "light-up control part" of the present invention. Moreover, each of the backlight blocks 22 (22-1 to 22-N) of the exemplary embodiment can configure "each light source block" of the present invention. Further, the block light-shielding structure 117 of the exemplary embodiment can configure the "projected part" of the present invention. Furthermore, the timing controller 50 of the exemplary embodiment can configure the "display panel control device" of the present invention. The "display panel control device" can control the display panel and the back-face light source that configures each of the plurality of light source blocks formed in parallel to the line sequential scanning direction on the back face of the display panel.

The "black image insertion driving part" can perform controls to execute, on the display panel, the black image insertion drive in which the video display scanning for providing video display and the black image display scanning for providing black image display are started in a specific period. The "light-up timing control part" can perform controls of the timing of for starting the light-up and the timing for starting the light-off of each of the plurality of light source blocks that are formed in parallel to the line sequential scanning direction on the back-face part of the display panel, based on the synchronous signal which synchronizes with the start timing of the video display scanning or the black image display scanning performed by the black image insertion driving part.

In this case, when there are space parts in the boundary parts of each of the neighboring light source blocks, the "light-up timing control part" can control the light-up start timing and the light-off start timing so as to satisfy such a condition that the light-off period of a given light source block becomes equal to or less than a period from the end of the black image display scanning on the whole display lines within the block area of the display panel corresponding to that given light source block to the start of the video scanning of the first display line of the block area.

Further, the "light-up timing control part" can perform controls so that the light-off start timing of the light source block comes at a timing that is obtained by adding the correction constant of luminance response of the light source and the electro-optics response of the display panel to the start timing of the black image display scanning, while satisfying the above-described condition of the period. With this, when the correction constant (τ) takes the optimum value, the motion blur becomes the minimum while the white luminance becomes the maximum and the change in the white balance can be decreased (FIG. 22-FIG. 26). Furthermore, provided that the driven line number of the display panel is "Vtotal", the display line (scanning line) number of the display panel is "Vdisp", the number of the divided light source blocks is "N", the black image insertion rate in the frame period by the black image insertion driving part is "Xp", and the light-off rate that is the ratio of the light-off period in the frame period is "Xb", the "light-up timing control part" can perform controls with the light-off period and the number of blocks set according to the black image insertion rate, by satisfying the co-relational condition between the black image insertion rate Xp and the light-off rate Xb expressed as follows.

$$Xb \leqq Xp-(V\mathrm{disp}/N)/V\mathrm{total}$$

With this, in order to bring out the effect of the continuous transmittance waveforms of the black insertion drive, the black insertion drive of the liquid crystal display panel is performed in each of the divided light source blocks with the high-luminance state backlight and the backlight is turned off after shielding the transmission light continuously, while video display drive of the liquid crystal display panel is performed in a high-luminance state by lighting up the backlight and releasing the transmission light. In this manner, a fine picture quality can be obtained.

Further, the "light-up timing control part" can control each of the light sources by dividing the backlight source into six or more blocks (N is equal to or larger than 6) under the condition where the black insertion rate (Xp) is 0.5 and the light-off rate Xb is 0.25. Furthermore, the "light-up timing control part" can control each of the light sources by dividing the backlight source into eight or more blocks (N is equal to or larger than 8) under the condition where the black insertion rate (Xp) is 0.5 and the light-off rate Xb is 0.375. Under these conditions, blurring of the moving picture and coloring of the motion blur caused by dividing the backlight into blocks become unrecognizable, so that it is possible to provide a fine picture quality (FIG. 29).

Further, when the display panel is a TN-mode liquid crystal display panel or a VA-mode liquid crystal display panel, the "light-up timing control part" can perform controls based on the light-off period and the number of blocks set according to the black image insertion rate, by having the actual black image insertion rate as "Xp'=Tp'/Tv" where the practical black image insertion period of the display panel is "Tp'" and the frame period is "Tv", and by having the actual light-off rate as "Xb'=Tb'/Tv" where the actual light-off period of the back-face light source is "Tb'" and the frame period is "Tv". In the cases of the TN panel, the VA panel, or the like, for example, there is a large difference in the properties of on and off states of the transmittance waveforms. Thus, it is possible with the above to achieve the same control by using an actual black insertion rate (Xp') of the liquid crystal panel while setting the transmittance of 0.5 as a threshold value in the all-white display (FIG. 31, FIG. 32).

The "display panel" can be in a structure in which a pixel is formed in each of the intersection points between a plurality of gate lines and a plurality of source lines arranged in matrix. The "source line driving part" can supply, to each source line, the black image inserted video signal which alternately contains the video part which displays video in accordance with the video signal and black image part which displays black in accordance with the black image signal. The "gate line driving part" is provided to each of the gate line groups (groups obtained by dividing the plurality of gate lines into groups), and it is capable of sequentially supplying the gate driving signal to the respective gate line. The "light-up control part" can perform controls to light up and off, by a unit of block, the plurality of light source blocks provided on the back face of the display panel in parallel to the line sequential scanning direction. The "backlight unit" is disposed in the back face of the display panel, and it can contain the plurality of light source blocks. The "display panel control device" can control the light-up control part, the gate line driving part, and the source line driving part.

Further, each block as a part of the timing controller in the block diagrams shown in FIG. 1 and FIG. 2 maybe software module structure that is functionalized by programs when the computer executes various programs stored in proper memories.

That is, even though the physical structures are a single or a plurality of CPU(s) (or a single or a plurality of CPU(s) and a single or a plurality of memory(s)) or the like, the software structures formed by each part (circuits, devices) are a plurality of functions implemented by the CPU with controls of the programs, which are expressed as feature elements of each of the plurality of parts (devices).

When the dynamic state (each procedure configuring the program is being executed) where the CPU is executed by the program is expressed functionally, it can be said that each part (device) is built within the CPU. In a static state where the program is not being executed, the entire programs (or each program part included in the structure of each device) for achieving the structures of each device are stored in a storage area of the memory or the like.

Explanations of each part (device) provided above can be taken as the explanations of the computer that is functionalized by the programs together with the functions of the programs, or can be taken as a device that is configured with a plurality of electronic circuit blocks functionalized permanently by proper hardware. Therefore, those functional blocks can be achieved in various forms, e.g., only with hardware, only with software, or a combination of both, and it is not to be limited to any one of those forms.

That is, the timing controller may be an information device having a communication function, which is operated by a program control. Alternatively, the timing controller may be any kinds of computers similar to such device.

As an exemplary advantage according to the invention, in order to bring out the effect of continuous transmittance waveform in the line sequential scanning direction of the black image insertion drive, it is possible with the invention to perform the black insertion drive of the liquid crystal display panel by each of the divided light source blocks with the high-luminance state light source and the turns off the source light after shielding the transmission light continuously. When lighting up the light source, it is possible to perform video display drive of the liquid crystal display panel in a high-luminance state by lighting up the light source and releases the transmission light continuously. Thus, the present invention make it possible to provide the excellent display panel control device, liquid crystal display device, and the like which cannot be achieved with the related techniques, with which high-quality images with fine total balance in the motion blur of the moving picture, the luminance efficiency, and the contrast can be achieved.

Second Exemplary Embodiment

Figure 39:
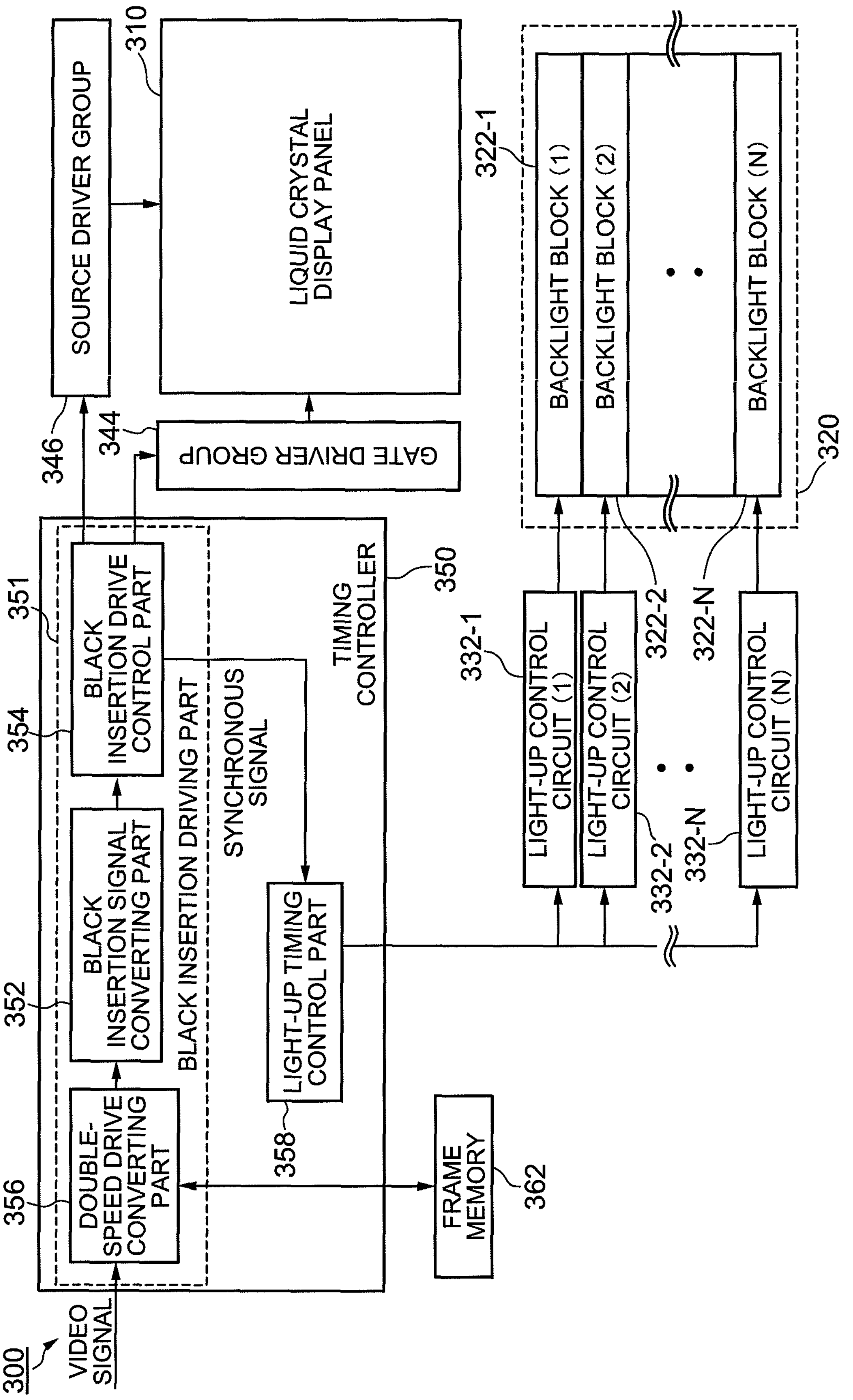
FIG. 39 is a block diagram showing an example of the overall structure of a liquid crystal display device according to a second exemplary embodiment of the invention.
Figure 40:
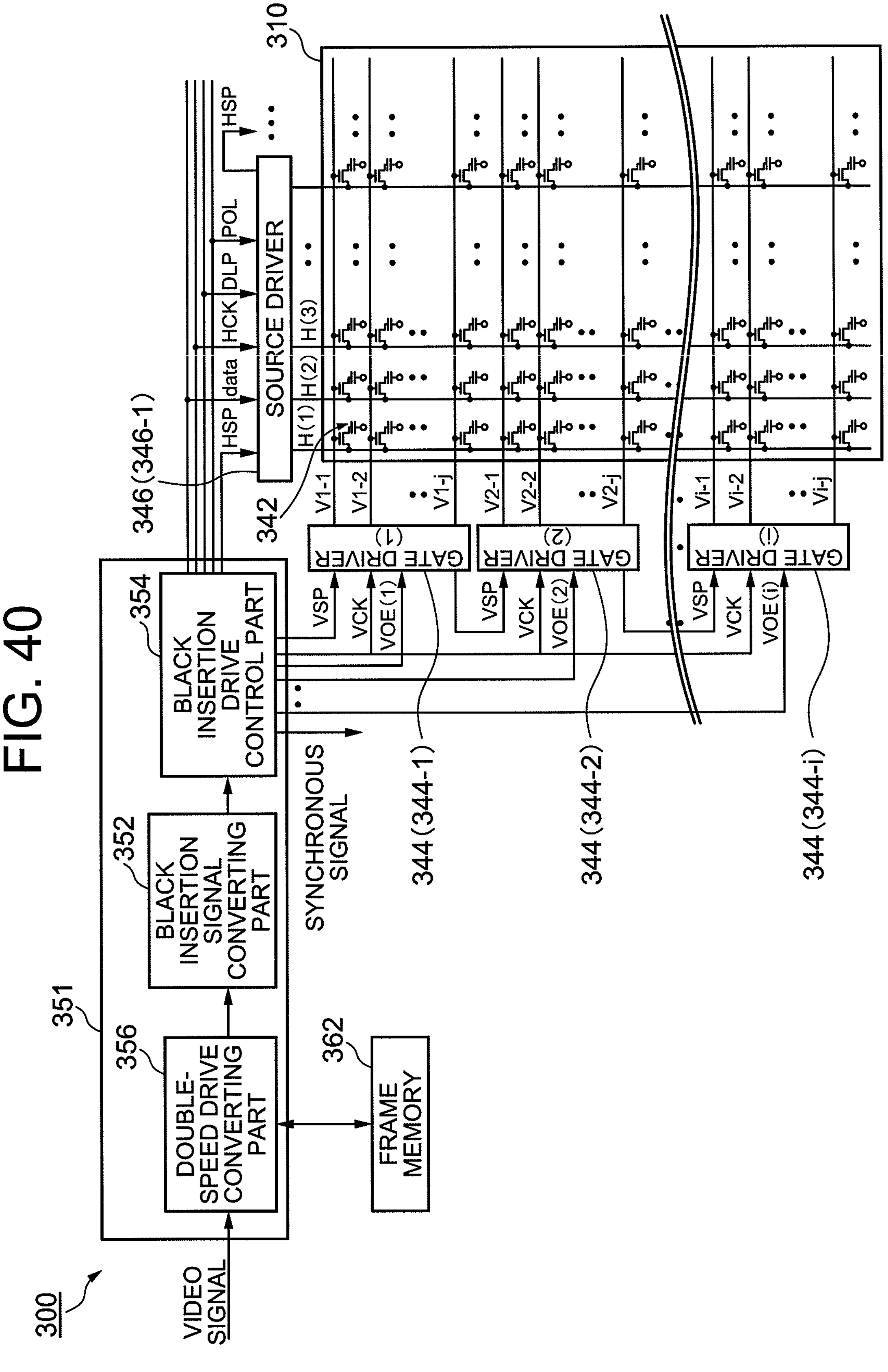
FIG. 40 is an explanatory diagram for showing an example of detailed structures of the liquid crystal display device shown in FIG. 39.

Next, a second exemplary embodiment of the invention will be described by referring to FIG. 39 to FIG. 43. Hereinafter, explanations of substantially the same structures as those of the first exemplary embodiment are omitted, and only the different points are described. FIG. 39 is a block diagram showing an example of the second exemplary embodiment of the liquid crystal display device according to the invention.

In this exemplary embodiment, black display scanning is performed in one of sub-frame periods out of those obtained by dividing one frame period, and video display scanning is performed in the other sub-frame period.

Specifically, a liquid crystal display device 300 of this exemplary embodiment is capable of performing double-speed driving. As shown in FIG. 39, the liquid crystal display device 300 is configured, including: a liquid crystal display panel 310 in the same structure as that of the first exemplary embodiment, a gate driver group 344; a source driver group 346; a backlight unit 320 configured with a plurality (N) of backlight blocks 322 (322-1 to 322-N); N-number of light-up control circuits 332 (332-1 to 332-N); a timing controller 350 that is capable of performing double-speed driving; and a frame memory 362.

The timing controller 350 is configured, including: a black insertion driving part 351 for performing black insertion drive in the liquid crystal display panel 310; and a light-up timing control part 358 which generates various kinds of control signals (light source block control signals) for respectively controlling a light-up start timing and a light-off start timing of the N-umber of light-up control circuits 332 (332-1 to 332-N) based on the synchronous signals from the black insertion driving part 351.

The black insertion drive control part 351 is configured, including: a double-speed drive converting part 356 which converts a video signal of one frame into video signals of two sub-frames by increasing the speed of the video inputted signal by k-times (2×, for example) by using the frame memory 362; a black insertion signal converting part 352 which converts the gradation of the video signal of one of the sub-frames converted by the double-speed drive converting part 356 to a black image signal, and keeps the video signal of the other sub-frame as it is to generate the black inserted video signal; and a black insertion drive control part 354 which performs black insertion drive control in the liquid crystal display panel 310 based on the black inserted video signal from the black insertion signal converting part 352.

In this exemplary embodiment, the double-speed drive converting part 356 is described as of double speed. However, with the converting part of k-speed (k×), the black insertion rate per frame can be changed. For example, with 3× speed, a first black insertion rate and a second insertion rate may be switched by each frame in accordance with the video signals, e.g., the first frame is with the first black insertion rate with which a first sub-frame that is one thirds of one frame is video signal, a second sub-frame thereof is the video signal, and a third sub-frame thereof is the black image signal, and the second frame is with the second black insertion rate with which the first sub-frame is the video signal, the second sub-frame thereof is the black image insertion signal, and the third sub-frame thereof is the black image insertion signal.

The liquid crystal display device 300 in the above-described structure roughly operates as follows. That is, as shown in FIG. 39, an inputted video signal is sent to the double-speed drive converting part 356.

The inputted video signal is converted into double-speed signals (video signals of two sub-frames) by the double-speed drive converting part 356, and inputted to the following black insertion signal converting part 352.

The video signal of one of the sub-frames is converted to a black images signal (referred to as a black sub-frame hereinafter) by the black insertion signal converting part 352, and the video signal of the other sub-frame (referred to as a video sub-frame hereinafter) remained as it is to generate a black inserted video signal, and it is inputted to the black insertion drive control part 354.

The black insertion drive control part 354 generates driver control signals at a prescribed timing, and inputs those to the respective gate drivers 344-1 to 344-i and source drivers 346.

Further, along with the driver control signal, the black insertion drive control part 354 generates a synchronous signal by synchronizing with the cycle of outputting the black image signal to the liquid crystal display panel 310, and inputs it to the light-up timing control part 358.

In the meantime, the backlight unit 320 is formed on the back face of the liquid crystal display panel 310. The backlight unit 320 has a plurality of backlight blocks 322-1 to 322-N formed in a direction in parallel to the line sequential scanning direction of the liquid crystal display panel 310. The backlight blocks 322-1 to 322-N are obtained by dividing a light source into blocks. Each of the backlight blocks 322-1 to 322-N is capable of being lighted up and off independently, and the backlight blocks are so formed that the light to each of the backlight blocks 322-1 to 322-N reaches at least to the neighboring blocks.

The light-up timing control part 358 generates the control signals (light source block control signals) for each of the backlight blocks 322-1 322-N of the backlight unit 320 based on the inputted synchronous signal, and inputs those to the respective light-up control circuits 332-1 to 332-N of each of the backlight blocks 322-1 to 322-N of the backlight unit 320.

The light-up control circuits 332-1 to 332-N light up and off the respective backlight blocks 322-1 to 322-N according to the inputted control signals (light source block control signals).

Figure 41A:
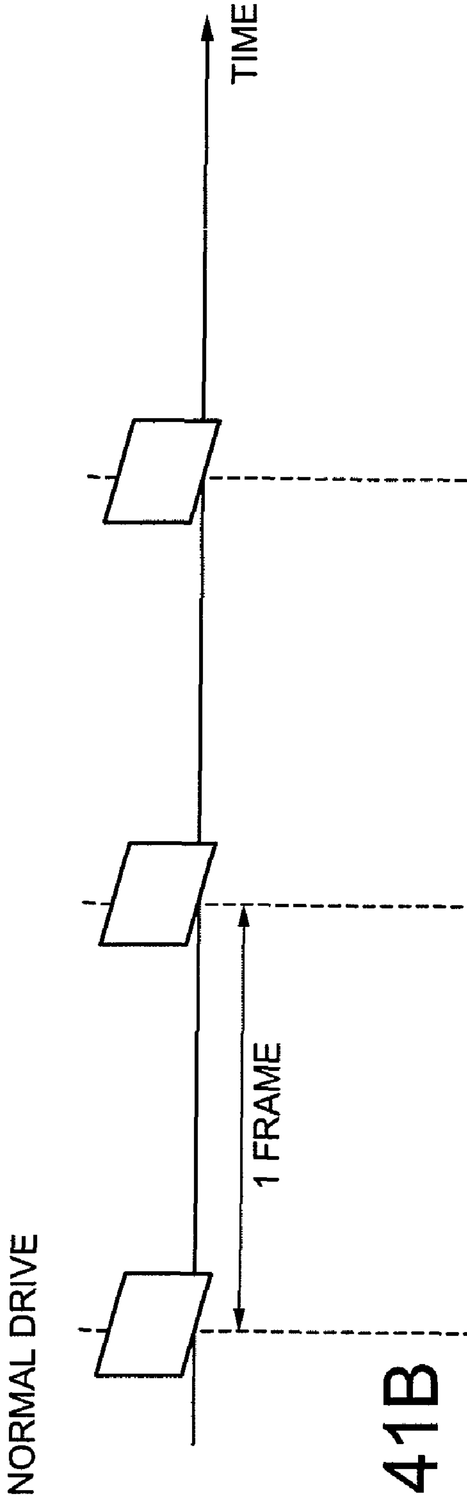
Figure 41B:
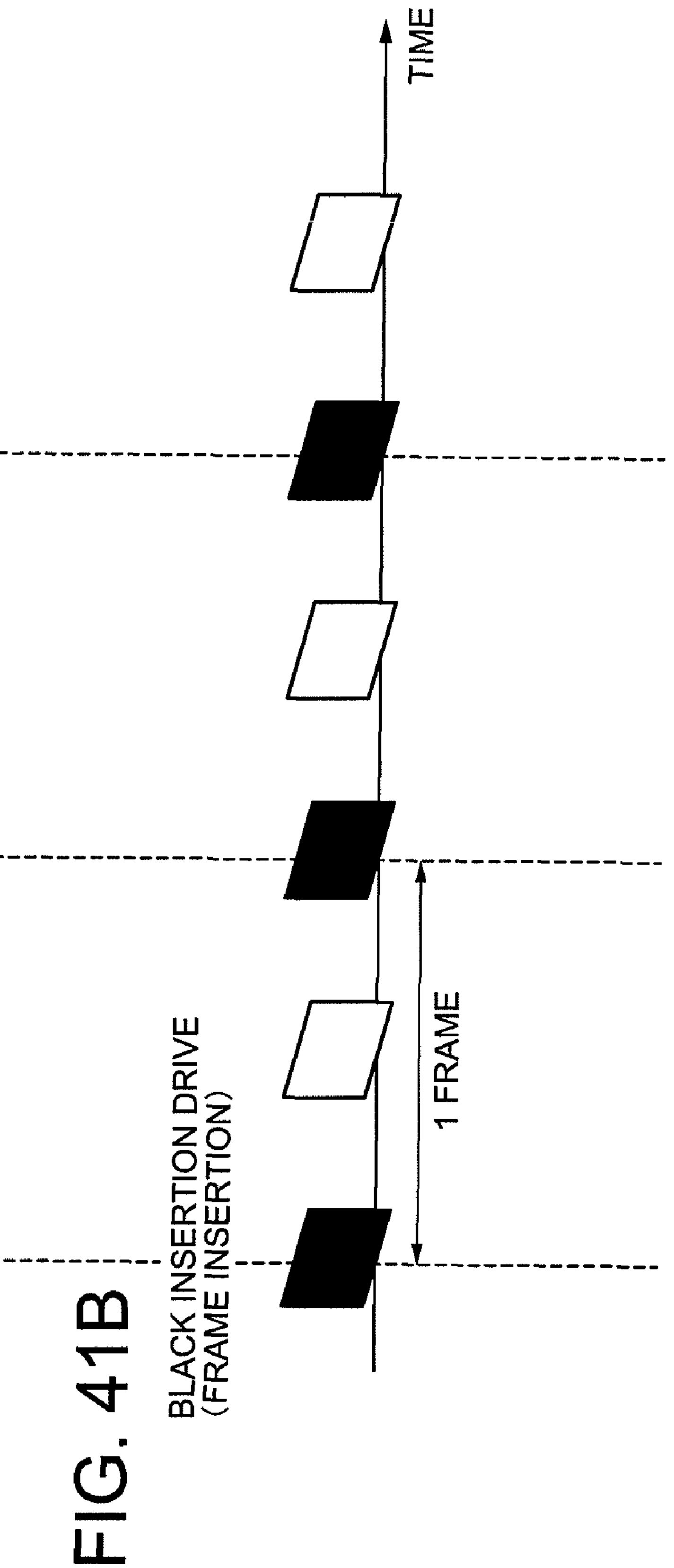

FIG. 41 shows the state of display with the black insertion drive of this exemplary embodiment. As shown in FIG. 41B, the black insertion drive of this exemplary embodiment is the black insertion drive in which the black sub-frame and the video sub-frame are repeated alternately.

Figure 42:
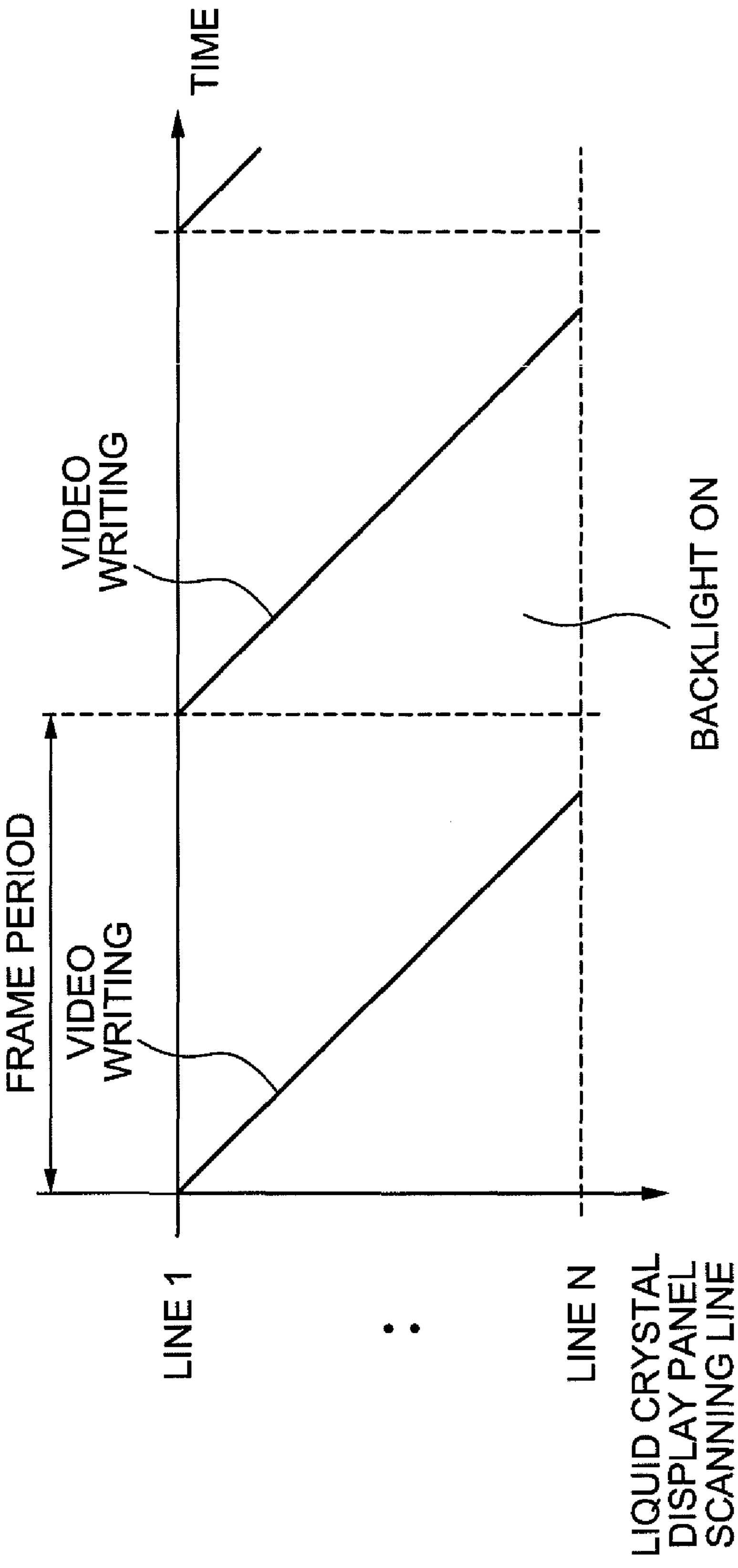
FIG. 42 is an explanatory diagram for describing an example of light-up period of a backlight when writing a video signal in normal drive performed in the liquid crystal display device.
Figure 43:
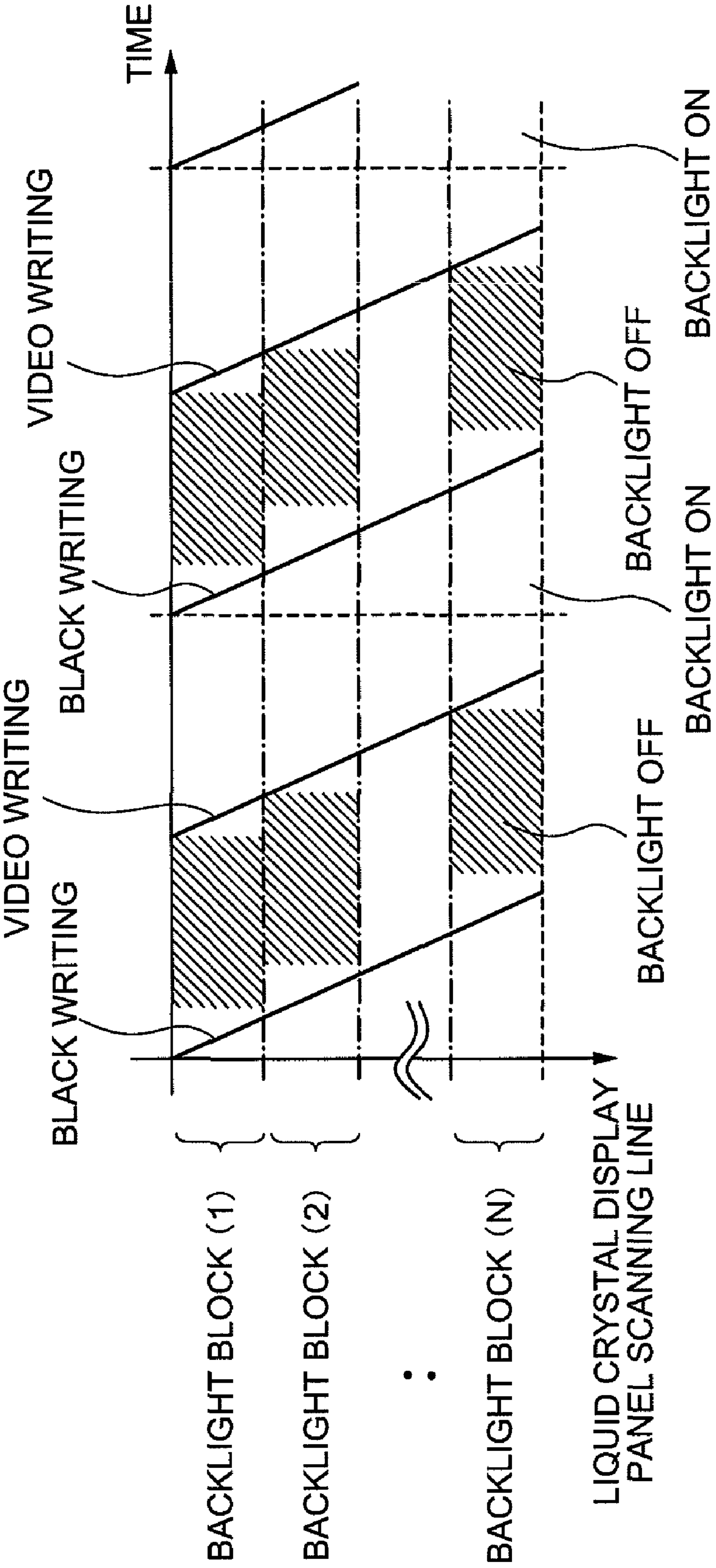
FIG. 43 is an explanatory diagram for describing an example of a corresponding relation between a black insertion period and a light-up period as well as a light-off period of the N-number of backlight blocks in scanning backlight drive performed in the liquid crystal display device according to the second exemplary embodiment of the invention.

Setting for each parameter of the second exemplary embodiment will be described hereinafter. As shown in FIG. 42 and FIG. 43, in the black insertion drive according to this exemplary embodiment, the line sequential scanning speed is doubled with respect to that of the normal drive.

Thus, the light-off start time (ΔTb(n)) of the (n)-th backlight light source block from the writing start side towards the line sequential scanning direction of the liquid crystal display panel of the above-described first exemplary embodiment is expressed as follows by using the sub-frame cycle (Tv).

$$\Delta Tb(n)=\tau+Tv\times(V\text{disp}/2N)/V\text{total}\times n$$

Liquid crystal display panel driven line number: Vtotal (H)

Liquid crystal display panel display line number: Vdisp (H)

Frame cycle: Tv (s)

Note here that the synchronous signal which synchronizes with the output cycle of the black signal can be obtained in the same manner as the case of the first exemplary embodiment by using the start pulse of the black sub-frame. Since the speed of the line sequential scanning of the liquid crystal is doubled, the scanning backlights are reduced to a half of that of the first exemplary embodiment.

When the dividing number (N) of the divided backlight blocks is equal to or larger than 4, the blurring in the moving picture and the coloring in the motion blur caused due to dividing the backlight into blocks become insignificant if the light-off rate (Xb) of the backlight is equal to or smaller than 0.375, thereby providing a fine picture quality. Further, when the dividing number (N) of the divided backlight blocks is equal to or larger than 3, the blurring in the moving picture and the coloring in the motion blur caused due to dividing the backlight into blocks become insignificant if the light-off rate (Xb) of the backlight is equal to or smaller than 0.25, thereby providing a fine picture quality.

Based on this, it is found that a fine picture quality can be obtained when the black insertion rate (Xp) and the light-off rate (Xb) of the backlight are in a following relation.

$$Xb\leqq Xp-(V\text{disp}/2N)/V\text{total}$$

With the above-described exemplary embodiment, it is possible to achieve a fine picture quality when the light-off period of the backlight is set to be equal to or shorter than a period from the end of the black display scanning of the all display lines within a single backlight block to the start of video signal scanning on any of the display lines within the single backlight block.

Similarly, it is also found in the case of k× speed that a fine picture quality can be obtained when the black insertion rate (Xp=0.5) and the light-off rate (Xb) of the scanning backlight drive are in a following relation.

$$Xb\leqq Xp-(V\text{disp}/kN)/V\text{total}$$

In this case, it is preferable that the light-up timing control part drive-controls each of the light source blocks by dividing the blocks to satisfy "N≧6/k". This makes it possible to obtain a still greater picture quality.

Other structures, steps, functions, and operational effects are the same as those of the first exemplary embodiment described above. Further, the operational contents of each step and feature elements of each part described above may be put into programs to be executed by the computer.

Here, the corresponding relations between the structural elements of the exemplary embodiment and the structural elements of the invention will be described. The double-speed drive converting part 356 of the exemplary embodiment can configure the "double-speed conversion control part" of the present invention. Further, the black insertion signal converting part 352 of the exemplary embodiment can configure the "black image insertion signal converting part" of the present invention. Furthermore, the black insertion driving part 351 of the exemplary embodiment can configure the "black image insertion driving part" of the present invention. Further, the light-up timing control part 358 of the exemplary embodiment can configure the "light-up timing control part" of the present invention.

The black image insertion drive control part can include: the double-speed conversion control part which, when supplying a black image insertion signal that alternately contains the video part for displaying video in accordance with the video signal and the black image part for displaying black in accordance with the black image signal to the display panel, performs controls to convert the video signal to that of k× speed and divides the one frame period into k-number of sub-frame periods; and the black image insertion signal converting part which inserts the black image signal at least to one of the sub-frame periods.

That is, when supplying the black image insertion signal that alternately contains the video part for displaying video in accordance with the video signal and the black image part for displaying black in accordance with the black image signal to the display panel, the black image insertion drive control part performs controls to convert the video signal to that of k× speed to divide the one frame period into k-number of sub-frame periods, and inserts the black image signal at least to one of the sub-frame periods.

In this case, provided that the driven line number of the display panel is "Vtotal", the display line (scanning line) number of the display panel is "Vdisp", the number of the divided light source blocks is "N", the black image insertion rate in the frame period by the black image insertion driving part is "Xp", the light-off rate that is the ratio of the light-off period in the frame period is "Xb", and the number of sub-frame periods is "k", the "light-up timing control part" can perform controls with the light-off period and the number of blocks set according to the black image insertion rate, by satisfying the co-relational condition between the black image insertion rate Xp and the light-off rate Xb expressed as follows.

$$Xb \leqq Xp-(V\text{disp}/kN)/V\text{total}$$

Further, in this case, the light-up timing control part can drive-control each of the light source blocks by dividing the blocks to satisfy "N≧6/k". This makes it possible to obtain a still greater picture quality as in the case of the obtained subjective results in the first exemplary embodiment.

Further, the "light-up timing control part" can control each of the light sources by dividing the backlight source into three or more blocks (N is equal to or larger than 3) under the condition where the number (k) of the frame periods is 2, the black insertion rate (Xp) is 0.5, and the light-off rate Xb is 0.25. Furthermore, the "light-up timing control part" can control each of the light sources by dividing the backlight source into four or more blocks (N is equal to or larger than 4) under the condition where the number (k) of the frame periods is 2, the black insertion rate (Xp) is 0.5, and the light-off rate Xb is 0.375.

Third Exemplary Embodiment

Figure 44:
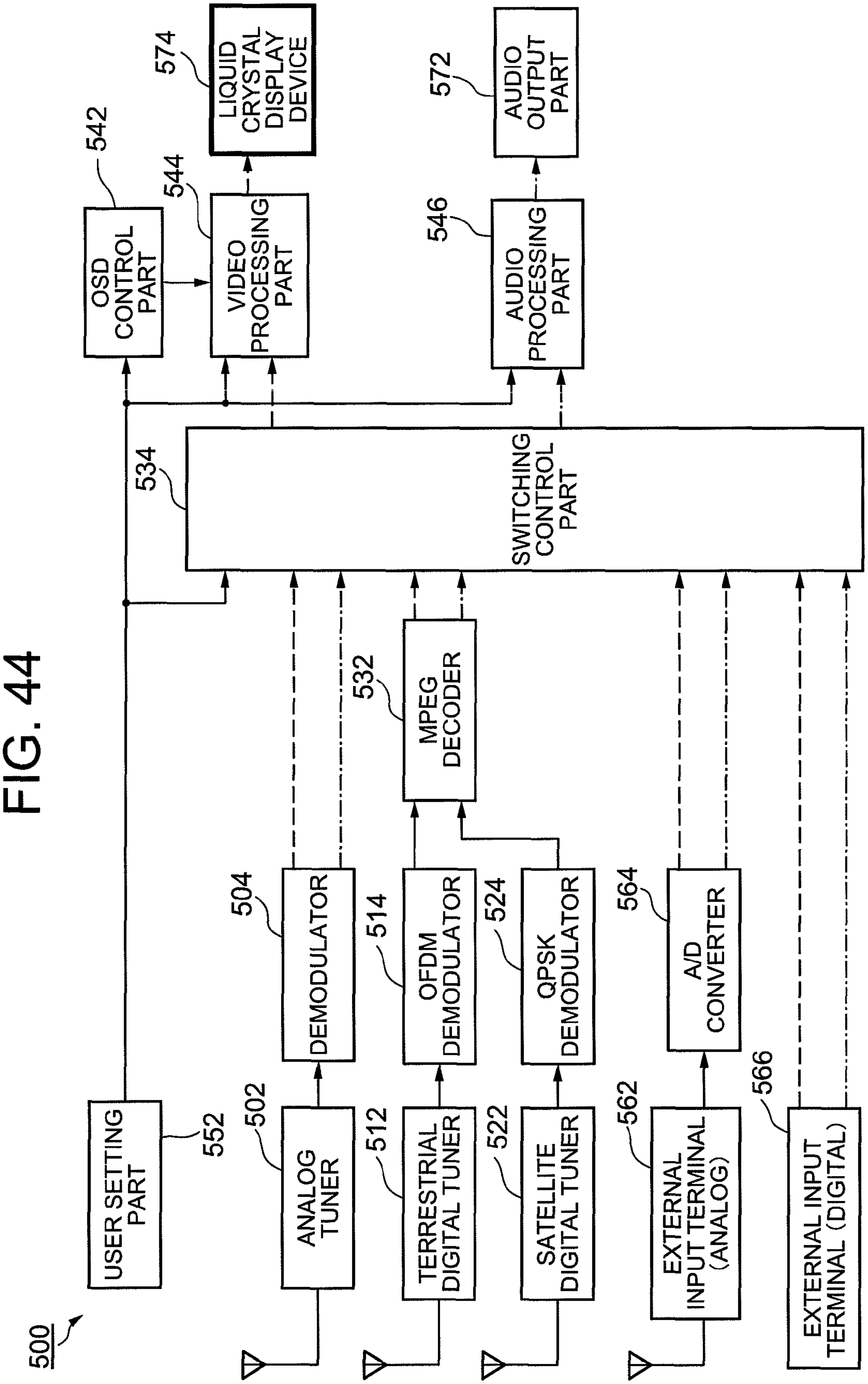
FIG. 44 is a block diagram showing an example of a schematic structure of a broadcast receiving device according to a third exemplary embodiment of the invention.

Next, a third exemplary embodiment of the invention will be described by referring to FIG. 44. Hereinafter, explanations of substantially the same structures and the processing procedures as those of the first exemplary embodiment are omitted, and only the different points are described. FIG. 44 is a block diagram showing an example of the third exemplary embodiment in which a liquid crystal display device having the display panel control device of the invention is applied to a broadcast receiving device.

As shown in FIG. 44, a broadcast receiving device 500 is configured, including a liquid crystal display device 574 that has the same structure as any of the liquid crystal display devices according to the above-described exemplary embodiments.

The broadcast receiving device 500 is configured, further including: an analog tuner 502 used for terrestrial analog broadcasting; a demodulator 504 which demodulates signals from the analog tuner 502; a digital tuner 512 used for terrestrial digital broadcasting; an OFDM demodulator 514 which demodulates signals from the terrestrial digital tuner 512; a satellite digital tuner 522 used for satellite digital broadcasting; a QPSK demodulator 524 which demodulates signals from the satellite digital tuner 522; an MPEG decoder 532 which decodes compression coded data of moving picture compression coding mode such as MPEG-2, e.g., video of the terrestrial digital broadcasting or video of the satellite digital broadcasting; an external input terminal 562 as a first external input terminal for inputting analog signals; an external input terminal 566 as a second external input terminal for inputting digital signals; a user setting part 552; a switching control part 534; an OSD control part 542; a video processing part 544; an audio processing part 546; and an audio output part 572.

When receiving a terrestrial analog broadcast by the broadcast receiving device 500, signals from the analog tuner 502 connected to the antenna for receiving the terrestrial analog broadcast are separated into video signals and audio signals by the demodulator 504 to generate the video signals, and the video signals are inputted to the switching control part 534.

When receiving a terrestrial digital broadcast by the broadcast receiving device 500, signals from the terrestrial digital tuner 512 connected to the antenna for receiving the terrestrial digital broadcast are separated into digital video signals and digital audio signals by the OFDM (Orthogonal Frequency Division Multiplexing) demodulator 514 to generate the video signals. The video is restored to generate the video signals by the MPEG (Moving Picture Export Group) decoder 532, and the video signals are inputted to the switching control part 534.

When receiving a satellite digital broadcast by the broadcast receiving device 500, signals from the satellite digital tuner 522 connected to the antenna for receiving the satellite digital broadcast are separated into digital video signals and digital audio signals by the QPSK (Quadrature Phase Shift Keying) demodulator 524 to generate the video signals. The video is restored to generate the video signals by the MPEG (Moving Picture Export Group) decoder 532, and the video signals are inputted to the switching control part 534.

Regarding the input signals inputted from the outside, the analog signal is digitalized to generate the video signal, and inputted to the switching control part 534. Regarding the digital input, the video signal is inputted to the switching control part 534. These input signals are switched by the user setting part 552 according to a user channel setting, and sent to the video processing part 544. The video processing part 544 performs IP conversion, format conversion with a scalar or the like, and video adjustment such as the brightness, contrast, and colors, and then inputs the signals to the liquid crystal display device 574.

As described above, it is possible with the exemplary embodiment to achieve a low-cost broadcast receiving device which can provide images with less moving picture blurring by applying any of the liquid crystal display devices of the above-described exemplary embodiments to the broadcast receiving device.

While the broadcast receiving device is described by referring to the cases of displaying videos by receiving variety of broadcast signals of the analog broadcasting, terrestrial digital broadcasting, the satellite digital broadcasting, and the like, the device is not limited to receive any kinds of broadcast signals.

Further, the block structures of the broadcast receiving device in FIG. 44 disclosed in the above-described embodiment are merely presented as a way of example, and the point thereof is to use the liquid crystal display device of any of the above-described exemplary embodiments as the display part of the broadcast receiving device. As the structures of the broadcast receiving device, there are various other structures that can be considered (e.g., a broadcast receiving device which receives only analog broadcasts, a broadcast receiving device which receives only terrestrial digital broadcasts, a broadcast receiving device which receives only satellite digital broadcasts, a broadcast receiving device obtained by adding other functions to the structure of the exemplary embodiment). The structures used as the display parts thereof are not limited by those structures.

Further, while the broadcast receiving device is illustrated in the case of FIG. 44, it is also possible to achieve images with less moving picture blurring at a low cost even when one of the liquid crystal display devices of the above-described exemplary embodiments is used as a monitor.

Other structures, steps, functions, and operational effects are the same as those of the first exemplary embodiment described above.

Further, the operational contents of each step and feature elements of each part described above may be put into programs to be executed by the computer.

Fourth Exemplary Embodiment

Figure 45:
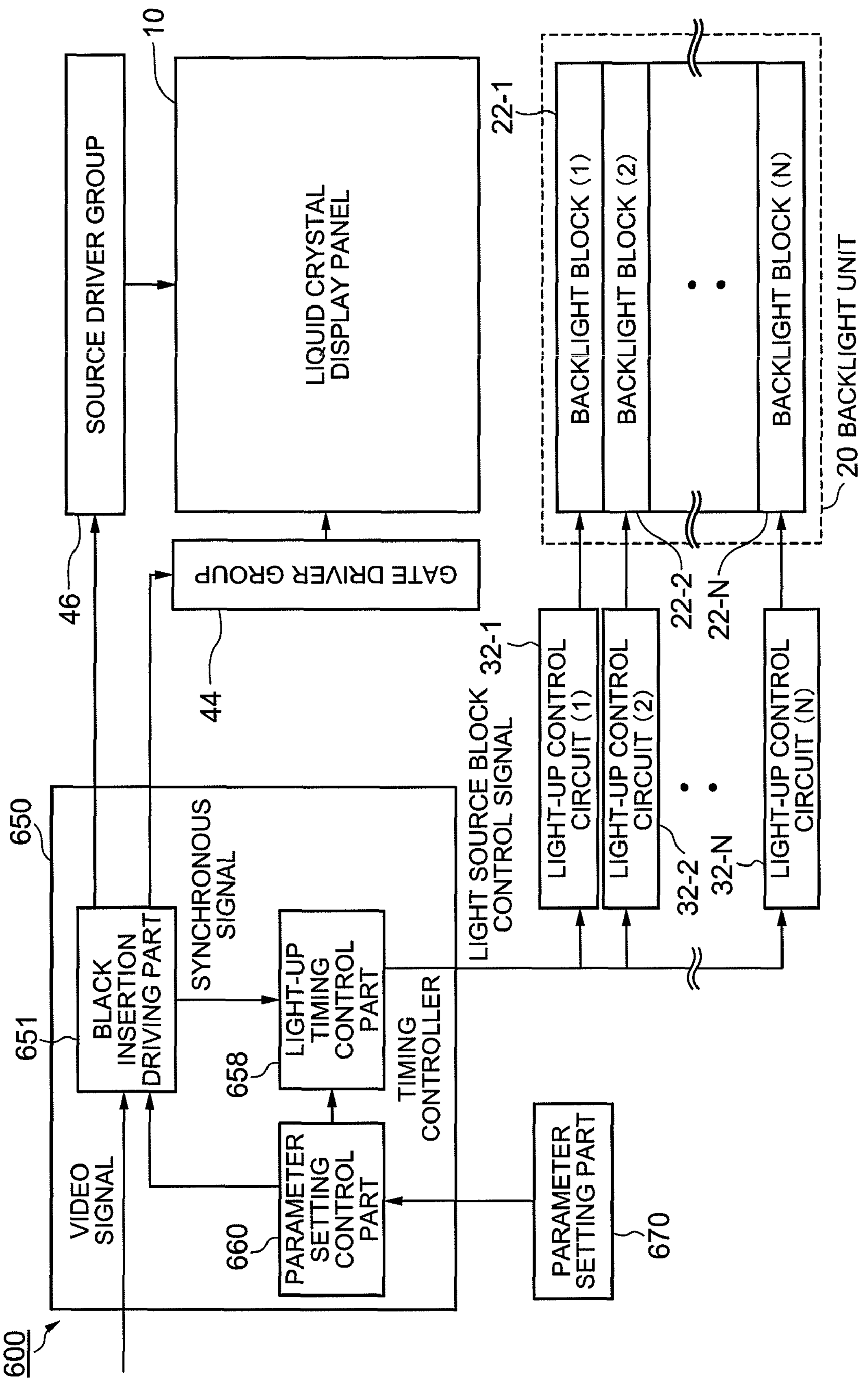
FIG. 45 is a block diagram showing an example of a schematic structure of a broadcast receiving device according to a fourth exemplary embodiment of the invention.

Next, a fourth exemplary embodiment of the invention will be described by referring to FIG. 45. Hereinafter, explanations of substantially the same structures as those of the first exemplary embodiment are omitted, and only the different points are described. FIG. 45 is a block diagram showing an example of the fourth exemplary embodiment of the display panel control device according to the invention.

In this exemplary embodiment, a timing controller is structured to be capable of controlling the setting of various kinds of parameters.

Specifically, as shown in FIG. 45, a liquid crystal display device 600 according to this exemplary embodiment is configured, including: a liquid crystal display panel 10 in the same structure as that of the first exemplary embodiment; a gate driver group 44; a source driver group 46; a backlight unit 20 configured with a plurality (N) of backlight blocks 22 (22-1 to 22-N); N-number of light-up control circuits 32 (32-1 to 32-N); a timing controller 650 that is capable of performing setting-controls of various kinds of parameters; and a parameter setting part 670 that is capable of setting the various kinds of parameters.

The timing controller 650 is configured, including: a black insertion driving part 651 for performing black insertion drive in the liquid crystal display panel 10; a light-up timing control part 658 which generates various kinds of control signals (light source block control signals) for respectively controlling a light-up start timing and a light-off start timing of the N-umber of light-up control circuits 32 (32-1 to 32-N) based on the synchronous signals from the black insertion driving part 651; and a parameter setting control part 660 which is capable of calculating setting conditions based on the various kinds of parameters set by the parameter setting part 670, and capable of performing setting-controls so that the black insertion driving part 651 and the light-up timing control part 658 execute the controls based on the setting conditions.

As a way of example, it is also possible to be in such a structure that the parameter setting control part 660 determines the black insertion rate and the light-off rate in accordance with determined moving picture improvement information, and the black insertion driving part 651 performs panel controls based on the black insertion rate, while the light-up timing control part 658 performs backlight light-up controls based on the light-off rate.

This makes it possible to correspond to the parameters (black insertion rate, etc.) which may fluctuate by the user setting and the like, and to correspond to the cases where the degree of improvements in the motion blur is adjusted.

The black insertion driving part 651 and the light-up timing control part 658 can correspond to Vtotal which changes in accordance with the inputted video signals.

Further, it is also possible to set any of those parameters from outside (parameter setting part 670).

Furthermore, as another example, the parameter setting control part 660 can separately set parameters when designing LCD. In this case, examples of the parameters that can be separately set are the dividing number of backlight, the response correction, liquid crystal panel response, backlight optical response, and the black insertion rate.

Other structures, steps, functions, and operational effects are the same as those of the first exemplary embodiment described above. Further, the operational contents of each step and feature elements of each part described above may be put into programs to be executed by the computer.

Fifth Exemplary Embodiment

Figure 46:
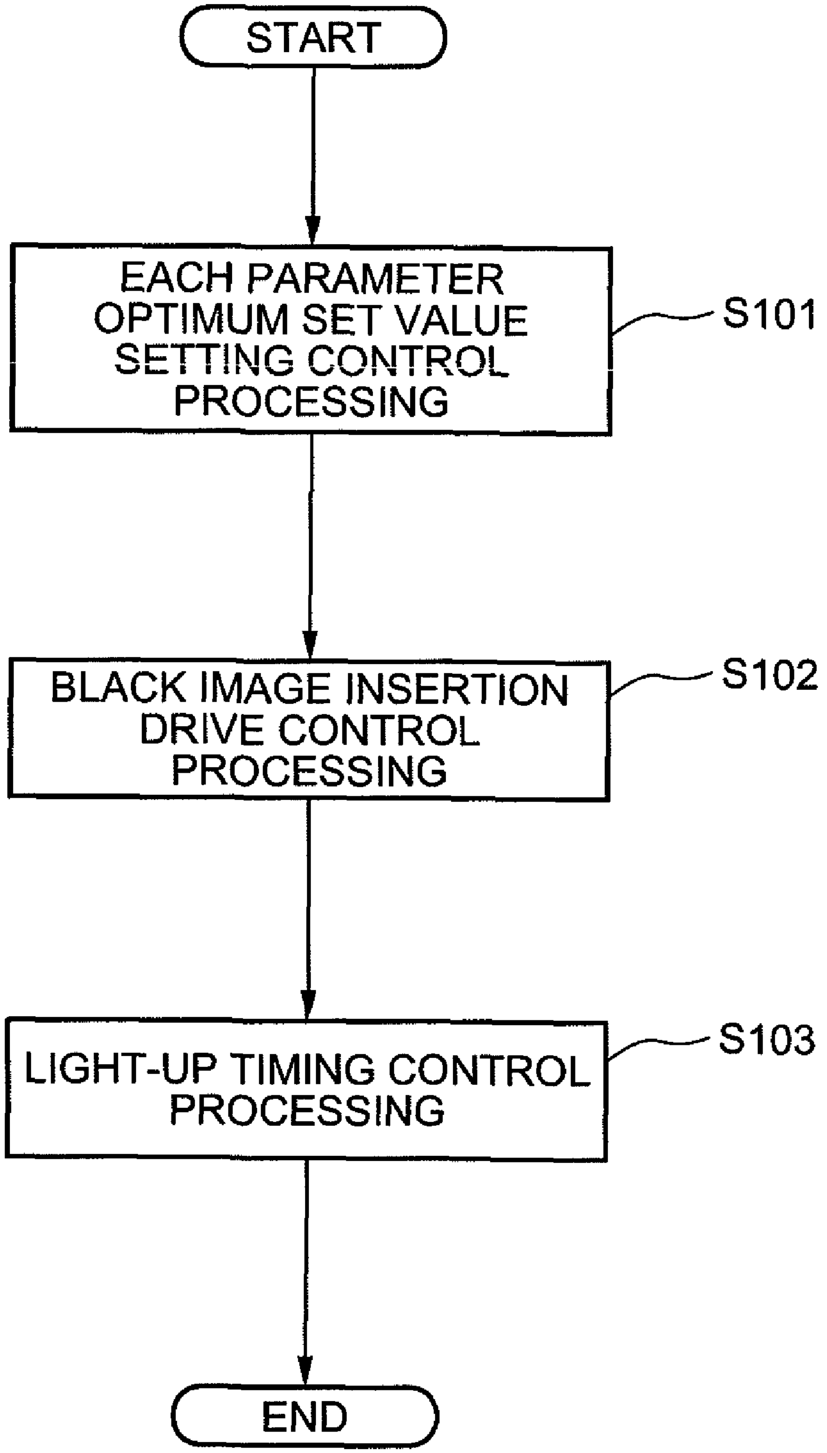
FIG. 46 is a flowchart showing an example of drive control procedures of a liquid crystal display device according to a fifth exemplary embodiment of the invention.
Figure 47:
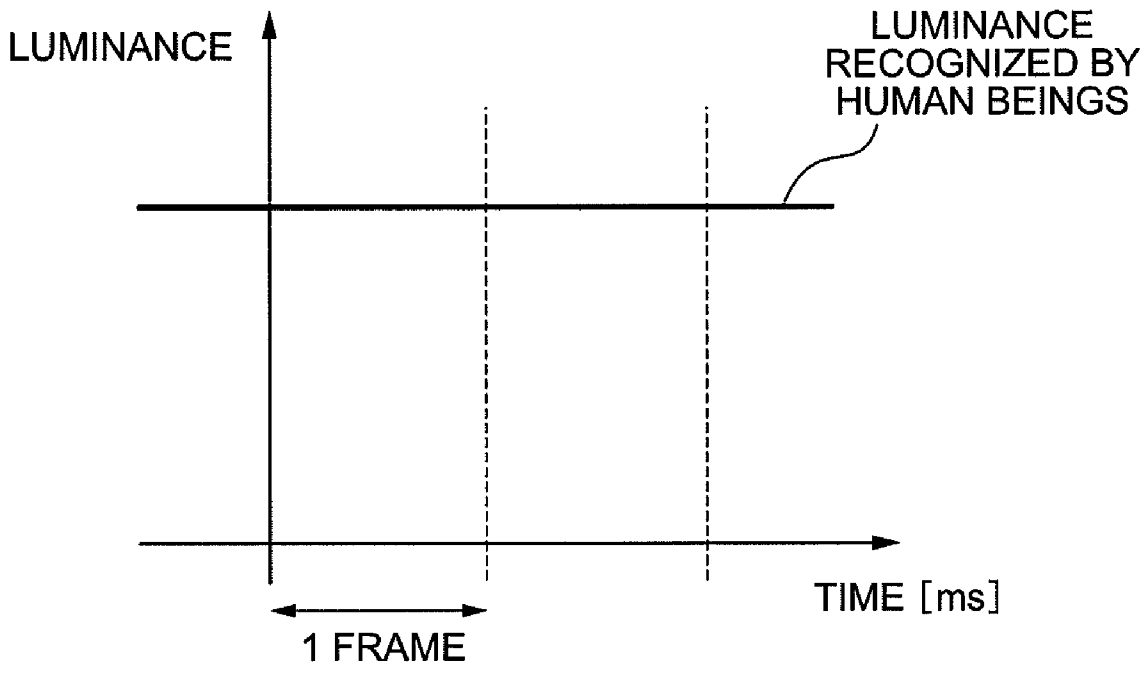
FIG. 47 is an illustration for describing an example of a state of luminance waveforms of the liquid crystal display device, which is an explanatory diagram showing a case of normal drive with all-white display.
Figure 48:
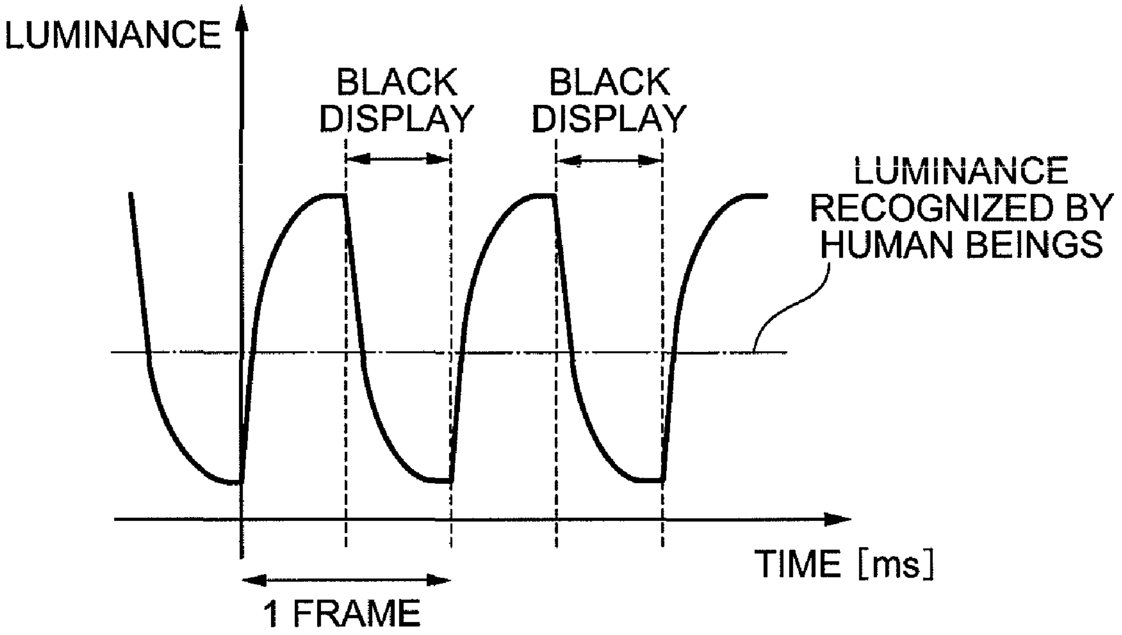
FIG. 48 is an illustration for describing an example of a state of luminance waveforms of the liquid crystal display device, which is an explanatory diagram showing a case of black insertion drive with all-white display.
Figure 49:
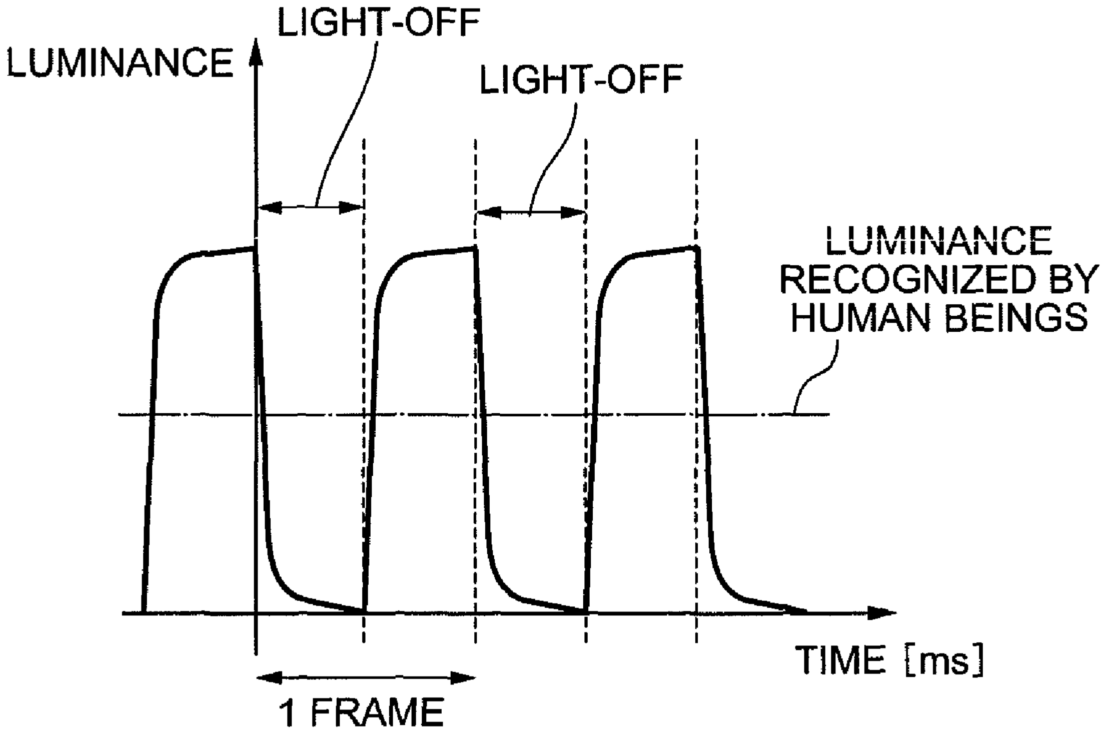
FIG. 49 is an illustration for describing an example of a state of luminance waveforms of the liquid crystal display device, which is an explanatory diagram showing a case of scanning backlight drive with all-white display.
Figure 50:
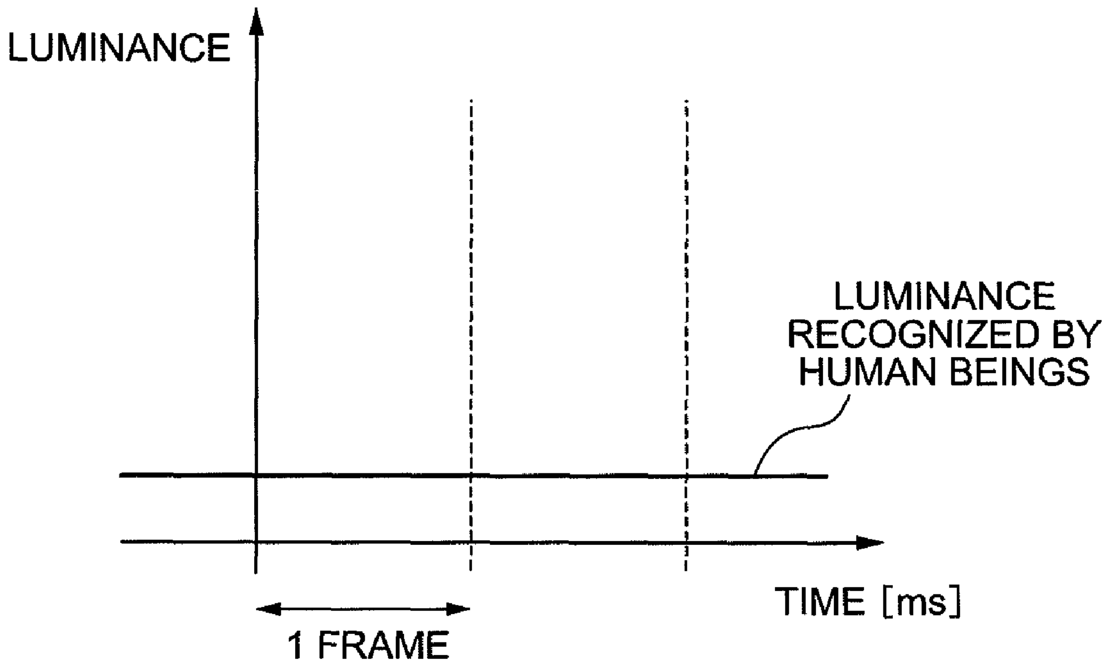
FIG. 50 is an illustration for describing an example of a state of luminance waveforms of the liquid crystal display device, which is an explanatory diagram showing a case of normal drive with all-black display.
Figure 51:
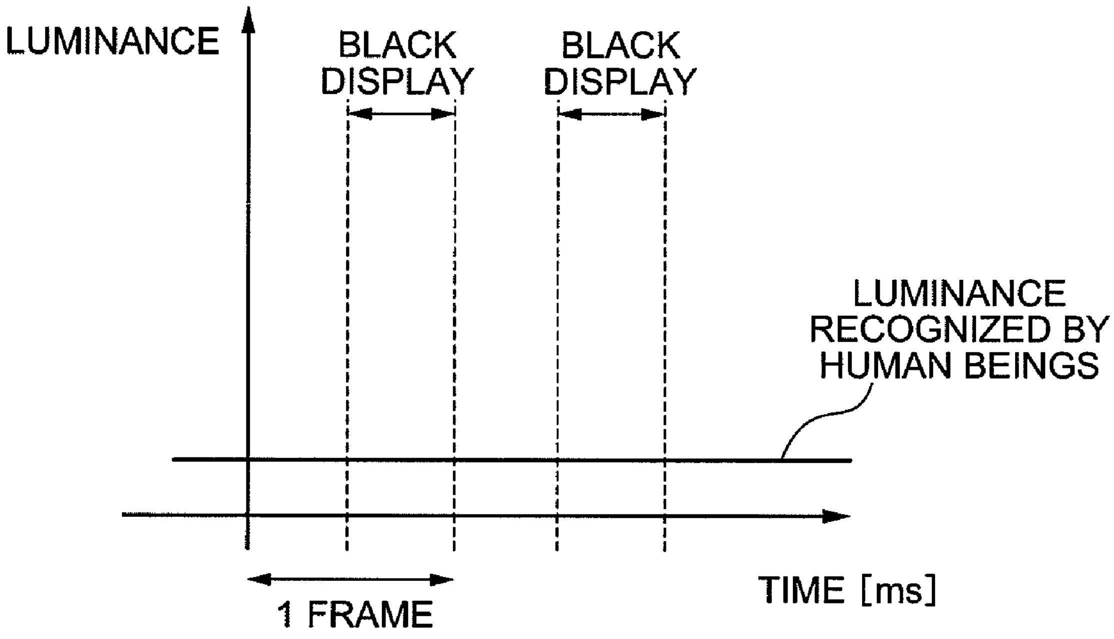
FIG. 51 is an illustration for describing an example of a state of luminance waveforms of the liquid crystal display device, which is an explanatory diagram showing a case of black insertion drive with all-black display.
Figure 52:
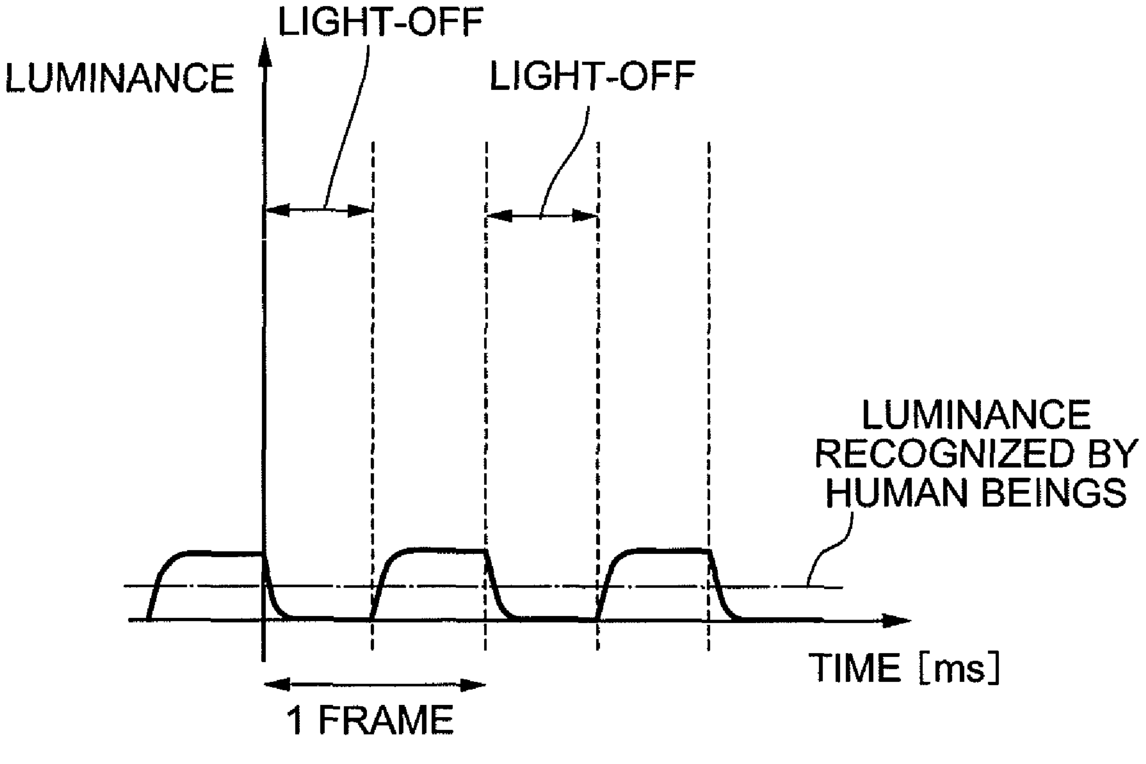
FIG. 52 is an illustration for describing an example of a state of luminance waveforms of the liquid crystal display device, which is an explanatory diagram showing a case of scanning backlight drive with all-black display.
Figure 53:
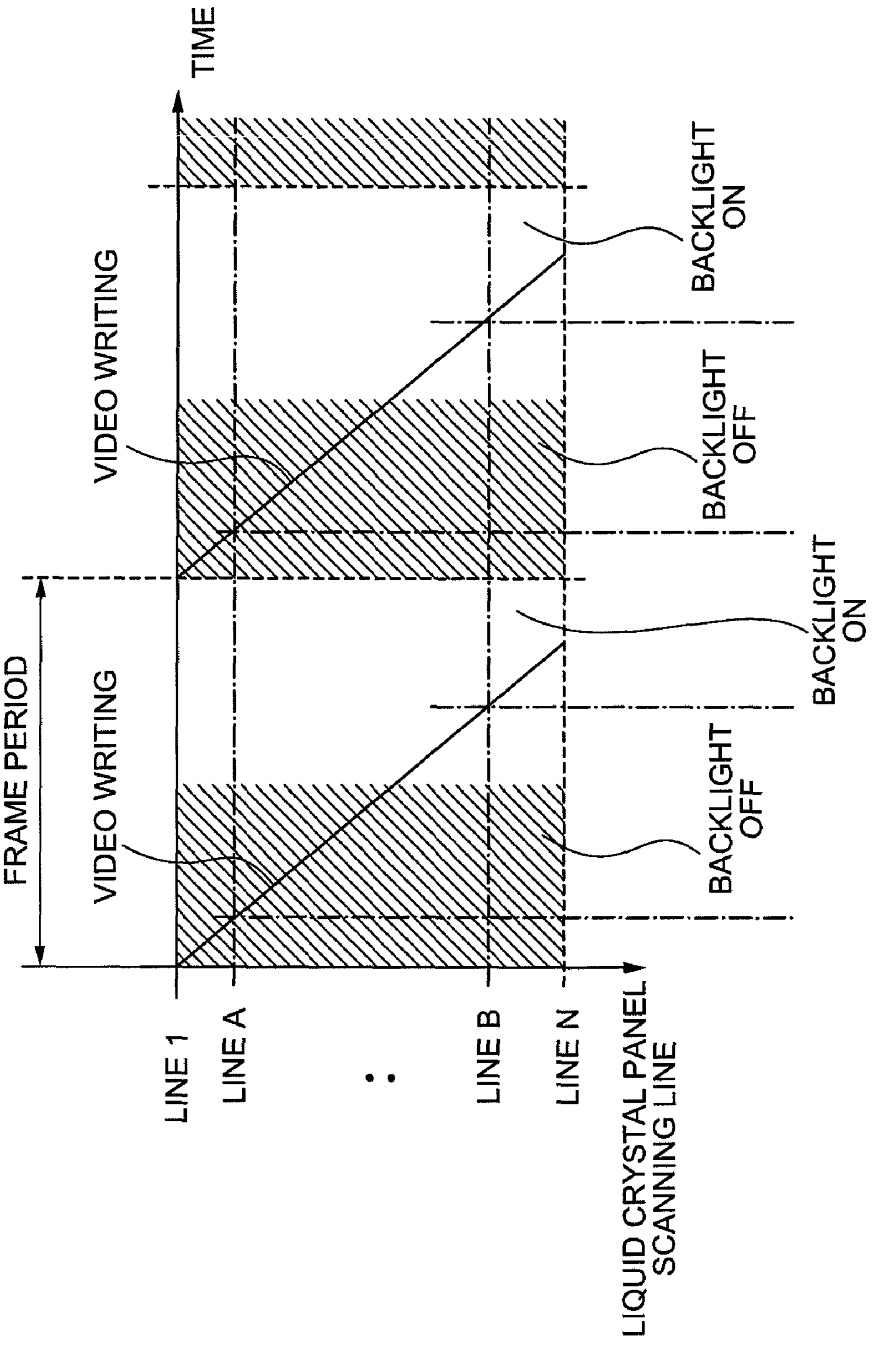
FIG. 53 is an explanatory diagram for describing an example of corresponding relation between a video writing period and a light-up period as well as light-off period of a backlight with blinking backlight drive performed by the liquid crystal display device.
Figure 54:
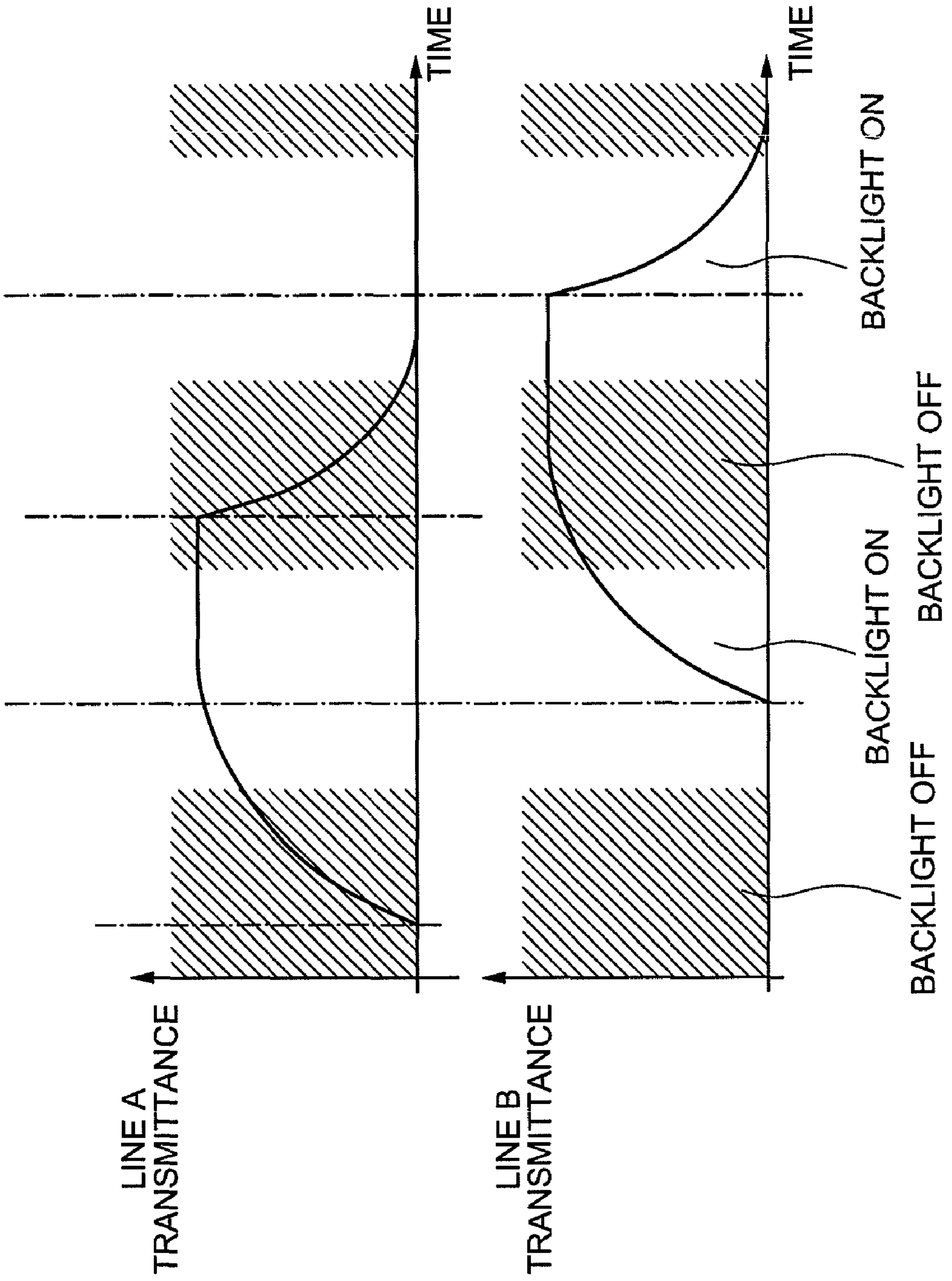
FIG. 54 is an explanatory diagram for describing examples of liquid crystal transmittance waveform of line A and liquid crystal transmittance waveform of line B shown in FIG. 51.
Figure 55:
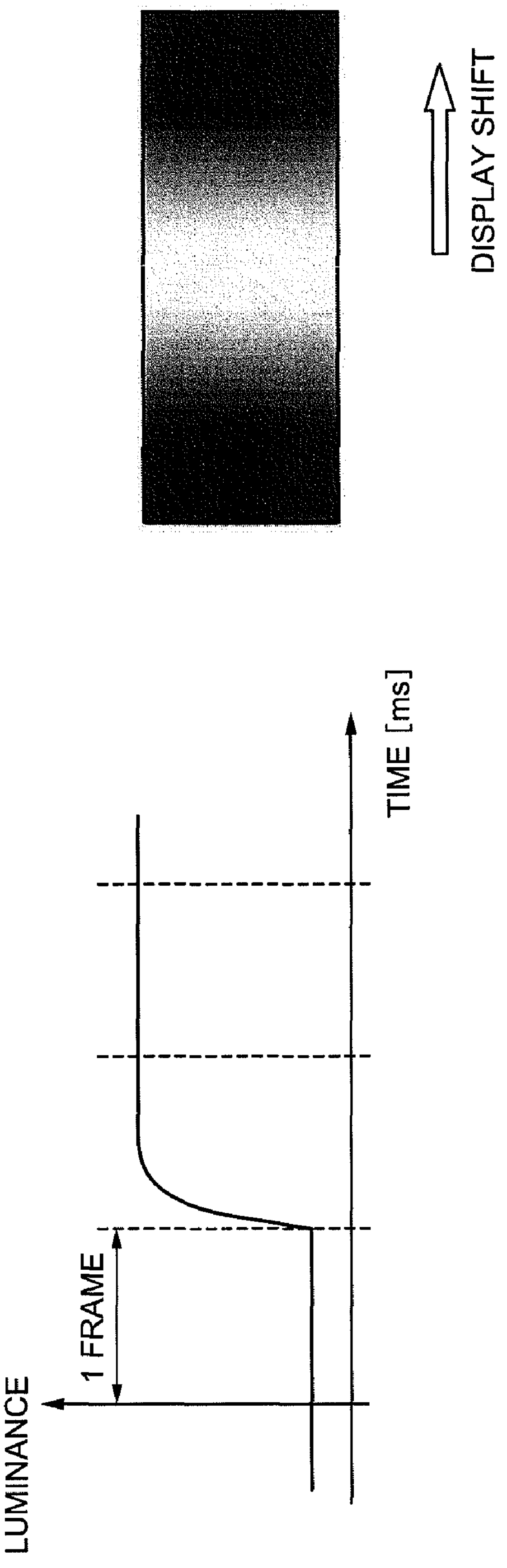
FIG. 55 is an illustration for describing light-off state and motion blur caused due to light leakage between light source blocks, which is an explanatory diagram showing examples of luminance waveforms and a moving picture state in normal drive.
Figure 56:
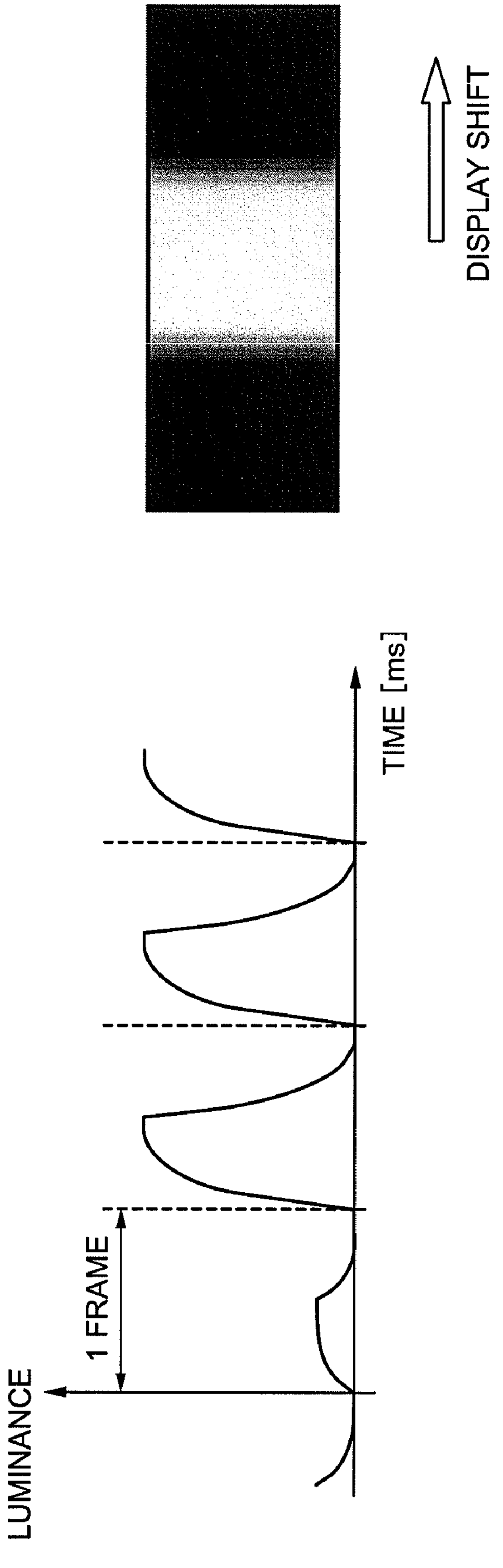
FIG. 56 is an illustration for describing light-off state and motion blur caused due to light leakage between light source blocks, which is an explanatory diagram showing examples of luminance waveforms and a moving picture state in scanning backlight drive that has no light leakage between the light source blocks.
Figure 57:
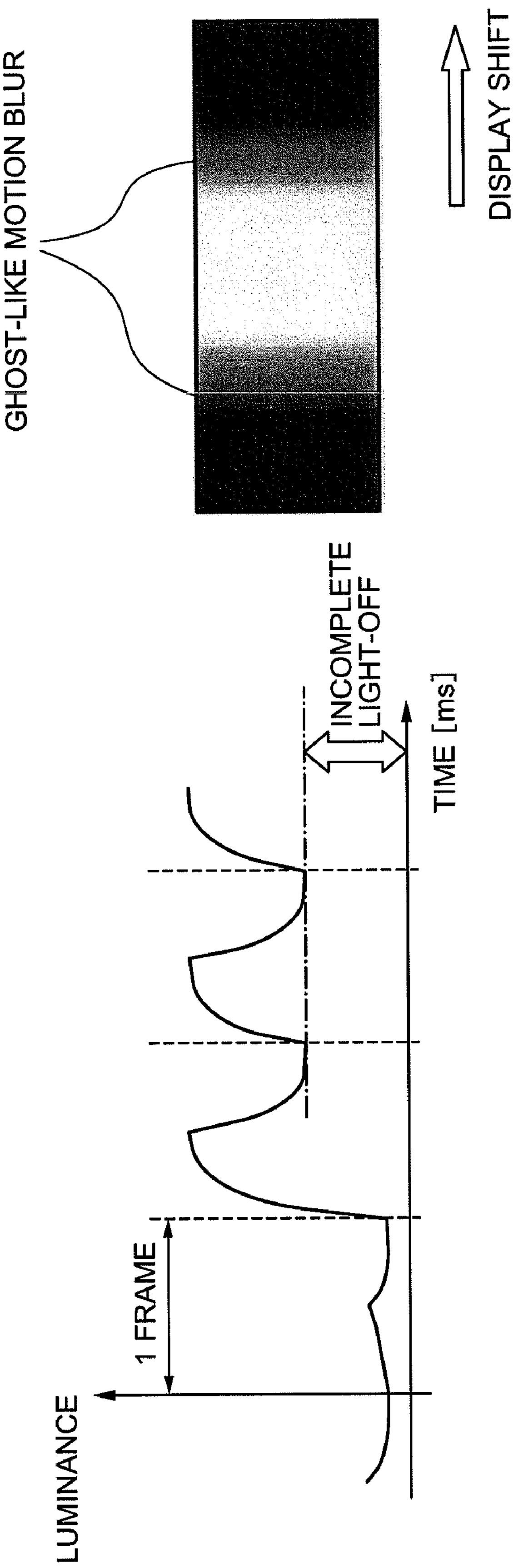
FIG. 57 is an illustration for describing light-off state and motion blur caused due to light leakage between light source blocks, which is an explanatory diagram showing examples of luminance waveforms and a moving picture state in scanning backlight drive in a case of incomplete light-off state caused due to light leakage between the light source blocks.
Figure 58:
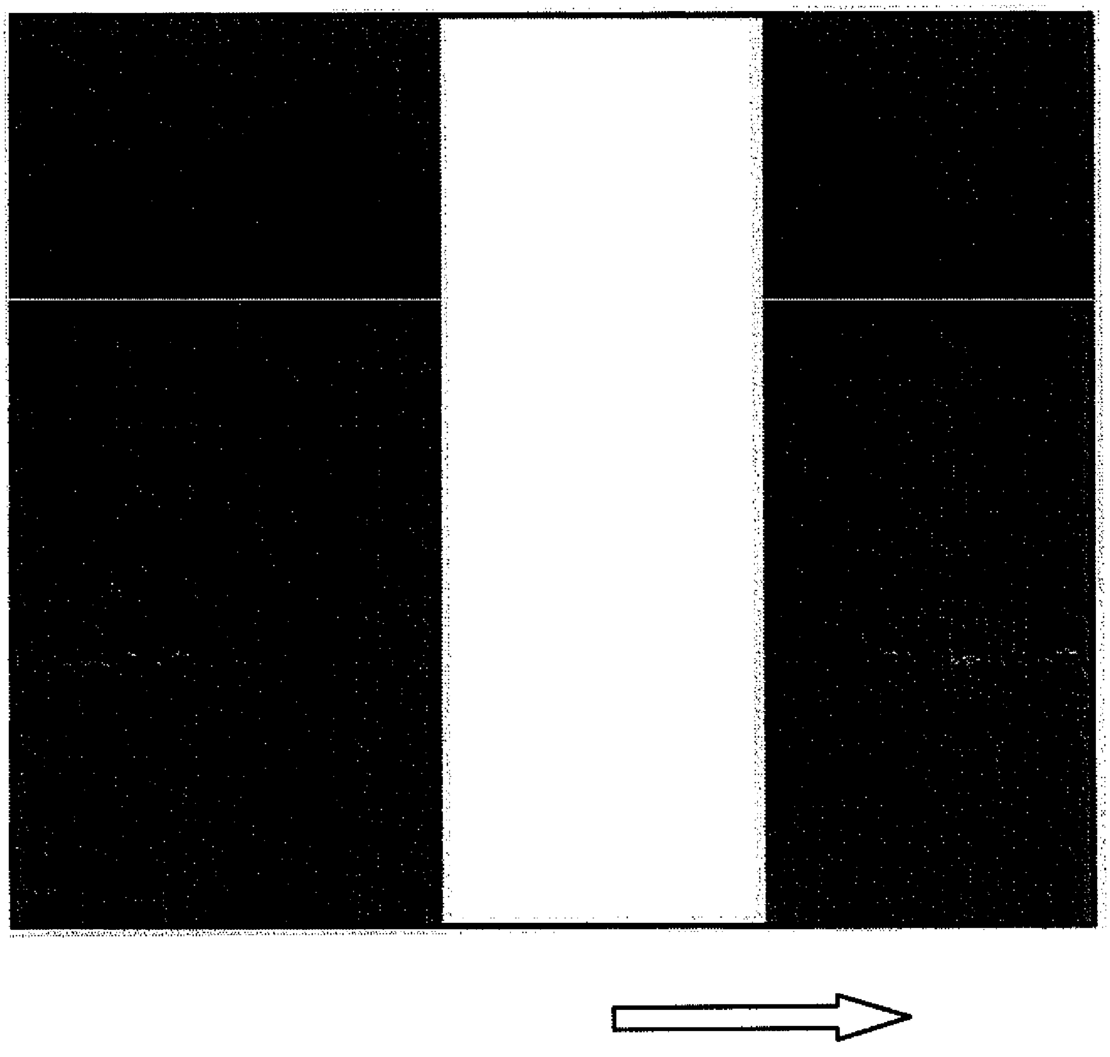
FIG. 58 is an illustration for describing a moving picture obtained by line sequential drive and scanning backlight drive performed in the liquid crystal display device, which is an explanatory diagram showing an example of an input image.
Figure 59:
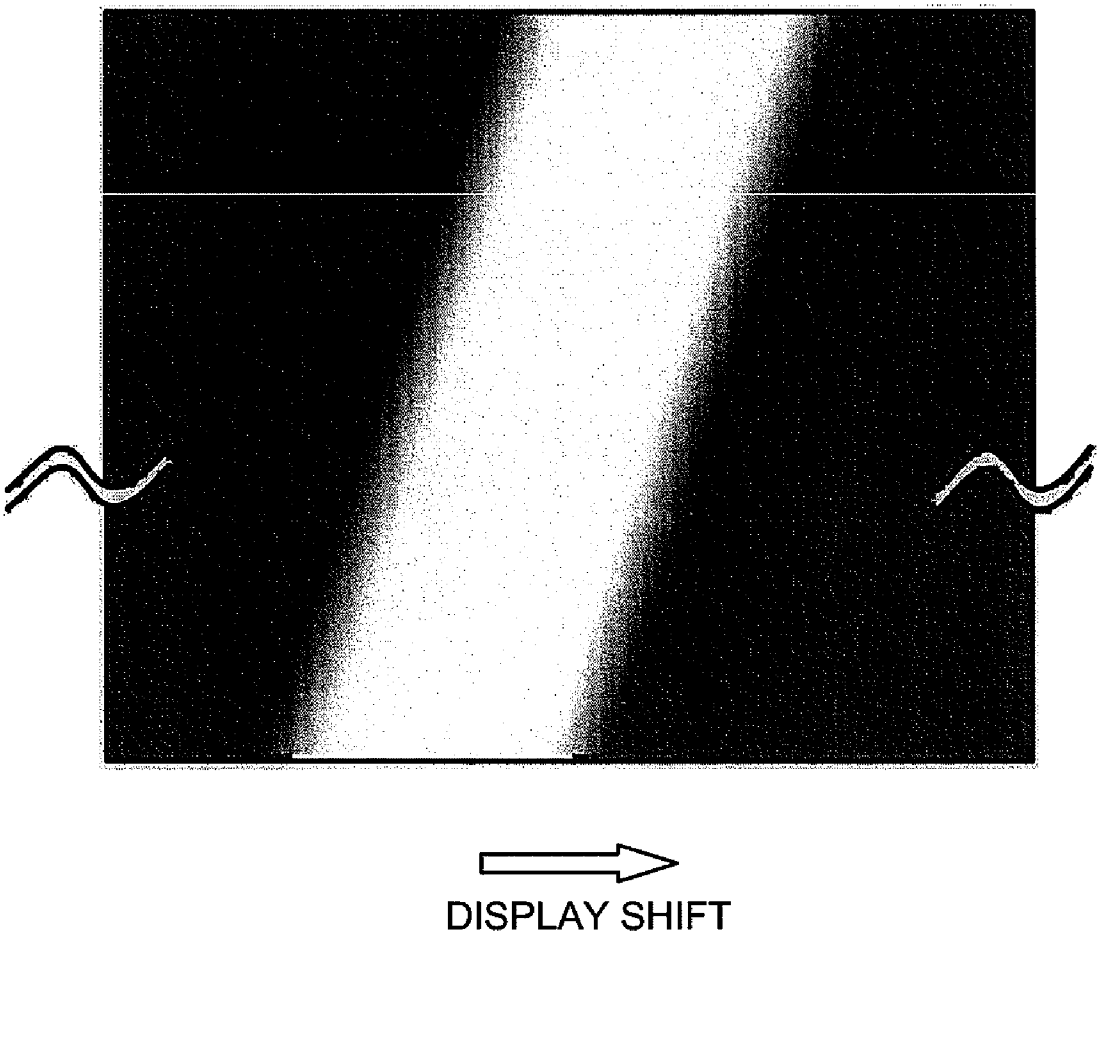
FIG. 59 is an illustration for describing a moving picture obtained by line sequential drive and scanning backlight drive performed in the liquid crystal display device, which is an explanatory diagram showing an example of a moving picture in black insertion drive.
Figure 60:
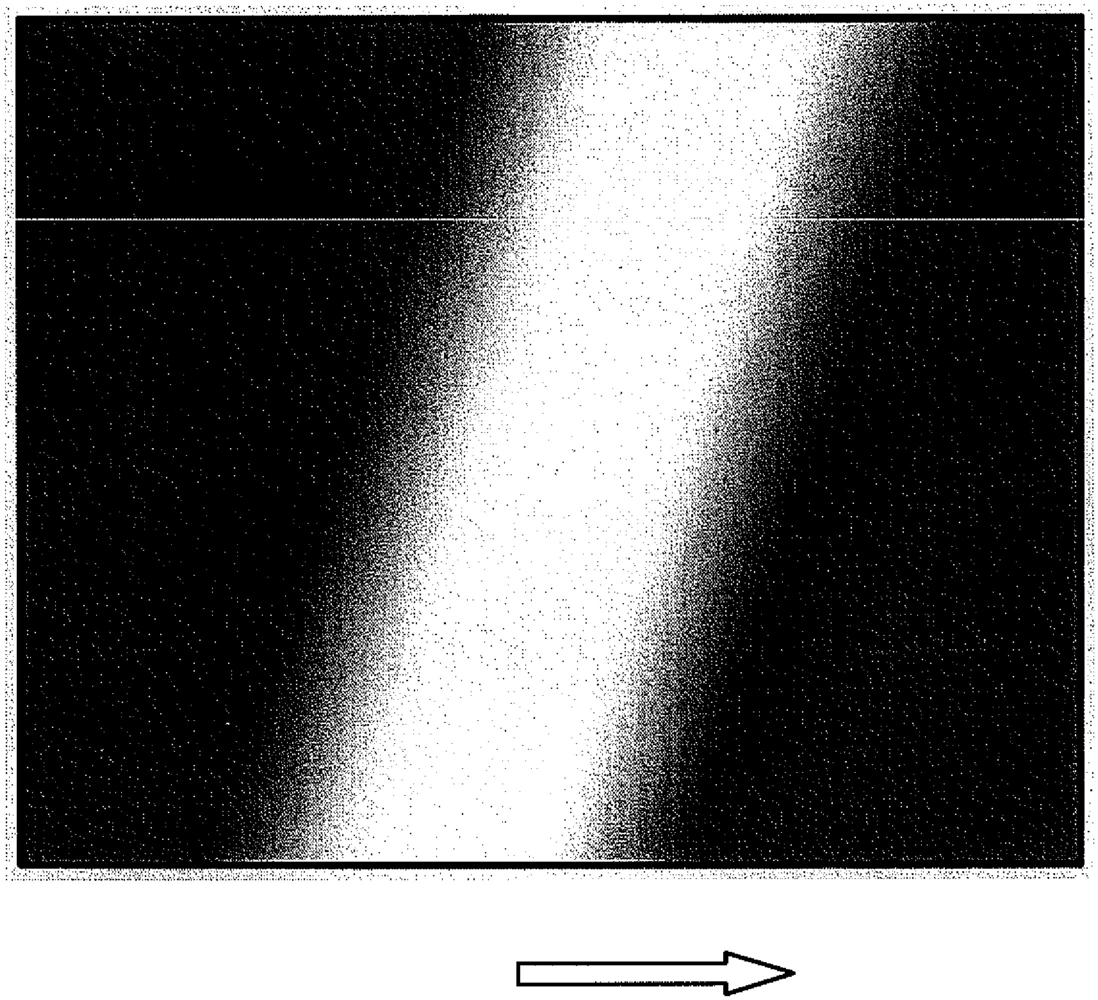
FIG. 60 is an illustration for describing light-off state and motion blur caused due to light leakage between light source blocks, which is an explanatory diagram showing examples of luminance waveforms and a moving picture state in normal drive (line sequential drive)
Figure 61:
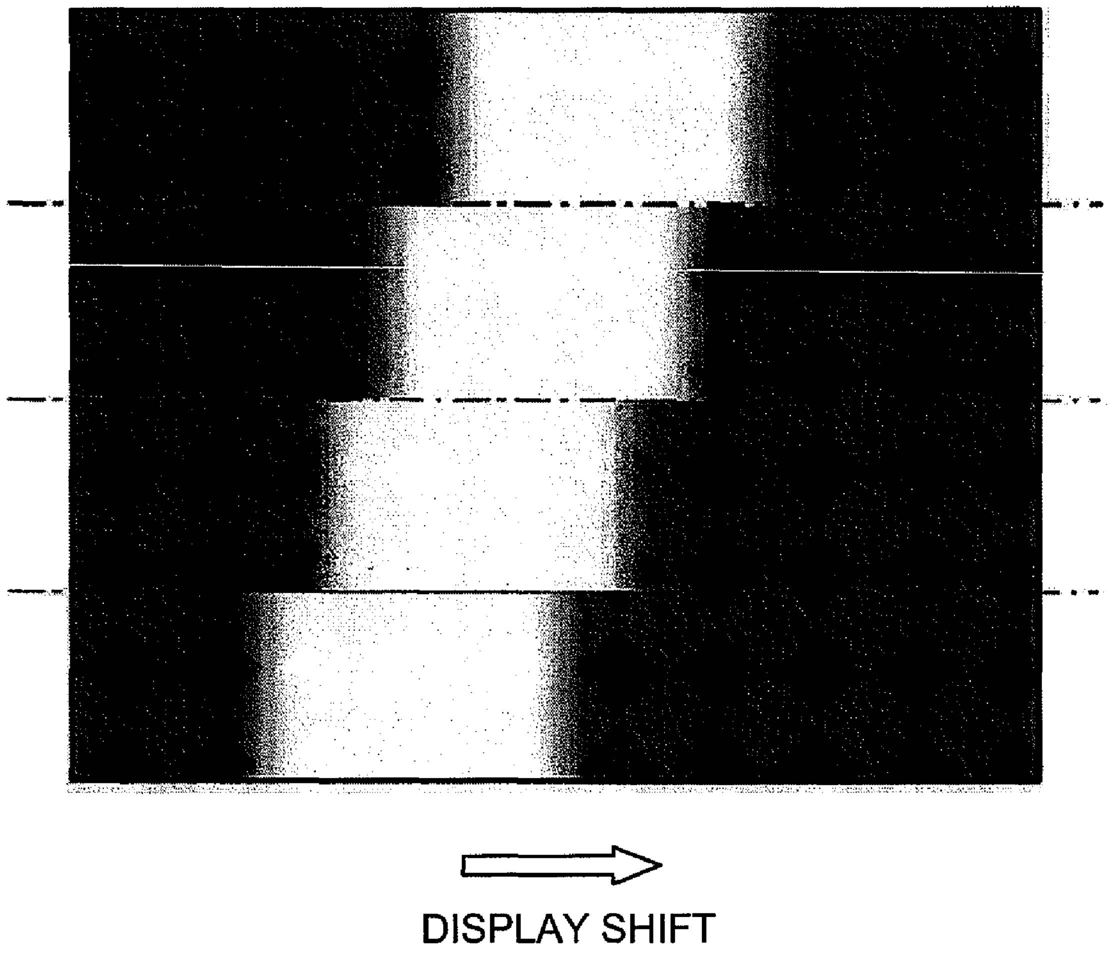
FIG. 61 is an illustration for describing light-off state and motion blur caused due to light leakage between light source blocks, which is an explanatory diagram showing examples of luminance waveforms and a moving picture state in scanning backlight drive.
Figure 62:
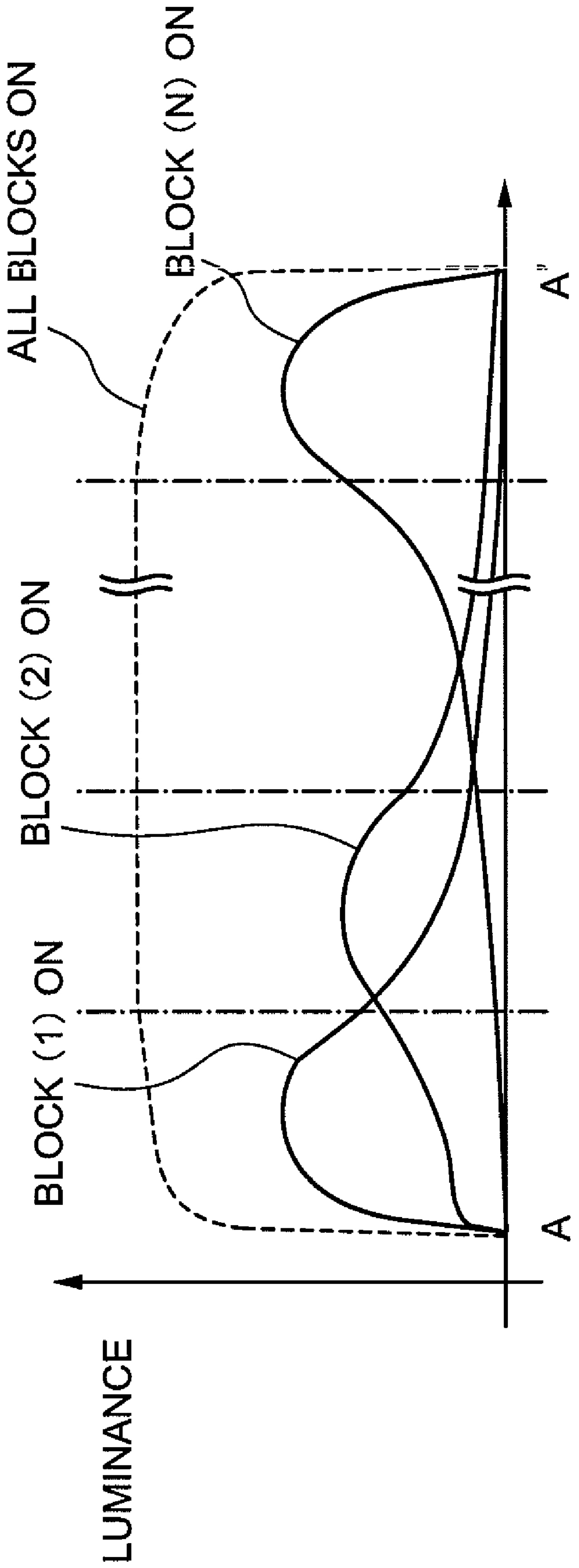
FIG. 62 is an illustration for describing individual differences regarding the luminance and chromaticity of light sources within light source blocks of the backlight of the liquid crystal display device, which is an explanatory diagram showing the luminance state of each block in a case of the backlight having no light-shielding structure.
Figure 63:
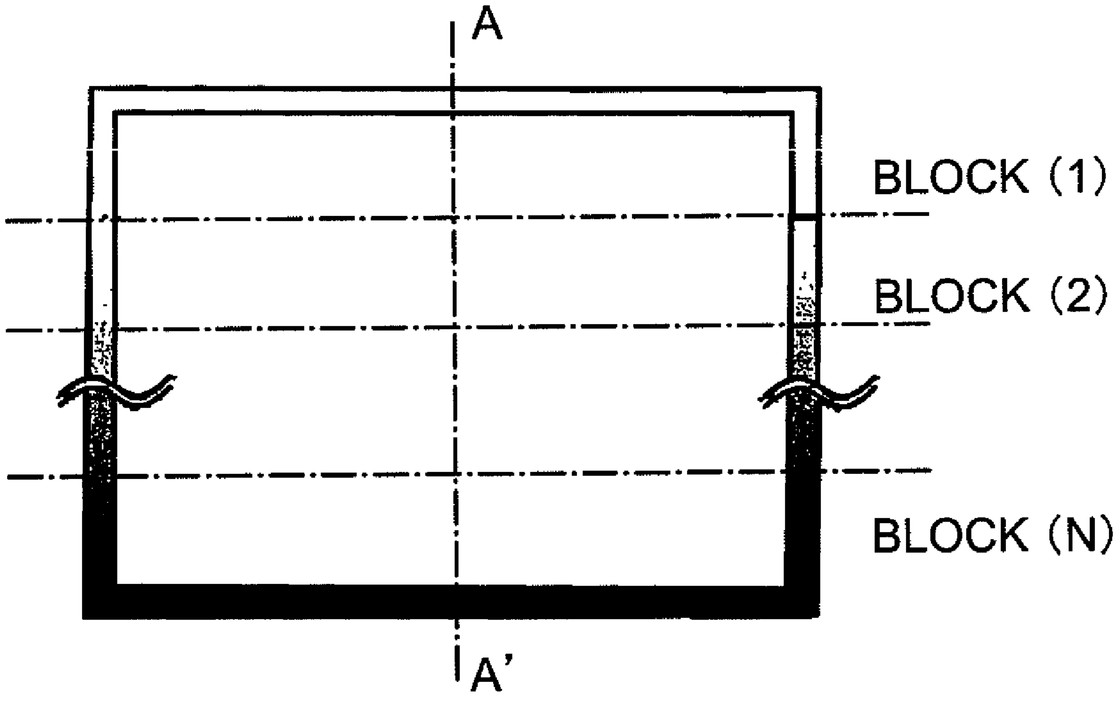
FIG. 63 is an illustration for describing individual differences regarding the luminance and chromaticity of light sources within light source blocks of the backlight of the liquid crystal display device, which is an explanatory diagram showing the chromaticity state of each block in a case of the backlight having no light-shielding structure.
Figure 64:
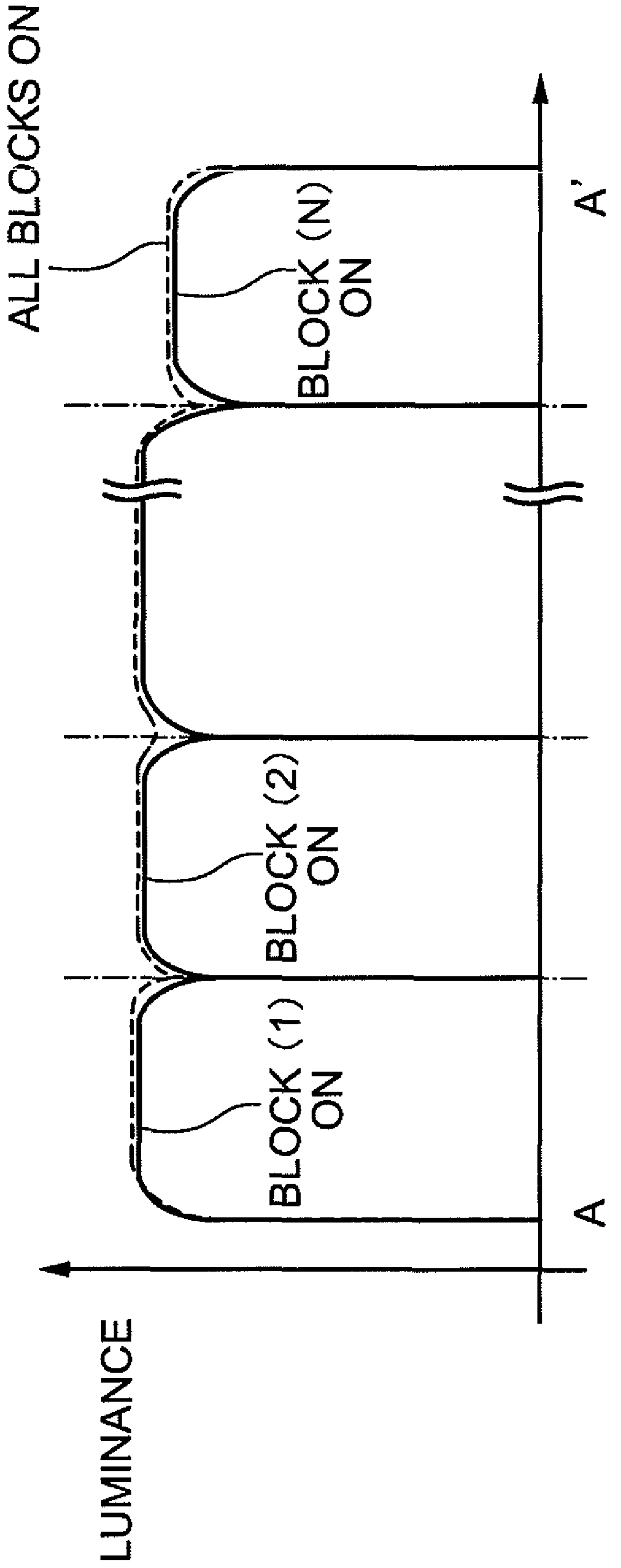
FIG. 64 is an illustration for describing individual differences regarding the luminance and chromaticity of light sources within light source blocks of the backlight of the liquid crystal display device, which is an explanatory diagram showing the luminance state of each block in a case of the backlight having perfect light-shielding structure.
Figure 65:
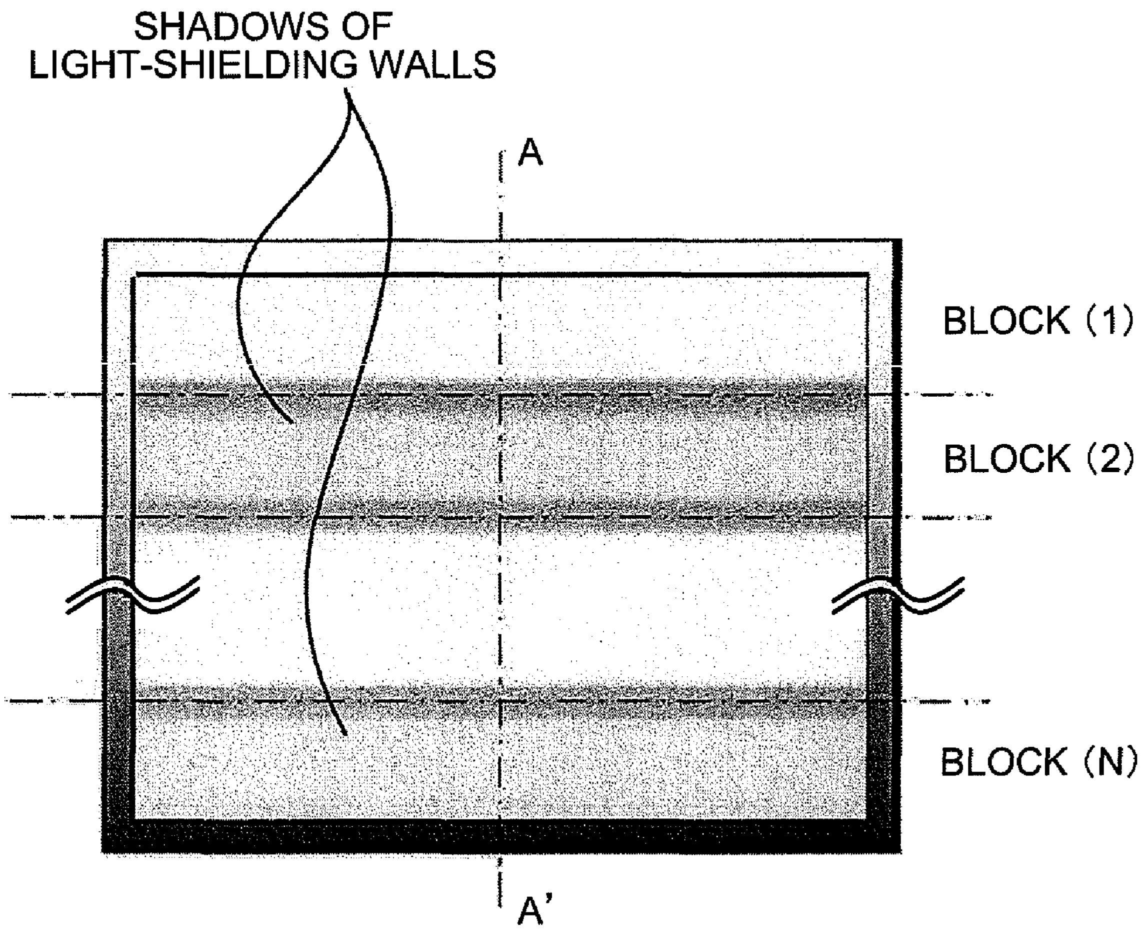
FIG. 65 is an illustration for describing individual differences regarding the luminance and chromaticity of light sources within light source blocks of the backlight of the liquid crystal display device, which is an explanatory diagram showing the chromaticity state of each block in a case of the backlight having perfect light-shielding structure.
Figure 66:
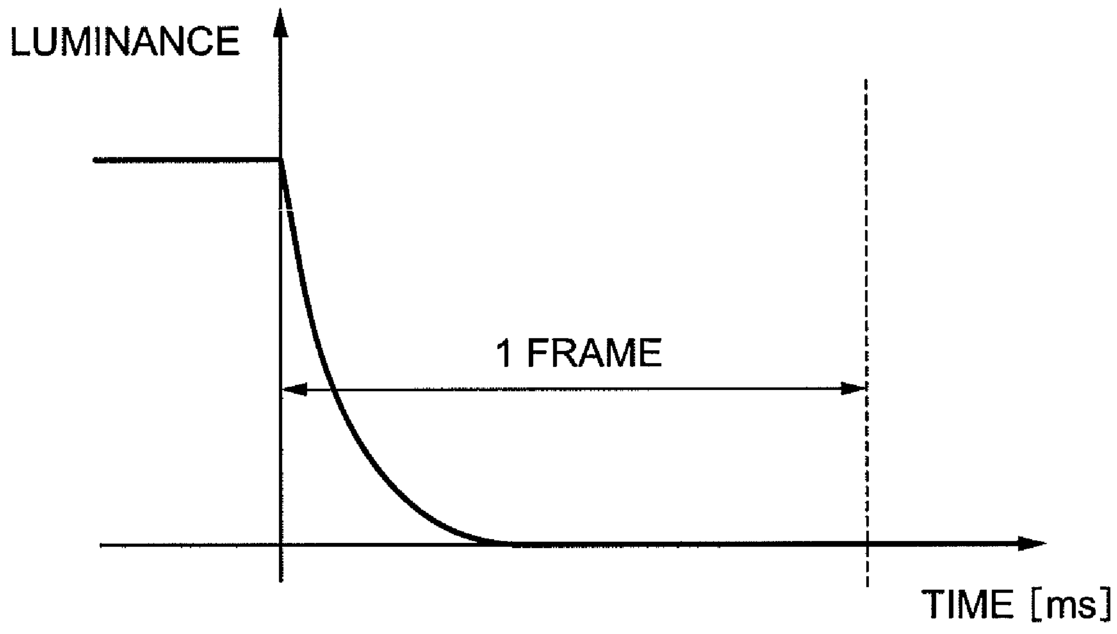
FIG. 66 is an explanatory diagram showing optical response property of respective wavelength of RGB of CCFL that is an example of a light source of the backlight of the liquid crystal display device, which shows the optical response property of Red in light-off state.
Figure 67:
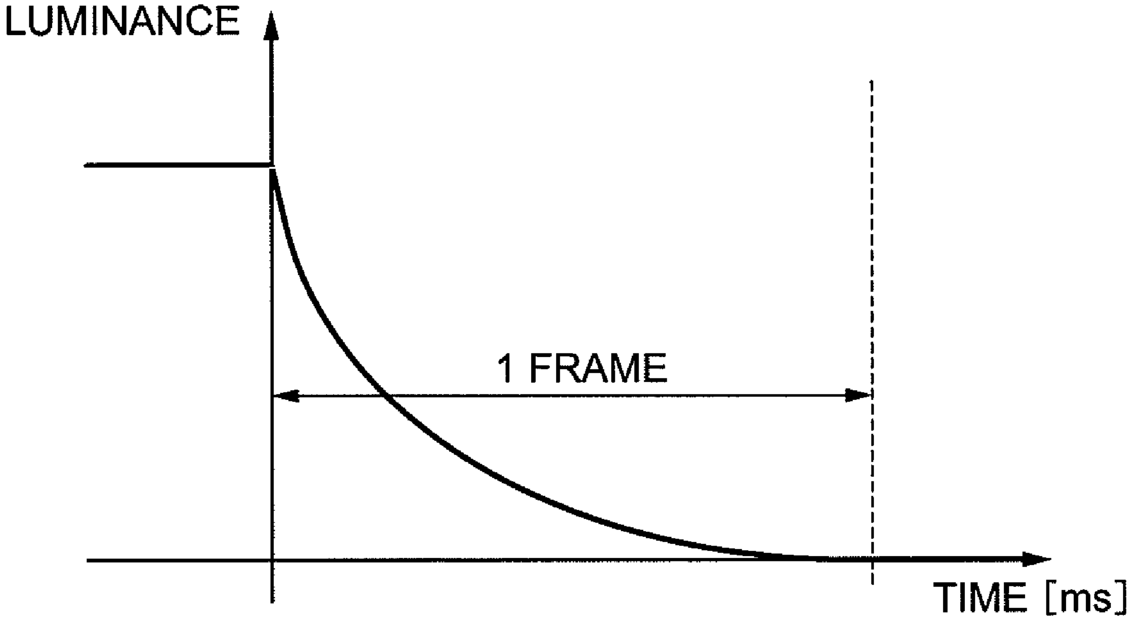
FIG. 67 is an explanatory diagram showing optical response property of respective wavelength of RGB of CCFL that is an example of a light source of the backlight of the liquid crystal display device, which shows the optical response property of Green in light-off state.
Figure 68:
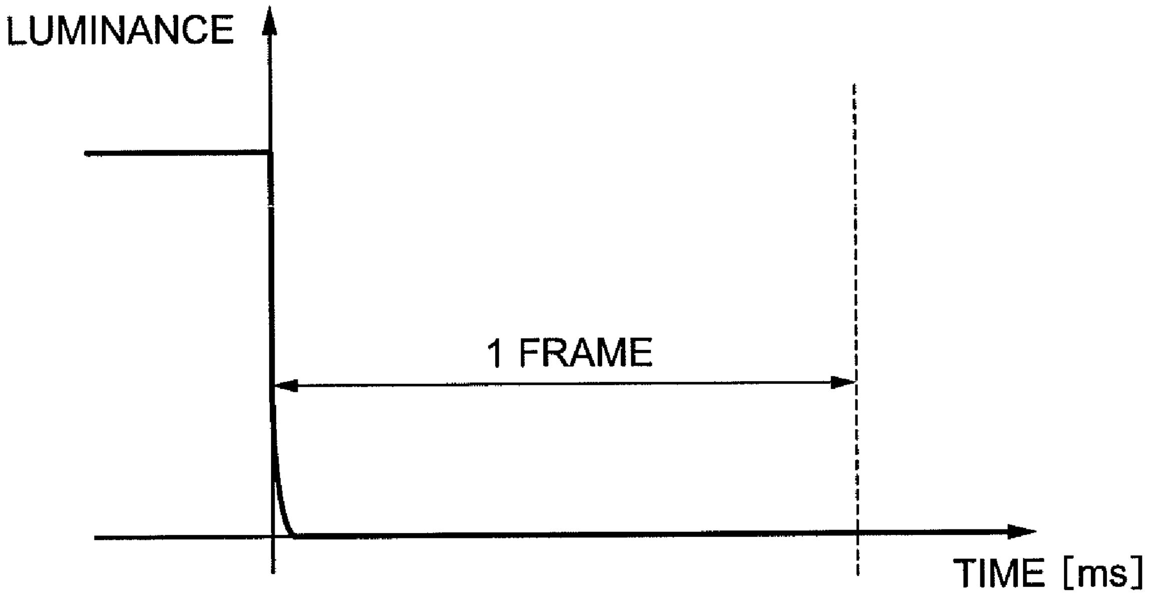
FIG. 68 is an explanatory diagram showing optical response property of respective wavelength of RGB of CCFL that is an example of a light source of the backlight of the liquid crystal display device, which shows the optical response property of Blue in light-off state.
Figure 69:
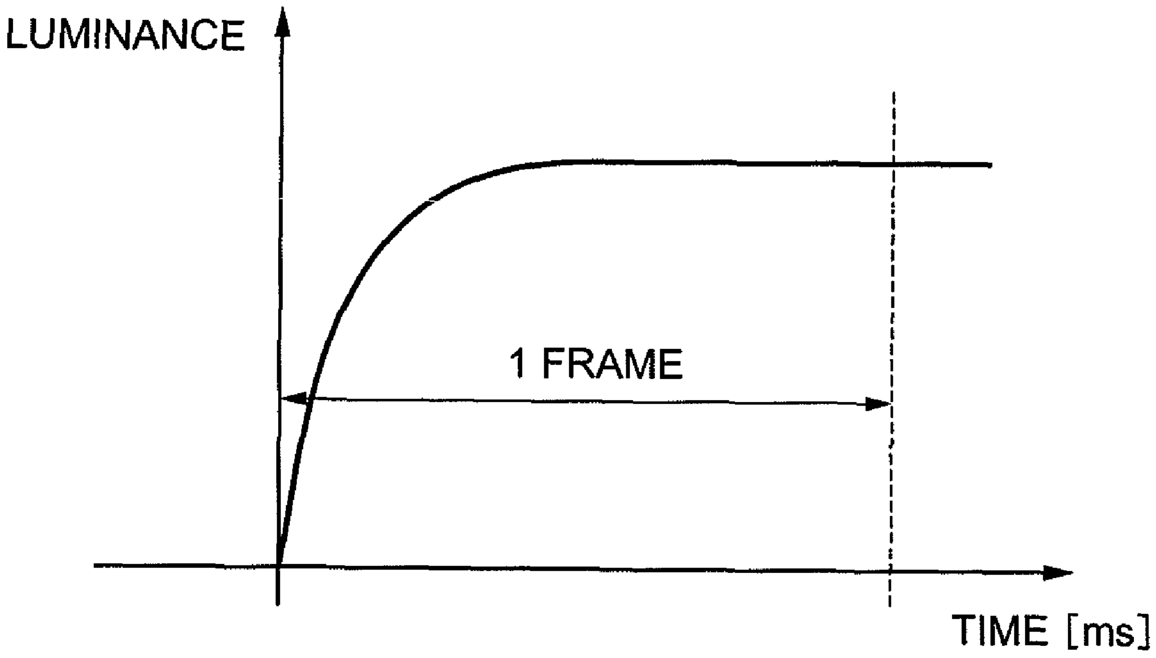
FIG. 69 is an explanatory diagram showing optical response property of respective wavelength of RGB of CCFL that is an example of a light source of the backlight of the liquid crystal display device, which shows the optical response property of Red in light-up state.
Figure 70:
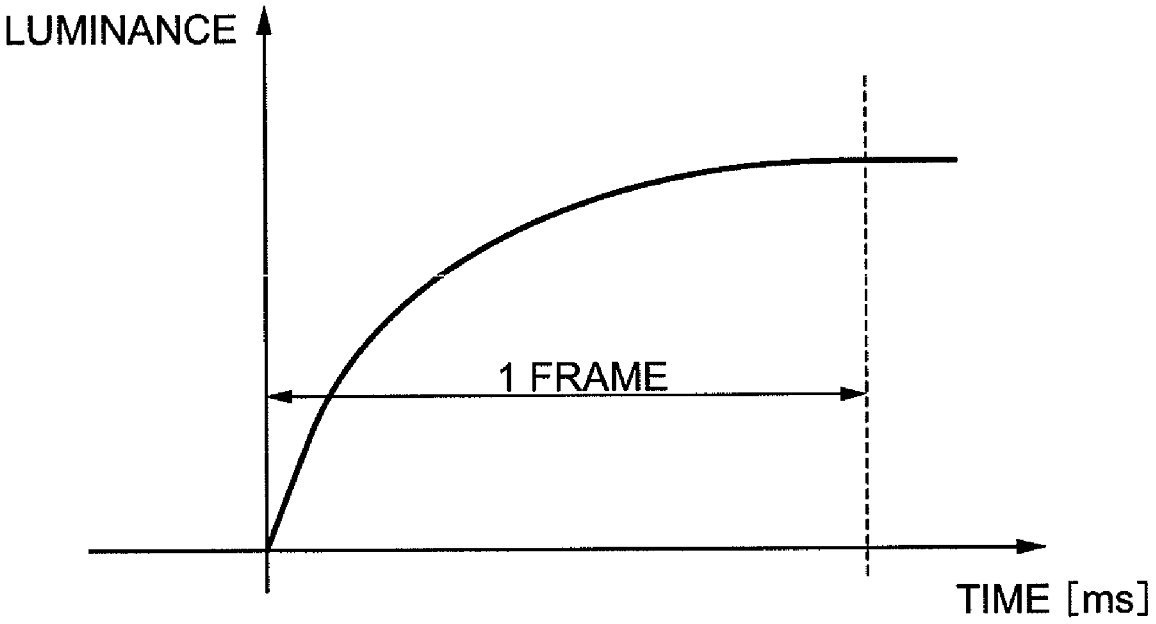
FIG. 70 is an explanatory diagram showing optical response property of respective wavelength of RGB of CCFL that is an example of a light source of the backlight of the liquid crystal display device, which shows the optical response property of Green in light-up state.
Figure 71:
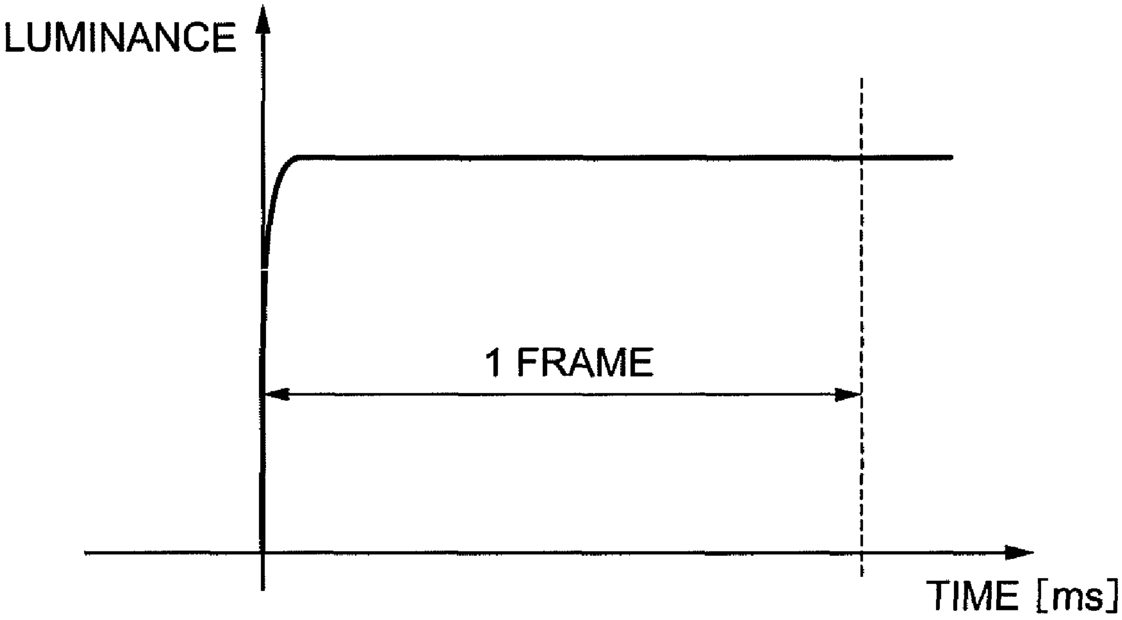
FIG. 71 is an explanatory diagram showing optical response property of respective wavelength of RGB of CCFL that is an example of a light source of the backlight of the liquid crystal display device, which shows the optical response property of Blue in light-up state.
Figure 72:
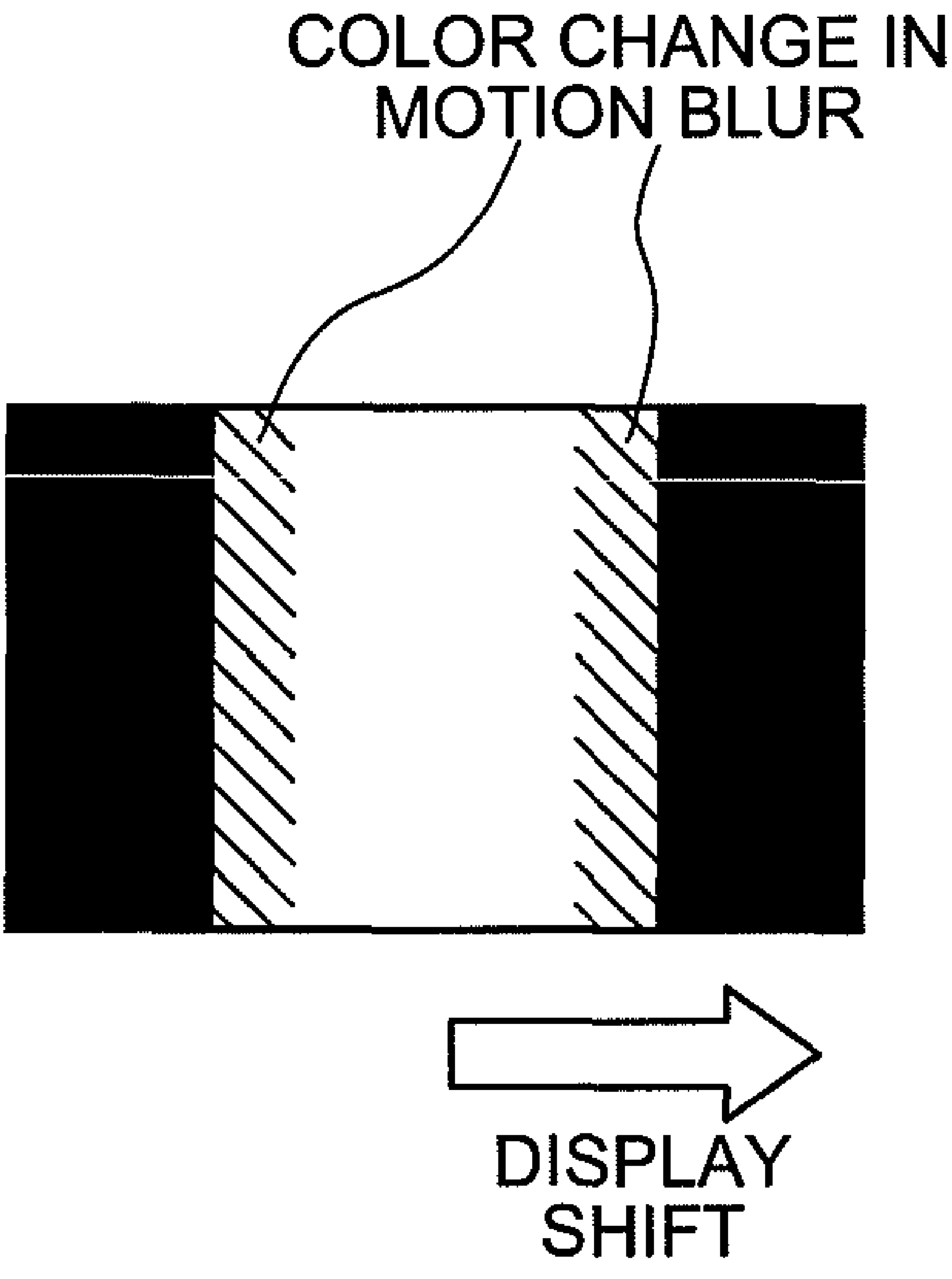
FIG. 72 is an explanatory diagram showing a state of color change in the motion blur generated in the liquid crystal display device.
Figure 73:
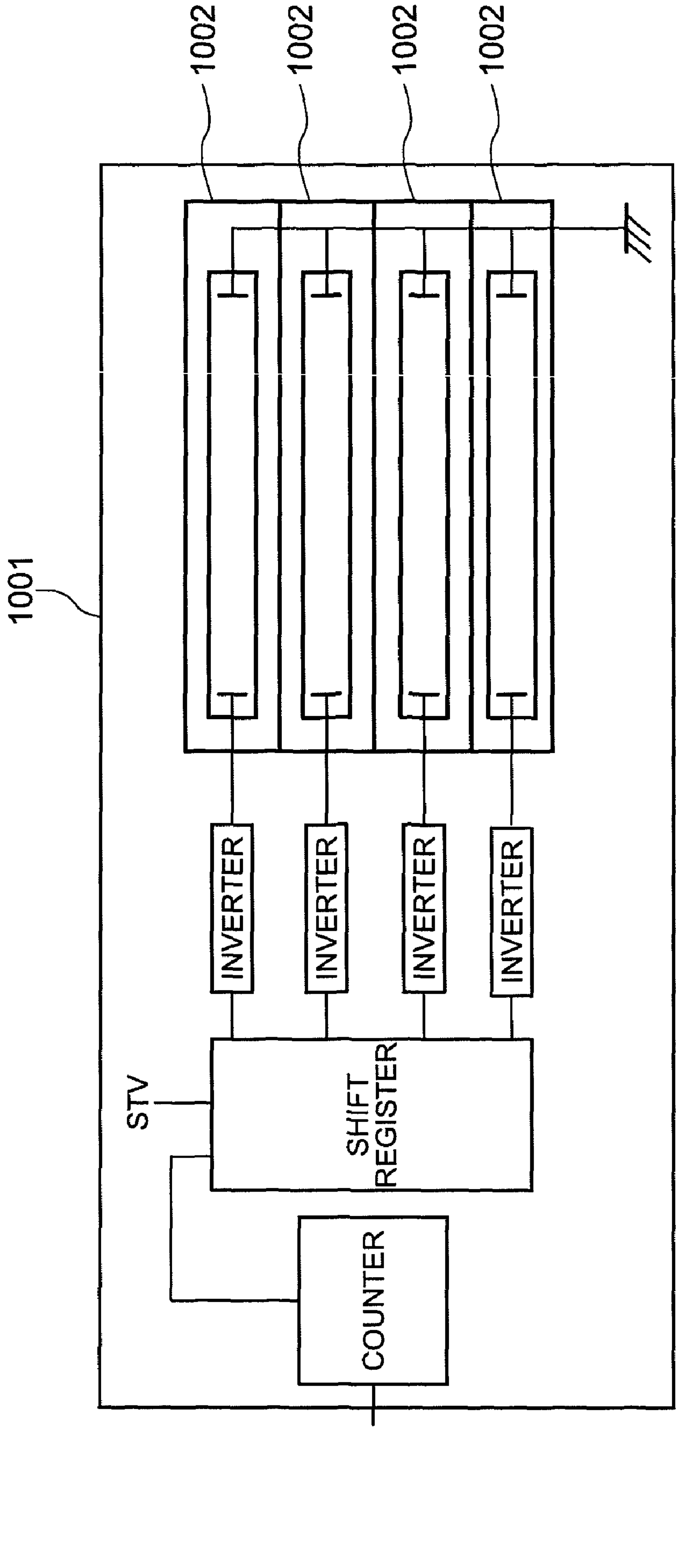
FIG. 73 is an explanatory diagram showing an example of structure of a liquid crystal display device of a related technique.
Figure 74:
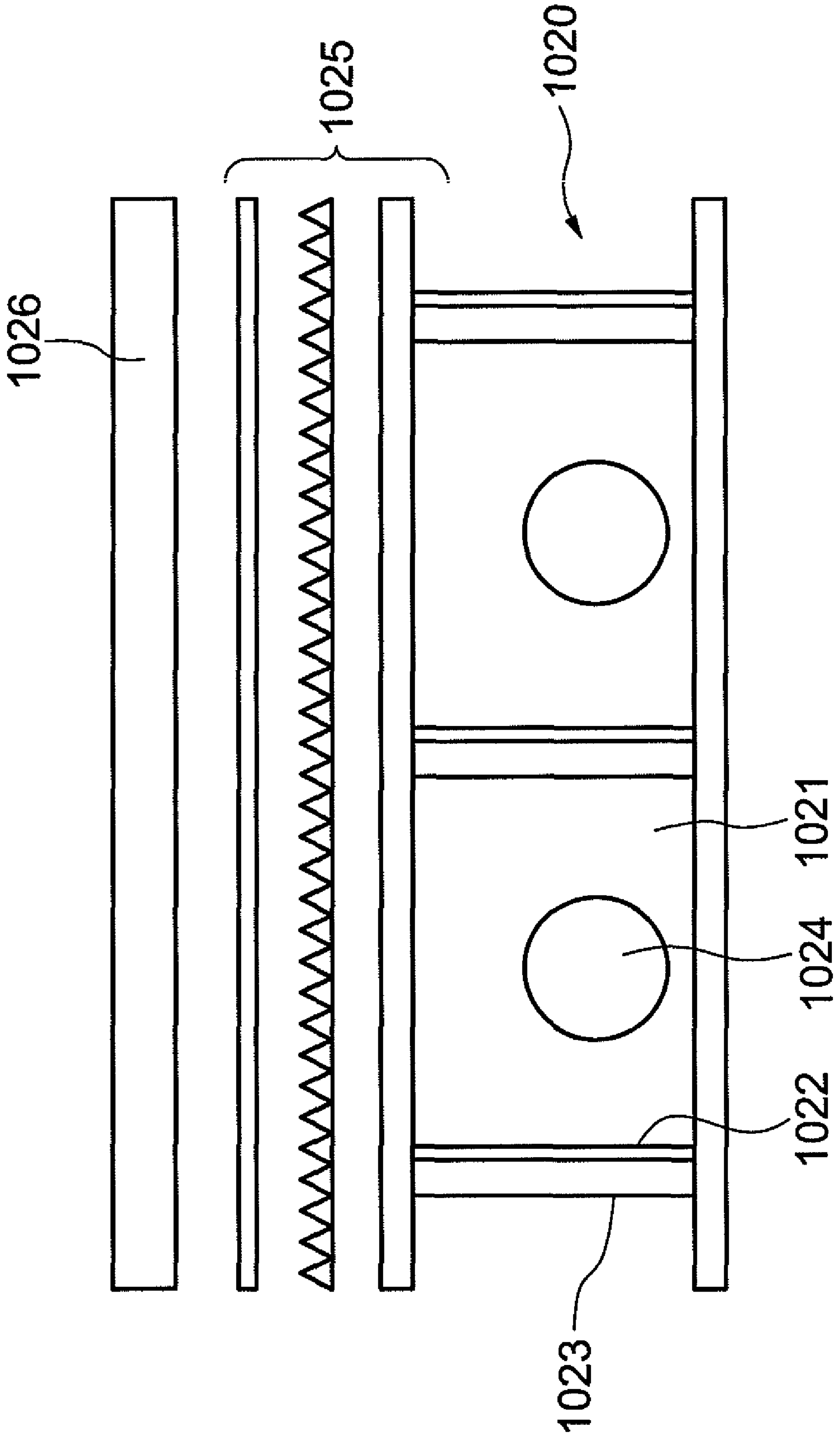
FIG. 74 is an explanatory diagram showing an example of structure of a liquid crystal display device of a related technique.
Figure 75:
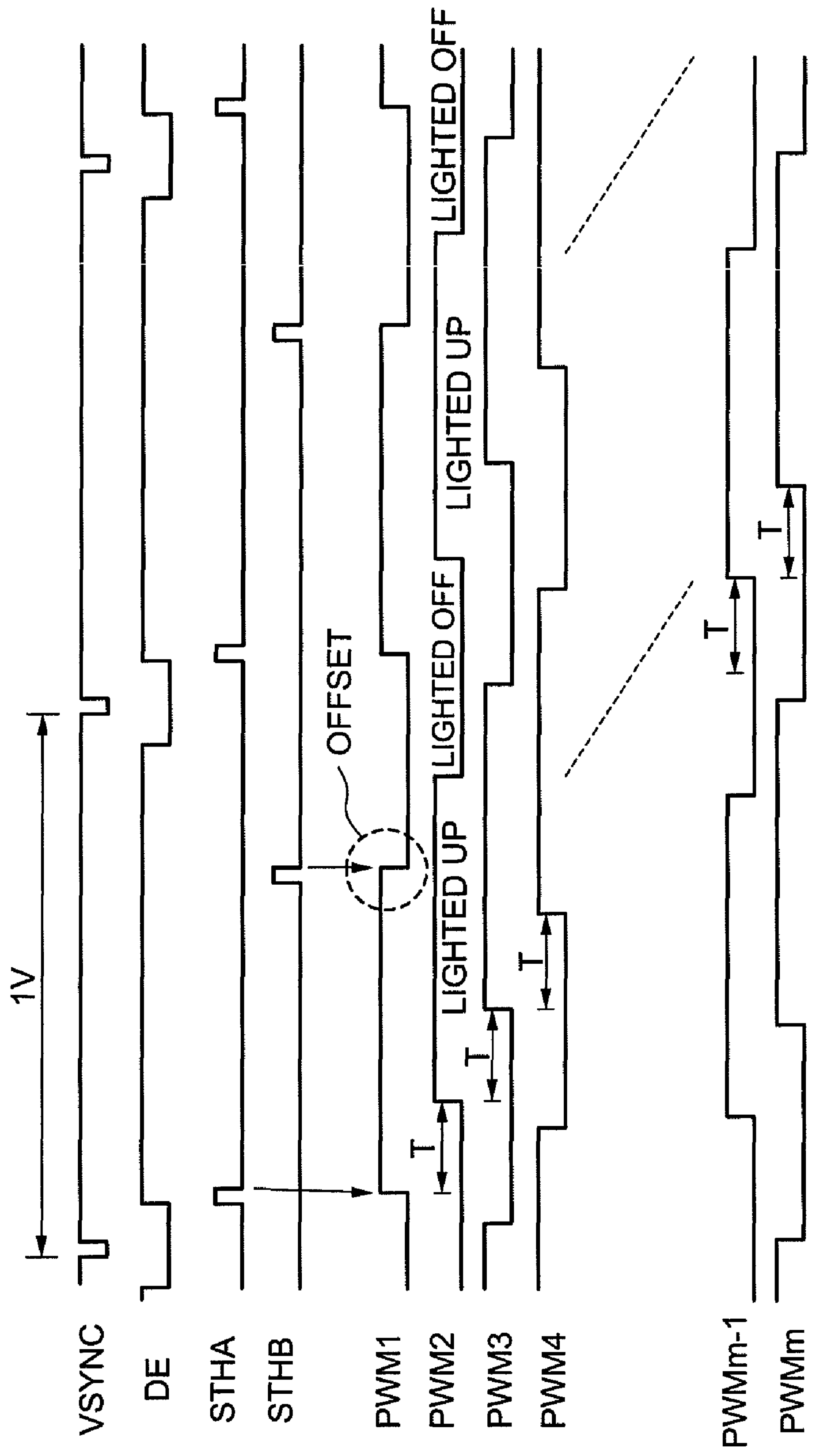
FIG. 75 is a timing chart showing an example of drive control procedures of a liquid crystal display device of a related technique.

Next, a fifth exemplary embodiment of the invention will be described by referring to FIG. 46. Hereinafter, explanations of substantially the same structures as those of the first exemplary embodiment are omitted, and only the different points are described. FIG. 46 is a flowchart showing an example of the drive control procedures of the liquid crystal display device according to the fifth exemplary embodiment of the invention.

The processing in each part of the liquid crystal display device having the structures described in each of the exemplary embodiments can be achieved also as a method. Various kinds of processing procedures as a drive control method of a display panel will be described by referring to FIG. 46.

Specifically, as shown in FIG. 46, the display panel drive control method according to the exemplary embodiment includes, as the basic structures: optimum set value setting control processing (step S101: setting control processing step) which is capable of calculating the setting conditions based on the set various kinds of parameters, and capable of performing setting controls so as to control the black insertion drive and the light-up timing based on the setting conditions; black image insertion drive control processing (step S102: black image insertion driving step) which performs controls to execute, on the display panel, the black image insertion drive in which the video display scanning for providing video display and the black image display scanning for providing black image display are started in a specific period; and light-up timing control processing (step S103: light-up timing control step) which performs controls of the light-up start timing and the light-off start timing of each of the plurality of light source blocks that are formed in parallel to the line sequential scanning direction on the back-face part of the display panel, based on the synchronous signal which synchronizes with the start timing of the video display scanning or the black image display scanning performed by the black image inserting driving step.

When there are space parts in the boundary parts of each of the neighboring light source blocks, the light-up timing control processing can control the light-up start timing and the light-off start timing so as to satisfy such a condition that the light-off period of a given light source block becomes equal to or less than a period from the end of the black image display scanning on the whole display lines within the block area of the display panel corresponding to that given light source block to the start of the video scanning of the first display line of the block area.

Further, provided that the black insertion rate of a frame period in the black image insertion drive control processing, the dividing number of the light source blocks, the light-off rate that is the ratio of the light-off period in the frame period, and the correction constant for the luminance response of the backlight and the transmittance rate of the liquid crystal display panel are the parameters, the light-up timing control processing can perform controls with the optimum set values of each parameter, which are optimized according to the electro-optics response of the display panel in the black image insertion drive, the luminance response of the light source in the drive of the light source block, and the speed of the line sequential scanning of the black image insertion drive.

The optimum set value setting control processing can also execute the parameter setting control of the above-described fourth exemplary embodiment.

As described above, in order to bring out the effect of the continuous transmittance waveforms of the black image insertion drive, the black image insertion drive of the liquid crystal display panel is performed in each of the divided light source blocks with the high-luminance state backlight and turns off the backlight after shielding the transmission light continuously, while video display drive of the liquid crystal display panel is performed in a high-luminance state by lighting up the backlight and release the transmission light. Therefore, it is possible to achieve a high picture quality with fine total balance in the motion blur of the moving picture, the luminance efficiency, and the contrast.

Further, the concept of controlling the black image insertion drive control processing and the light-up timing control processing based on the optimum setting conditions is not necessarily limited to the substantial device but may also function as the method thereof. Inversely, the invention regarding the method is not necessarily limited to the substantial devices, but may be effective as the method thereof. In that case, the display panel control device, the liquid crystal display device, and the like can also be included as examples for achieving the method.

Such device (storage medium control device: controller) may be used alone or used by being mounted to a certain apparatus (electronic apparatus, for example). The spirit of the present invention is not intended to be limited only to such case, but to include other various kinds of modes. Therefore, it is possible to be achieved as software or hardware as appropriate. When it is built as software as an example of embodying the spirit of the present invention, there naturally is a recording medium on which the software is stored to be used.

Further, a part thereof may be achieved by the software and another part may be achieved by the hardware. It may also be in a form where a part is stored on a recording medium to be loaded properly as necessary. When the present invention is achieved with the software, it is possible to be structured to use hardware and an operating system, or may be achieved separately from those.

Other structures, steps, functions, and operational effects are the same as those of the first exemplary embodiment described above.

(Other Various Modification Examples)

While the device and the method according to the invention have been described by referring to some of the specific exemplary embodiments, various modifications can be applied to the exemplary embodiments depicted in the contents of the Application of the present invention without departing from the technical spirit and the scope of the present invention.

For example, in the liquid crystal display device of each of the above-described exemplary embodiments, the moving picture blurring is lightened by inserting the black image display between each of the video frames. However, it is not limited to insert the black display, but a halftone display such as gray display may be inserted as well. In this case, in addition to improving the moving picture blurring, luminance deterioration can also be suppressed. However, the color band and the contrast are deteriorated. Therefore, it is necessary to set the optimum halftone insertion rate by taking those into consideration.

Further, each of the above-described exemplary embodiments can be applied even if the liquid crystal display panel is any of the liquid crystal drive modes such as a twist nematic (TN) mode, a super twist nematic (STN) mode, a vertical alignment (VA) mode, an in-plane switching (IPS) mode, a polymer dispersion liquid crystal (PDLC) mode, a guest host (GH) mode, a ferroelectric liquid crystal (FLC) type, a birefringence control (ECB) mode, and an OCB panel. Furthermore, there is no specific restriction set for the types of the liquid crystal display device. For example, it is possible to be applied to arbitrary types such as active-matrix type liquid crystal display device, e.g., the thin-film transistor type and a simple matrix drive type.

Moreover, the number, positions, and shapes of the structural members, and the set values and the like of the parameters are not limited to those described in the above-described exemplary embodiments, but may be set to the preferable number, positions, shapes and the numerical values for embodying the present invention. That is, while the above-described exemplary embodiments illustrate the case with the condition of the black insertion rate (Xp=0.5), the present invention is not limited to such value. The scope of the present invention can include the conditions determined when the black insertion rate (Xp) takes other values.

Further, when the boundary part between each of the neighboring light source blocks forms a space part, the light-up timing control part can perform drive-controls by dividing the backlight light source into M (≦N) blocks even when there are N-number of light-up control circuits. For example, sixteen light-up control circuits may be provided, and the light-up timing control part may supply a same control signal to two light-up control circuits to perform light-up controls of eight divided blocks. In that case, the light-up timing control part may be set to perform controls to properly switch the light-up control of eight divided blocks (first divided mode) and the light-up control of sixteen divided blocks (second divided mode) as necessary.

Further, the black insertion driving part of the timing controller may have a black insertion rate setting part which sets the output timing of the black display scanning start pulse (VSP-b) by the black insertion drive control part in accordance with the operating environment. In this case, the black insertion rate setting part has functions of: temporarily storing information for one frame of the video signal inputted sequentially by each frame; comparing the video signal of a given frame among the video signals and the video signal of a previous frame stored temporarily; and setting the black insertion rate based on the number of changed data. The black insertion drive control part can also generate various kinds of signals based on the settings set by the black insertion rate setting part.

More specifically, the black insertion rate setting part compares current frame data “data (n)” and previous frame data “data (n-1)” to count the changed data in one frame. It is also possible to include a function of judging whether the data is static image or dynamic image by smoothing the counted information through moving it for several frames to be leveled, for example, and by judging the threshold value.

Further, the black insertion rate setting part may include a function of judging the black image insertion rate by referring to the input signals. The black insertion rate setting part may include a function of setting the output timing of VSP_b by the black insertion drive control part according to the judged black image insertion rate. For example, the black insertion rate setting part can be formed, including a judging part which judges the black insertion rate based on the setting information selected by the preference of the user, or including a judging part which judges the optimum black insertion rate by calculating feature values of input video signals inputted sequentially by each frame and comparing the feature value of a given frame and the feature value of the previous frame.

This makes it possible to judge the black image insertion rate by each frame period suited for the drive mode, the use condition, and the like of the liquid crystal display panel, and to set the output timing of VSP_b which can achieve the judged black image insertion rate. The timing set herein is the timing at which the pixel line for writing the video signal and writing the black image signal is not selected by a single gate driver simultaneously.

Further, the black insertion rate setting part is not limited to judge the black image insertion rate by referring to the input signals and to set the input timing of VSP_b to the gate driver according to the judged black image insertion rate. The black insertion rate setting part may set the input timing of VSP_b to the gate driver in accordance with timing data that is inputted from outside by an operation or the like of the user.

The liquid crystal display devices according to each of the above-described exemplary embodiments can be used as display units of various kinds of electronic apparatuses. Examples of the electronic apparatuses may include various kinds of electric products such as: various kinds of information processors such as a television set of the broadcast receiving device of the above-described exemplary embodiment, computers, and the like; projectors; digital still cameras; remote controllers of various kinds of apparatuses; home appliances, game machines, and portable music players to which various kinds of information communicating functions are loaded; various kinds of recording devices; car navigation devices; pagers; electronic notebooks; pocket calculators; word processors; POS terminals; various kinds of mobile terminals; and portable terminals such as PDAS, portable telephones, wearable information terminals, PNDs, and PMPs.

Regarding the display units of the electronic apparatuses, there are roughly two types such as a direct-view type with which the images on the display panel are directly viewed, and a projection type with which images of the display panels are optically enlarged and projected. The liquid crystal display device according to the exemplary embodiments can be applied to both types.

(Programs)

A software program according to the invention for achieving the functions of the above-described exemplary embodiments includes a part of or a whole part of the programs corresponding to each processing part (processing device), functions, and the like shown in various block diagrams of each of the above-described exemplary embodiments, the programs corresponding to the processing procedures, processing devices, functions, and the like shown in flowcharts of the drawings, and the method (steps) depicted generally through the current Specification, the processing and the data described herein. Specifically, the control program of the invention is directed to a control program that is executed by a computer provided to the display panel control device. This control program is capable of allowing the computer to execute functions, including: a black image insertion driving function (function of step S102 shown in FIG. 46, function of reference numeral 51 shown in FIG. 1, for example) which controls to perform, on the display panel, black image insertion drive which starts video display scanning and black image display scanning for the display panel in a specific period; and a light-up timing control function (function of step S103 shown in FIG. 46, function of reference numeral 58 shown in FIG. 1, for example) which controls setting of the light-up start timing and the light-off start timing of each of the plurality of light source blocks formed on the back-face of the display panel in parallel to the line sequential scanning direction, based on a synchronous signal that synchronizes with the timing for starting the video display scanning or the black image display scanning performed by the black image insertion function.

In this case, when there are space parts in the boundary parts of each of the neighboring light source blocks, the light-up timing control function can include a setting control function which controls the light-up start timing and the light-off start timing so as to satisfy such a condition that the light-off period of a given light source block becomes equal to or less than a period from the end of the black image display scanning on the whole display lines within the block area of the display panel corresponding to that given light source block to the start of the video scanning of the first display line of the block area. These functions can be executed by the computer.

Further, provided that the black image insertion rate of a frame period in the black image insertion drive control processing, the dividing number of the light source blocks, the light-off rate that is the ratio of the light-off period in the frame period, and the correction constant for the luminance response of the backlight and the transmittance rate of the liquid crystal display panel are the parameters, the light-up timing control function can perform controls with the optimum set values of each parameter, which are optimized according to the electro-optics response of the display panel in the black image insertion drive, the luminance response of the light source in the drive of the light source block, and the speed of the line sequential scanning of the black image insertion drive.

Further, there is no limit set in regards to the form of the programs, such as programs executed by object codes, interpreters, script data supplied to OS, etc. The programs can be loaded with a high-level procedure type or object directional programming language, or an assembly or a machine language as necessary. In any case, the languages may be a compiler type or an interpreter type.

As a way to supply the control program, it is possible to provide the program from an external device via a telecommunication line (wired or radio) that is connected to be capable of communicating with the computer via the telecommunication line.

With the program according to the exemplary embodiment of the invention, the device according to the invention described above can be executed relatively easily by loading the control program to the computer (CPU) from a recording medium such as a ROM to which the control program is stored and having it executed, or by downloading the control program to the computer via a communication device and having it executed. When the present invention is embodied as the software of the device, there naturally is a recording medium on which the software is recorded to be used.

Further, there is no difference at all regarding the products whether it is a primary duplicate or a secondary duplicate. When the program is supplied by using the communication line, the present invention is utilized by having the communication line as a transmission medium. Further, this can be specified as the invention relate to the program. Furthermore, dependent claims regarding the device may be applied as dependent claims regarding the method and the program to correspond to the dependent claims of the device.

The above-described programs may be recorded on an information recording medium. An application program including the above-described programs is stored in the information recording medium. It is possible with a computer to read out the application program from the information recording medium, and install it to a hard disk. Thereby, the above-described program can be provided by being recorded to the information recording medium, such as a magnetic recording medium, an optical recording medium, or a ROM. The use of an information recording medium having such programs recorded therein in the computer can provide a preferable information processing device.

As the information recording medium for supplying the program, semiconductor memories and integrated circuits such as ROMs, RAMs, flash memories, SRAMs, or USB memories and memory cards including those, optical disks, magneto-optical disks, magnetic recording mediums, and the like may be used. Furthermore, the program may be recorded on portable media such as flexible disks, CD-ROMS, CD-Rs, CD-RWs, FDs, DVDROMs, HDDVDs (HDDVD-R-SLs (single layer), HDDVD-R-DLs (double layer), HDDVD-RW-SLs, HDDVD-RW-DLs, HDDVD-RAM-SLs), DVD±R-SLs, DVD±R-DLs, DVD±RW-SLs, DVD±RW-DLs, DVD-RAMs, Blu-Ray Disks (registered trademark) (BD-R-SLs, BD-R-DLs, BD-RE-SLs, BD-RE-DLs), MOs, ZIPs, magnetic cards, magnetic tapes, SD cards, memory sticks, nonvolatile memory cards, IC cards, or a storage device such as hard disks that are built-in to computer systems.

Further, the "information recording medium" also includes a form which kinetically holds the program for a short period of time (transmission medium or carrier wave), e.g., a communication line when transmitting the program via a communication circuit lines such as networks of the Internet, a telephone line, etc., and also includes a form which holds the program for a specific period of time, e.g., a volatile memory provided inside the computer system to be a server or a client in the above case.

Further, the steps shown in the flowcharts of the current Specification include not only the processing executed in a time series manner according to the described procedures, but also the processing that may be executed in parallel or individually. Further, in the actual implementation, the order of executing the program procedures (steps) can be changed. Furthermore, at the time of implementation, it is possible to mount, eliminate, add, or reallocate the specific procedures (steps) described in the current Specification as combined procedures (steps) as necessary.

Moreover, the functions of the program, e.g., each device, each function, and the procedures of each step of the device may be achieved by exclusive hardware (for example, exclusive semiconductor circuit). A part of the whole functions of the program may be processed by the hardware, and the other functions of the whole functions may be processed by the use of software. In the case of using the exclusive hardware, each part may be formed with an integrated circuit such as LSI. These may be formed on a single chip individually, or may be formed on a single chip including a part of or a whole part of the integrated circuit. Further, LSI may include other functional blocks such as various circuits. The way of integration is not limited only to LSI. An exclusive circuit or a general-purpose processor may also be employed. Further, when there is a technique related to integration of circuits developed in replacement for LSI due to advancement in the semiconductor technology or another technique derived therefrom, such technique may naturally be used for integrating the functional blocks.

Furthermore, the scope of the present invention is not limited to the examples shown in the drawings.

Moreover, each of the exemplary embodiments includes various stages, and various kinds of inventions can be derived therefrom by properly combining a plurality of feature elements disclosed therein. That is, the present invention includes combinations of each of the above-described exemplary embodiments or combinations of any of the exemplary embodiments and any of the modifications examples thereof. In that case, even though it is not specifically mentioned in the exemplary embodiments, the operational effects that are obvious from each structure disclosed in each of the exemplary embodiments and the modification examples thereof can naturally be included as the operational effects of the exemplary embodiments. Inversely, the structures that can provide all the operational effects depicted in the exemplary embodiments are not necessarily the essential feature elements of the substantial feature parts of the present invention. Furthermore, the present invention can include structures of other exemplary embodiments in which some of the feature elements are omitted from the entire feature elements of the above-described exemplary embodiments, as well as the technical scope of the structures based thereupon.

The descriptions regarding each of the exemplary embodiments including the modification examples thereof are presented merely as examples of various embodiments of the present invention (i.e., examples of concretive cases for embodying the present invention) for implementing easy understanding of the present invention. It is to be understood that those exemplary embodiments and the modification examples thereof are illustrative examples, and not intended to set any limitations therewith. The present invention can be modified and/or changed as appropriate. Further, the present invention can be embodied in various forms based upon the technical spirit or the main features thereof, and the technical scope of the present invention is not to be limited by the exemplary embodiments and the modification examples.

Therefore, each element disclosed above is to include all the possible design changes and the equivalents that fall within the technical scope of the present invention.

INDUSTRIAL APPLICABILITY

The present invention can be applied to display devices in general, and electronic apparatuses containing those.

What is claimed is:

1. A display panel control device for controlling a display panel and a back-face light source which configures a plurality of light source blocks formed on a back face of the display panel in parallel to a line sequential scanning direction, the control device comprising:

a black image insertion driving part which starts video display scanning and black or dark image display scanning for the display panel, and performs black or dark image insertion drive in a specific period; and a light-up timing control part which sets and controls a light-up and a light-off start timing of each of the plurality of light source blocks, based on a synchronous signal that synchronizes with a timing for starting the video display scanning or a timing for starting black or dark image display scanning performed by the black image insertion part, wherein the light-up timing control part controls the setting of the light-up start timing or the light-off start timing so as to satisfy a period condition wherein a light-off period of a given light source block becomes equal to or less than a period from an end of the black or dark image display scanning on all display lines within a block area of the display panel corresponding to a given light source block to a start of the video scanning on the first display line within the block area, wherein, provided that driven line number of the display panel is "Vtotal", scanning line number that is display line number of the display panel is "Vdisp", dividing number of the divided light source blocks is "N", a black image insertion rate in a frame period by the black image insertion driving part is "Xp", and a light-off rate that is a ratio of the light-off period in the frame period is "Xb", the light-up timing control part performs controls based on the light-off period and the number of blocks set according to the black image insertion rate, by satisfying a co-relational condition between the black image insertion rate Xp and the light-off rate Xb expressed as follows:

$$Xb \leqq XP-(V\mathrm{disp}/N)/V\mathrm{total}.$$

2. The display panel control device as claimed in claim 1, wherein the light-up timing control part shifts the light-off start timing of each of the light source blocks from the start timing of the black or dark image display scanning by a specific period, while satisfying the period condition.

3. The display panel control device as claimed in claim 1, wherein:

the black image insertion driving part includes a double-speed conversion control part which, when supplying a black image insertion signal that alternately contains a video part for displaying video in accordance with a video signal and a black or dark image part for displaying a black or dark display in accordance with a black or dark image signal to the display panel, divides one frame period into k-number of sub-frame periods by multiplying the speed of the video inputted signal by the number of sub-frame periods k, and a black image insertion signal conversion part which inserts the black or dark image signal at least to one of the sub-frame periods; and provided that driven line number of the display panel is "Vtotal", display line number of the display panel is "Vdisp", dividing number of the divided light source blocks is "N", a black image insertion rate in a frame period by the black image insertion driving part is "Xp", a light-off rate that is a ratio of the light-off period in the frame period is "Xb", and number of sub-frame periods is "k", the light-up timing control part performs controls based on the light-off period and the number of blocks set according to the black image insertion rate, by satisfying a co-relational condition between the black image insertion rate Xp and the light-off rate Xb expressed as follows:

$$Xb \leqq Xp-(V\mathrm{disp}/kN)/V\mathrm{total}.$$

4. The display panel control device as claimed in claim 1, wherein the light-up timing control part performs controls based on the light-off period and the number of blocks set according to the black image insertion rate, by having a practical black image insertion rate as "Xp'=Tp'/Tv" where a practical black image insertion period of the display panel is "Tp/'" and the frame period is "Tv", and by having the practical light-off rate as "Xb'=Tb'/Tv" where the practical light-off period of the back-face light source is "Tb'" and the frame period is "Tv".

5. The display panel control device as claimed in claim 1, wherein the light-up timing control part drive-controls each of the light source blocks by dividing the blocks to satisfy "N≧6/k".

6. The display panel control device as claimed in claim 3, wherein the light-up timing control part drive-controls each of the light source blocks by dividing the blocks to satisfy "N≧6/k".

7. A liquid crystal display device, comprising:

a display panel in which a pixel is formed in each of intersection points between a plurality of gate lines and a plurality of source lines arranged in matrix;

a source line driving part which supplies, to each of the source lines, a black image inserted video signal which alternately contains a video part which displays video in accordance with a video signal and a black or dark image part which displays a black or dark display in accordance with a black or dark image signal;

a plurality of gate line driving parts which are provided to each of gate line groups (groups obtained by dividing the plurality of gate lines into groups), which sequentially supply a gate driving signal to the respective gate lines;

a light-up control part which performs controls to light up and off, by a unit of block, the plurality of light source blocks provided on the back face of the display panel in parallel to a line sequential scanning direction;

a backlight unit disposed in the back face of the display panel, which contains the plurality of light source blocks; and the display panel control device as claimed in claim 1, which controls the light-up control part, the gate line driving part, and the source line driving part, wherein the backlight unit has a space part formed over each block boundary part between the light source blocks neighboring to each other.

8. The liquid crystal display device as claimed in claim 7, wherein:

the backlight unit has a projected part that is formed in the block boundary part of the light source blocks neighboring to each other by being protruded from a bottom part of the backlight unit; and the space part is formed between a projection end part of the projected part and a top part of the backlight unit.

9. An electronic apparatus, comprising the liquid crystal display device claimed in claim 7 mounted as a display panel.

10. A display panel drive control method, comprising:

starting video display scanning and black or dark image display scanning for a display panel in a specific period, and performing black or dark image insertion drive; and controlling setting of a light-up start timing and a light-off start timing of each of a plurality of light source blocks formed on a back-face part of the display panel in parallel to a line sequential scanning direction, based on a synchronous signal that synchronizes with a timing for starting the video display scanning or a timing for starting the black or dark image display scanning performed by the black image insertion driving step, wherein when controlling setting of the light-up start timing and the light-off start timing of each of the plurality of light source blocks, the setting of the light-up start timing or the light-off start timing is controlled so as to satisfy a period condition, –4:e-w., wherein a light-off period of a given light source block becomes equal to or less than a period from an end of the black or dark image display scanning on all display lines within a block area of the display panel corresponding to the given light source block to a start of the video scanning on a first display line within the block area, wherein, provided that the driven line number of the display panel is "Vtotal", scanning line number that is display line number of the display panel is "Vdisp", dividing number of the divided light source blocks is "N", a black image insertion rate in a frame period by the black image insertion driving part is "Xp", and a light-off rate that is a ratio of the light-off period in the frame period is "Xb", the light-up timing control part performs controls based on the light-off period and the number of blocks set according to the black image insertion rate, by satisfying a co-relational condition between the black image insertion rate Xp and the light-off rate Xb expressed as follows:

$$Xb \leqq Xp-(V\text{disp}/N)/V\text{total}.$$

11. Display panel control means for controlling a display panel and a back-face light source which configures a plurality of light source blocks formed on a back face of the display panel in parallel to a line sequential scanning direction, the control means comprising:

black image insertion driving means for starting video display scanning and black or dark image display scanning for the display panel in a specific period, and performing black or dark image insertion drive; and light-up timing control means for controlling setting of a light-up start timing and a light-off start timing of each of the plurality of light source blocks, based on a synchronous signal that synchronizes with a timing for starting the video display scanning or a timing for starting black or dark image display scanning performed by the black image insertion means, wherein the light-up timing control means controls the setting of the light-up start timing or the light-off start timing so as to satisfy a period condition wherein a light-off period of a given light source block becomes equal to or less than a period from an end of the black or dark image display scanning on all display lines within a block area of the display panel corresponding to a given light source block to a start of the video scanning on the first display line within the block area, wherein, provided that driven line number of the display panel is "Vtotal", scanning line number that is display line number of the display panel is "Vdisp", dividing number of the divided light source blocks is "N", a black image insertion rate in a frame period by the black image insertion driving means is "Xp", and a light-off rate that is a ratio of the light-off period in the frame period is "Xb", the light-up timing control means perform controls based on the light-off period and the number of blocks set according to the black image insertion rate, by satisfying a co-relational condition between the black image insertion rate Xp and the light-off rate Xb expressed as follows:

$$Xb \leqq Xp-(V\text{disp}/N)/V\text{total}.$$

* * * * *